United States Patent [19]

Zankl et al.

[11] 4,028,599

[45] June 7, 1977

[54] METHOD OF CONTROLLING AN A.C. MOTOR

[75] Inventors: Frank Zankl, Milwaukee; Edward E. Kirkham, Brookfield; Richard E. Stobbe, Greenfield, all of Wis.; John J. Schachte, West Hartford, Conn.

[73] Assignee: Kearney & Trecker Corporation, West Allis, Wis.

[22] Filed: Feb. 19, 1975

[21] Appl. No.: 551,145

Related U.S. Application Data

[63] Continuation of Ser. No. 285,813, Sept. 1, 1972, Pat. No. 3,878,445.

[52] U.S. Cl. .............................. 318/227; 318/671; 444/1
[51] Int. Cl.² ...................... H02P 7/00; G06B 11/14
[58] Field of Search .......... 318/567, 568, 569, 227, 318/600, 601, 671, 678, 731, 314, 318; 444/1

[56] References Cited

UNITED STATES PATENTS

| | | | |
|---|---|---|---|
| 3,753,064 | 8/1973 | Agarwal et al. | 318/227 |
| 3,805,135 | 4/1974 | Blaschke | 318/227 |

*Primary Examiner*—Felix D. Gruber
*Attorney, Agent, or Firm*—Cyril M. Hajewski

[57] ABSTRACT

In apparatus for controlling the speed and torque of a multiphase a.c. motor in accordance with digital control signals, a first regulation circuit regulates the frequency of the a.c. electrical signal applied to the motor and another regulation circuit regulates the voltage of the a.c. signal. Both regulation circuits are controlled by digital control signals in a series of discrete steps over a range of control values and the control signals are supplied periodically to the regulation circuits. The speed and torque are controlled in accordance with an algorithm relating speed and torque to the frequency and voltage of the source of electric power which is applied to the motor, calculated by computing apparatus on a periodic basis. In one embodiment the position of the magnetic flux of the stator is controlled directly.

2 Claims, 38 Drawing Figures

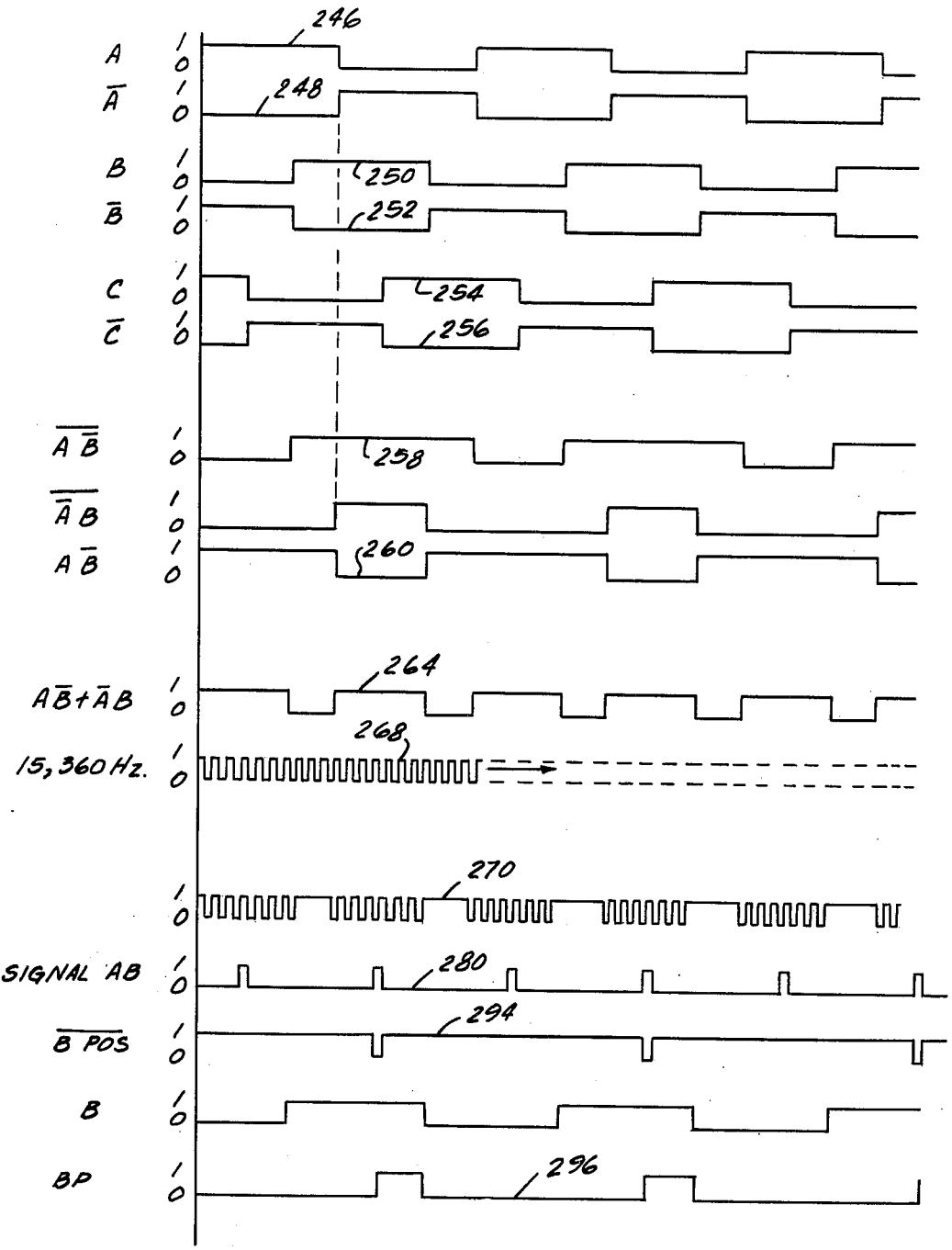

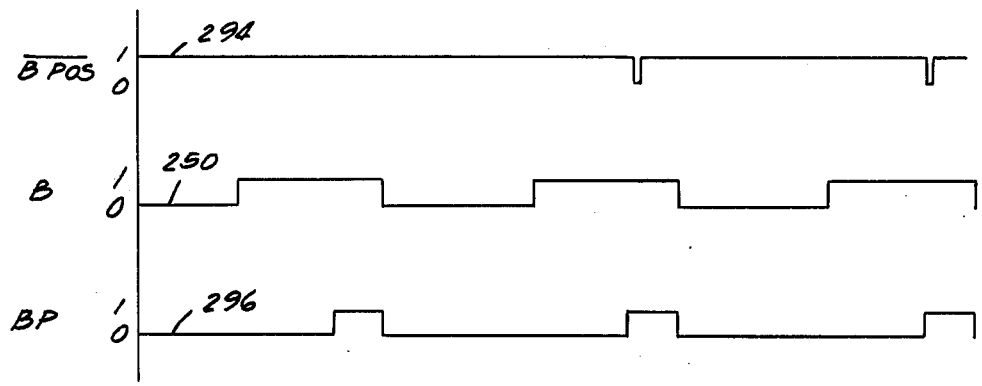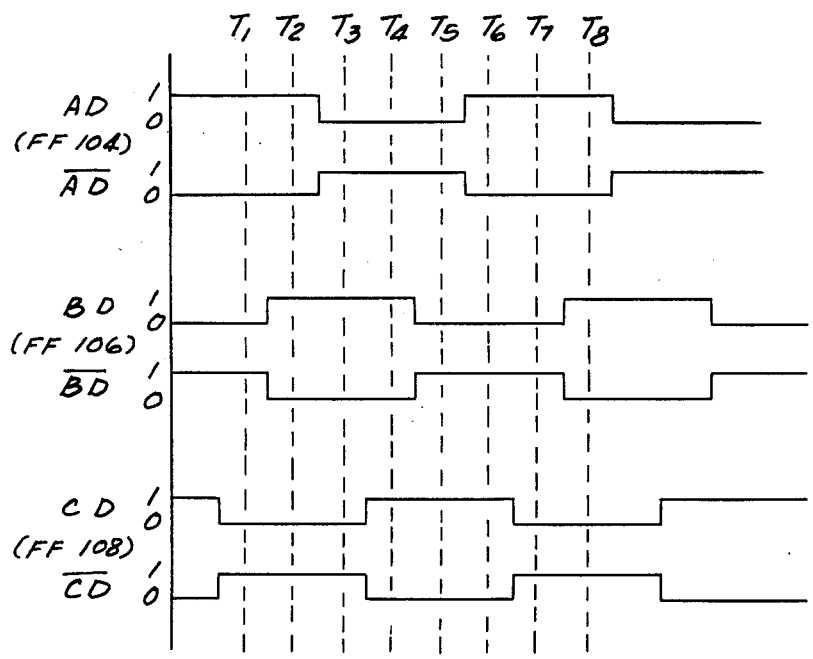

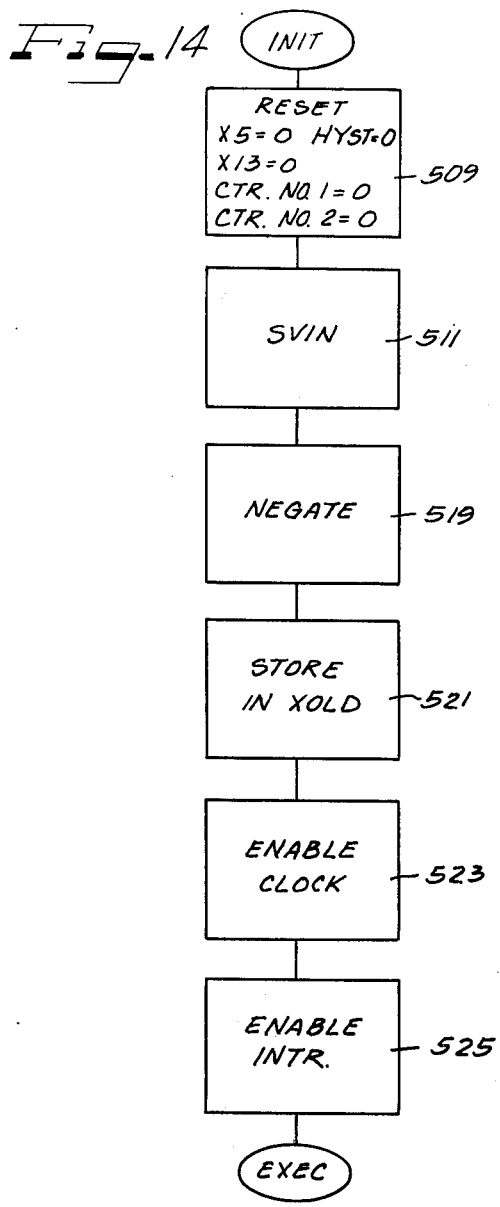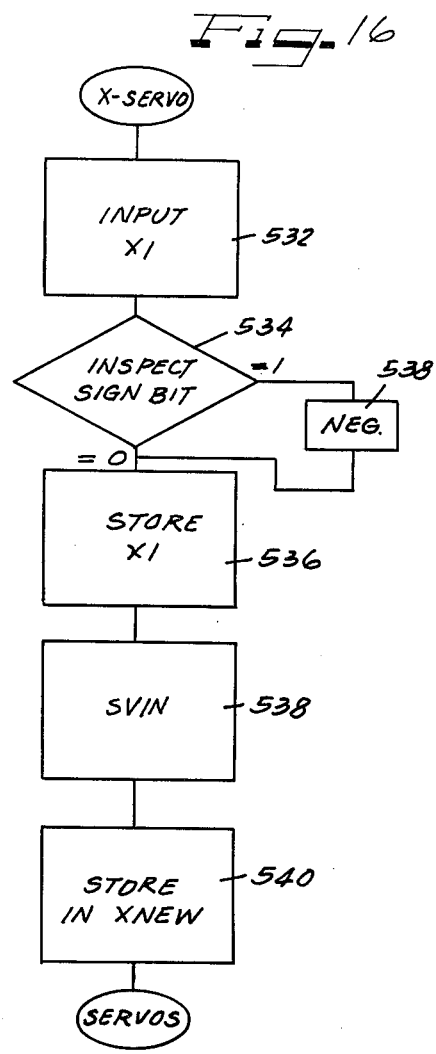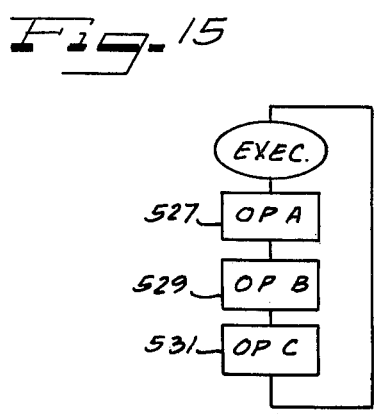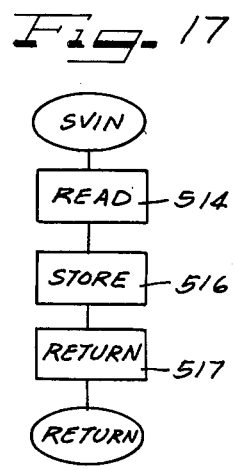

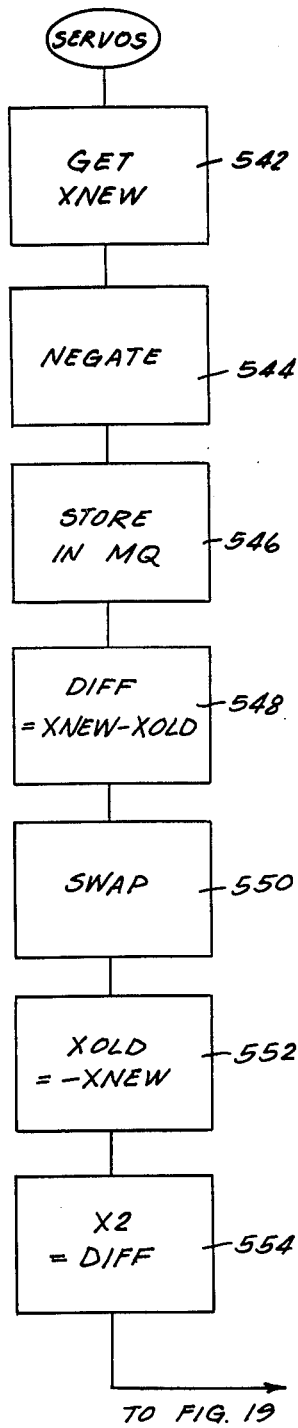
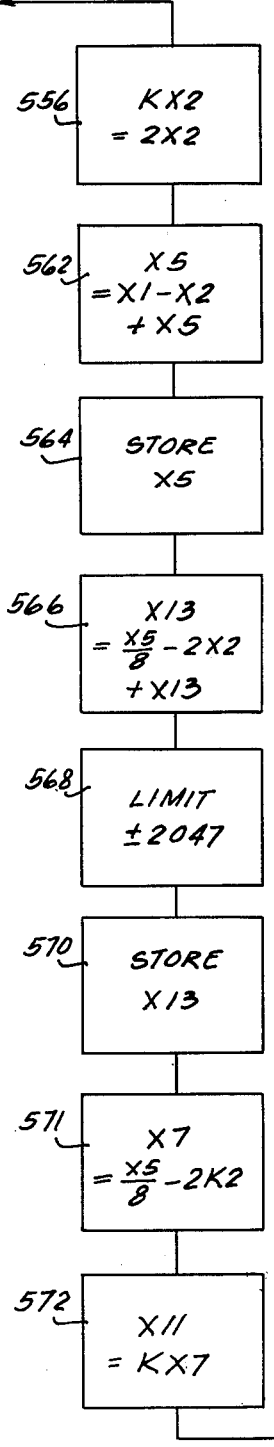
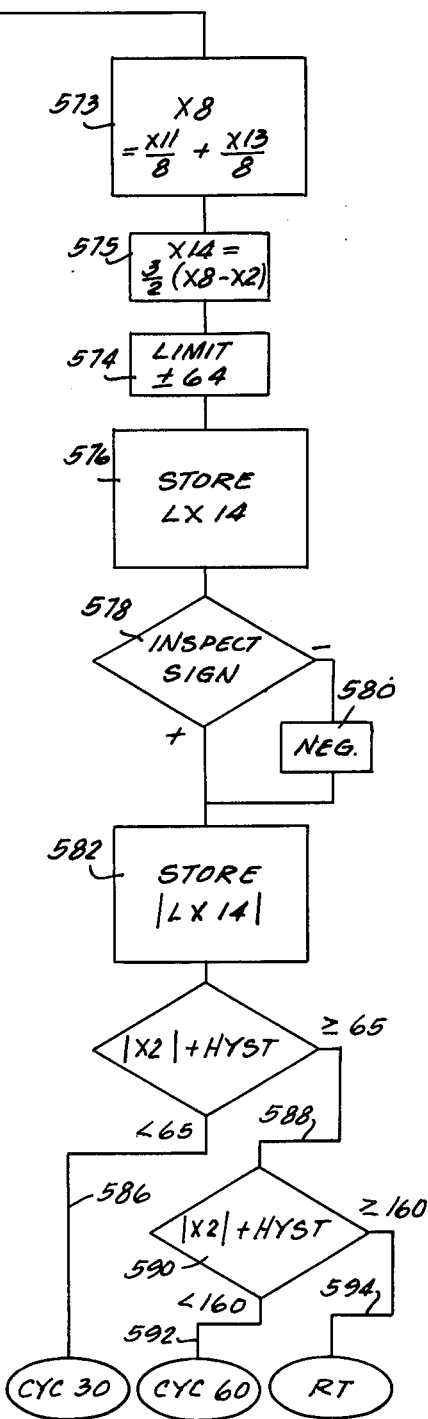

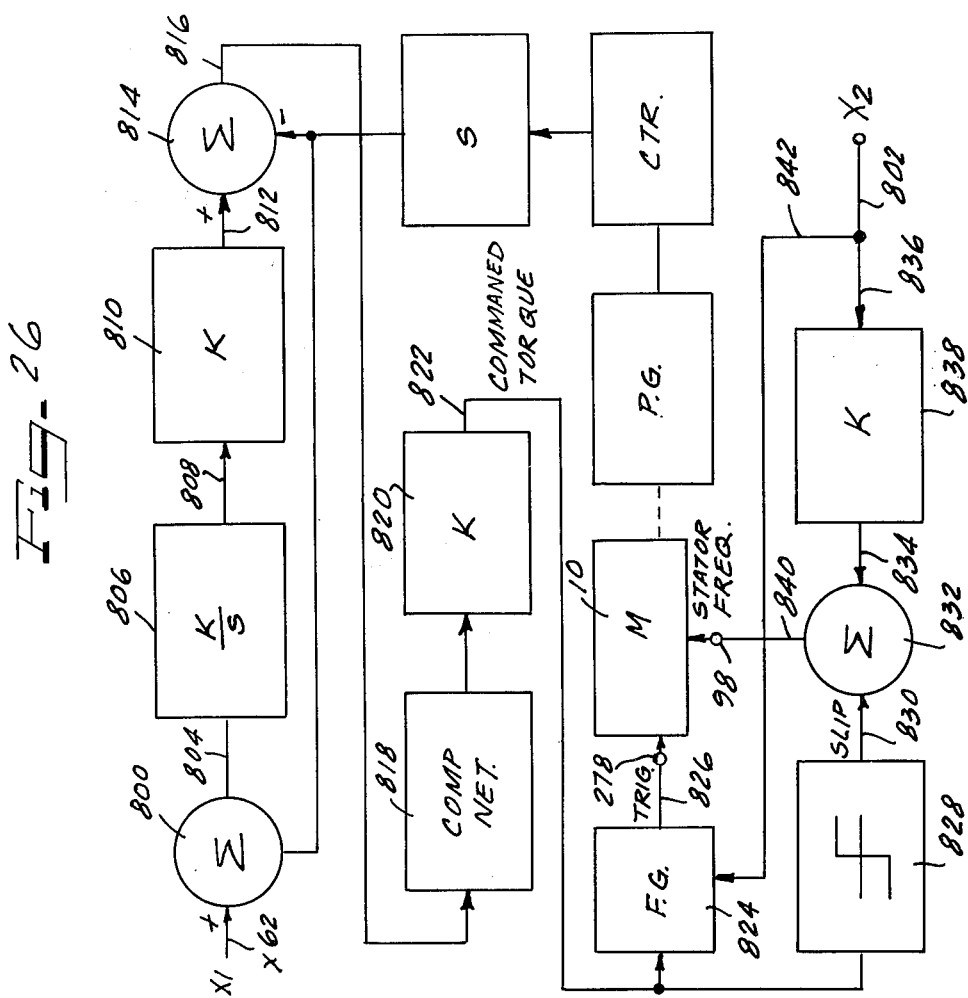
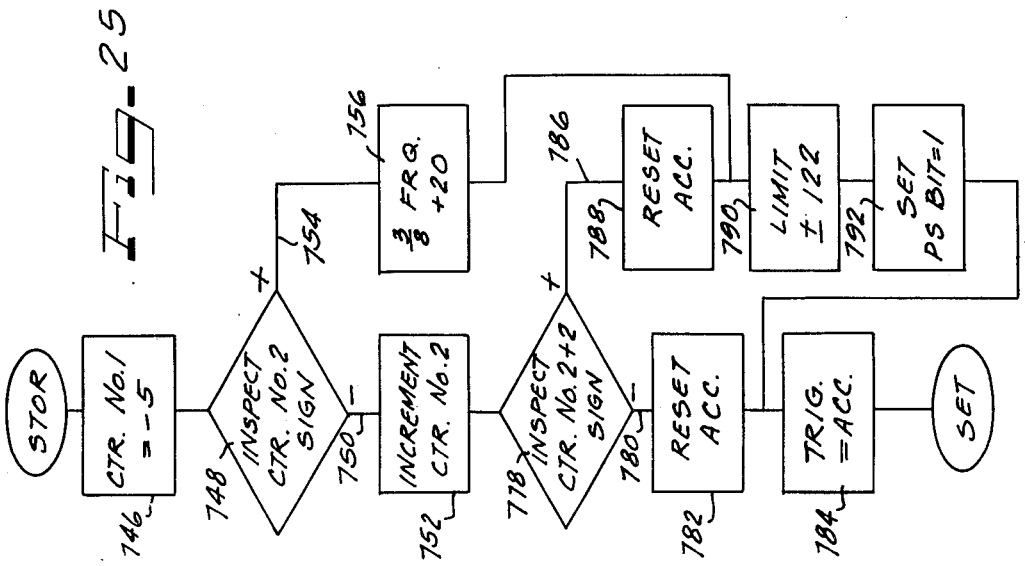

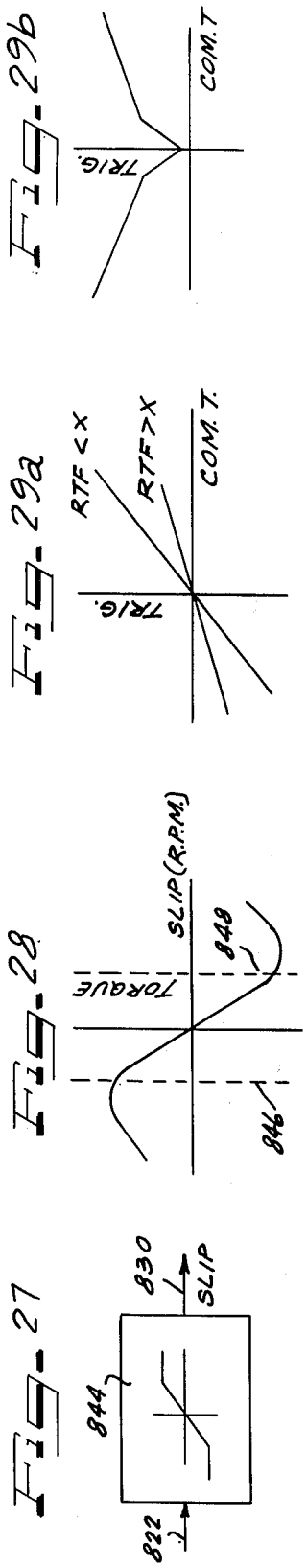
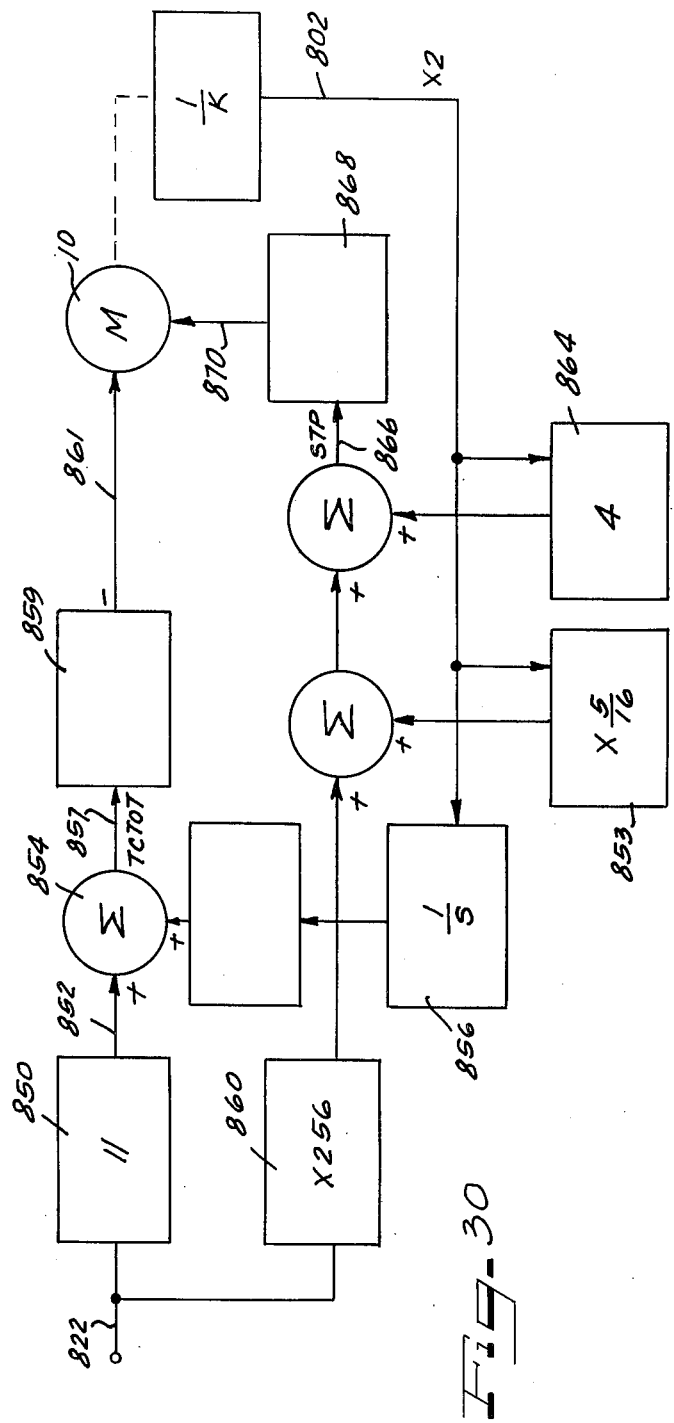

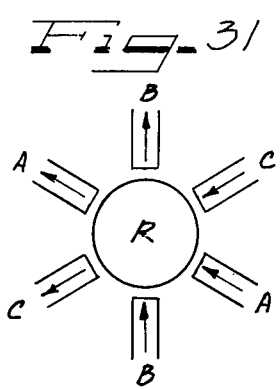
Fig-31
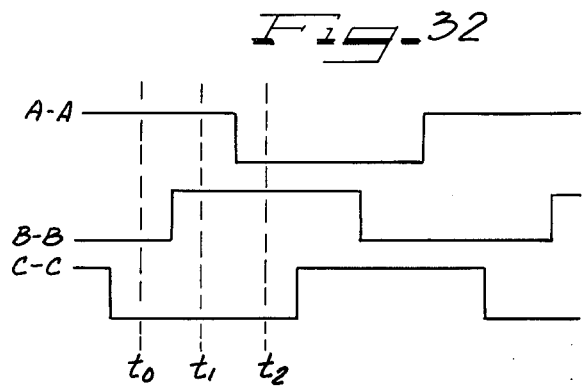
Fig-32
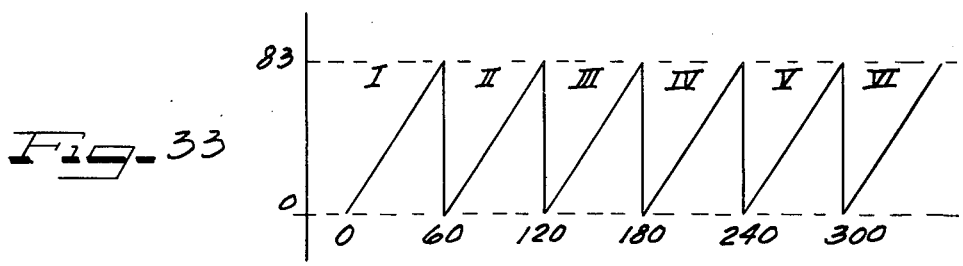
Fig-33
Fig-34
|  | A | B | C |
|---|---|---|---|
| START | 1 0 | 0 1 | 0 1 |
| START +1 | 1 0 | 1 0 | 0 1 |
| START +2 | 0 1 | 1 0 | 0 1 |
| START +3 | 0 1 | 1 0 | 1 0 |
| START +4 | 0 1 | 0 1 | 1 0 |
| START +5 | 1 0 | 0 1 | 1 0 |
| START +8 | 1 0 | 0 0 | 0 1 |
| START +9 | 0 0 | 1 0 | 0 1 |
| START +10 | 0 1 | 1 0 | 0 0 |
| START +11 | 0 1 | 0 0 | 1 0 |
| START +12 | 0 0 | 0 1 | 1 0 |
| START +13 | 1 0 | 1 0 | 0 0 |

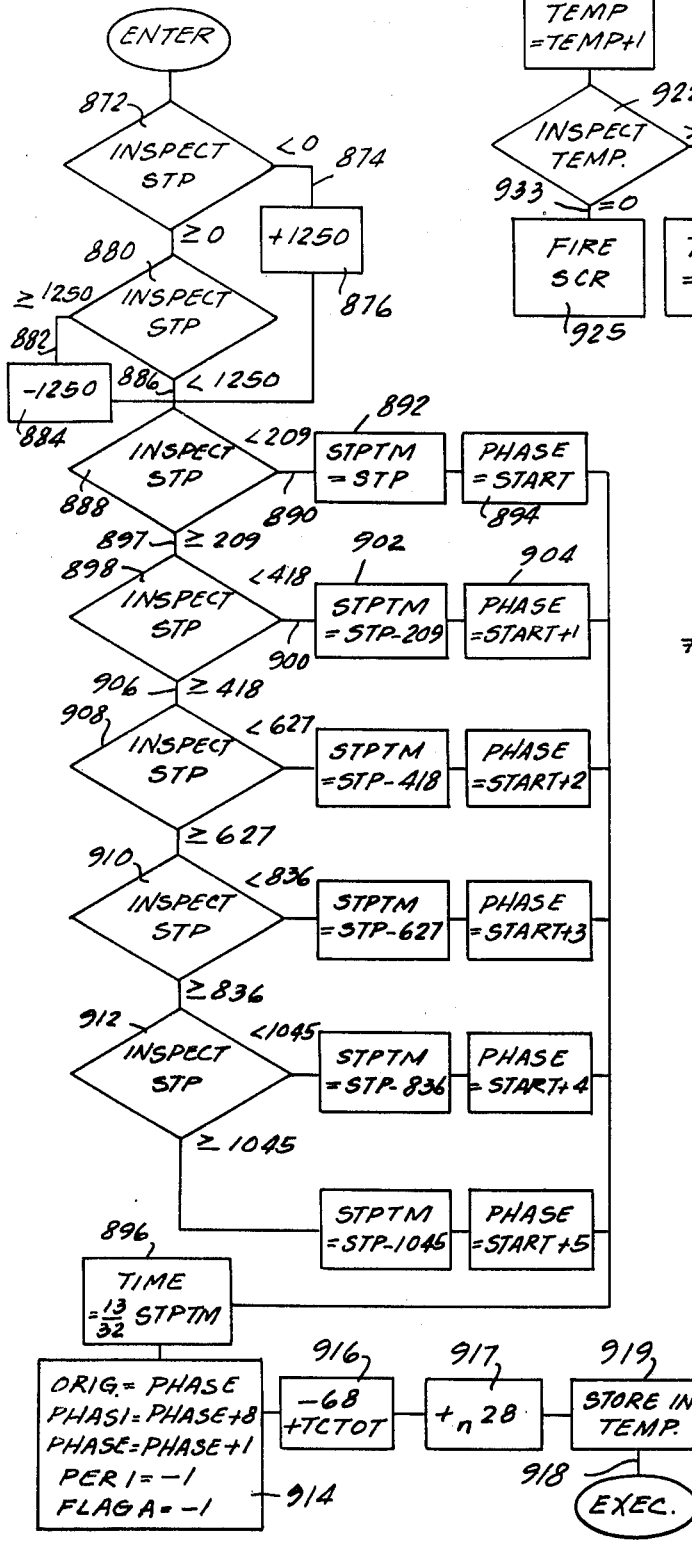
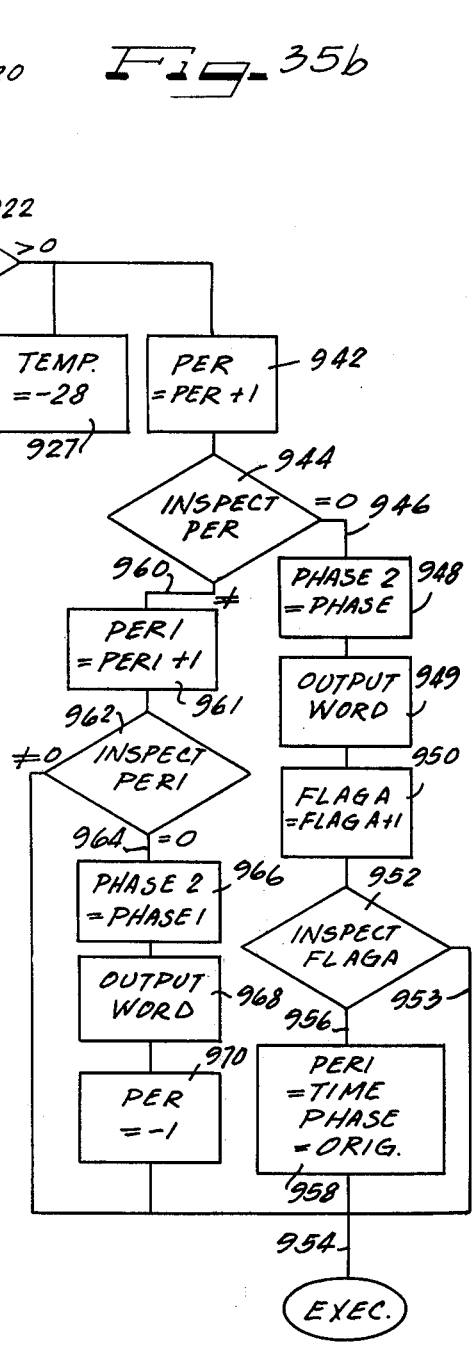
Fig. 35a
Fig. 35b

METHOD OF CONTROLLING AN A.C. MOTOR

This application is a continuation of patent application ser. No. 285,813, filed Sept. 1, 1972, U.S. Pat. No. 3,878,445, issued on Apr. 15, 1975.

BACKGROUND OF THE INVENTION

This invention relates to apparatus for the control of induction motors and particularly to means for controlling the speed and torque of such motors in a way which permits rapid response to control signals when such motors are employed in servo systems.

In a servo system where the motor torque and speed characteristics are varied in accordance with a program or schedule, it is desirable to have a motor which responds quickly to programmed changes in its condition. It has been customary in the past to use d.c. motors for such applications, but d.c. motors have the major disadvantage of requiring brushes and a commutator assembly which adds to the complexity of the motor system and the amount of necessary maintenance. It is, therefore, desirable to employ a.c. motors, and particularly induction motors for this purpose, so that the simpler construction of the a.c. motor can be used to advantage. However, when an induction motor is operated at less than its rated speed, a relatively high slip value results in increased heating within the motor, an undesirable condition. Such heating not only renders motor operation less efficient, but may also damage the motor.

In an effort to employ an a.c. motor in a servo loop, it has been proposed to supply a variable frequency to the motor, so that the motor can operate over a variety of speeds at a substantially constant slip. It has also been proposed to vary the input voltage to the motor so that the output speed of the motor is function primarily of the voltage input, and to combine both methods of control so that the amplitude of the driving voltage, and its frequency, are controlled together by some fixed relation. However, the means which have been developed in the past for doing this have not been entirely successful. The responses of the motor to commands for changing values of speed and torque have been relatively slow, and the apparatus employed has not permitted a high degree of precision and accuracy in controlling the motor, nor any flexibility in the relation between frequency and voltage control.

One problem has been that with low frequency operation, there is a relatively long time between successive state changes of the windings which generate the stator field. In a three phase motor, for example, there are only six state changes per cycle, and the time interval between successive state changes, viz. 1/6 cycle of the rotor, becomes quite long at low rotor frequencies. Moreover, the flux which traverses the air gap between stator and rotor can be changed in value only relatively slowly, because of the high inductance of the rotor. These and other problems combine to suggest that the use of an induction motor is not feasible when precise control is required at low rotor speeds.

It is, therefore, a principal object of the present invention to provide a mechanism whereby precise control of the speed and torque of an induction motor is attained, even at very low speed conditions.

A further object of the invention is to provide for a flexible relation in controlling the frequency and voltage of the a.c. power applied to the motor.

Another object of the present invention is to provide a mechanism for controlling an induction motor without causing a high degree of heating within the motor when operated at low speeds.

A further object of the present invention is to provide a mechanism whereby control of motor speed and torque are controlled by periodically recurring control signals which have a relatively high frequency in relation to the speed of the motor.

Another object of the invention is to provide digital apparatus for accepting periodic digital control signals from a numerical control apparatus and employing such signals to effect precise contol of an induction motor.

A further object of the present invention is to provide apparatus and a method for generating periodic digital control signals in accordance with a specified algorithm relating to the speed of the motor and servo following error to the frequency and amplitude of the driving voltage applied thereto.

Another object of the present invention is to provide apparatus and a method for periodically calculating digital values for the frequency and amplitude of the driving voltage as a function of motor speed and following error, such function being derived empirically for the motor with which the apparatus is used.

A further object of the present invention is to provide apparatus and a method for directly controlling the position of the resultant magnetic flux generated in the stator of the motor as a function of the motor speed and servo followng error.

Another object of the present invention is to provide apparatus for disconnecting the motor from its driving voltage in response to a condition of excessive motor current.

A further object of the present invention is to provide apparatus and a method for modifying the number of poles in a multiphase a.c. motor, in response to a calculation involving motor speed and servo following error.

Another object of the present invention is to provide apparatus and a method for calculating the frequency of the driving voltage as a function of motor speed and servo following error, and selecting one of a series of discrete frequency values in response thereto, and applying a hysteresis quantity in said calculation for establishing one criterion for selecting one frequency, and a different criterion for selecting another frequency subsequent to selecting said one frequency.

These and other objects of the present invention will become manifest upon an examination of the following description and the accompanying drawings.

SUMMARY OF THE INVENTION

In one illustrative embodiment of the present invention there is provided a plurality of power transistors connected to the several phases of a multiphase induction motor, a variable frequency voltage source connected to said transistors, and a variable voltage d.c. source selectively connected to said motor through said transistors in accordance with said variable frequency. Both the variable voltage source and the variable frequency source are controlled periodically by digital control signals. In connecting the variable frequency source to the motor, the power transistors maintain a connection between the voltage source and the several phases of the motor for varying periods of time in order to obtain precise control.

The motor current is sensed, and an excessive current condition quickly temporarily disables the connection between the voltage source and the motor, and then permanently (unitl manually reset) disables such connection if the high current condition persists beyond a predeterminded interval. The digital control signals are produced by computing apparatus which periodically calculates the appropriate digital control signals by use of an empirically derived algorithm relating motor speed and servo following error to frequency and amplitude of the driving voltage. Motor speed and servo following error are sampled during each successive 8.3 milliseconds period, and the digital control signals are updated each period. The digital control signal for the frequency of the driving voltage is chosen, for one mode of operation, such that the driving frequency is either 30 Hz. or 60 Hz., depending on the instantaneous motor speed, and a variable frequency, up to 90 Hz., for a rapid traverse mode of operation. A hysteresis quantity is recognized in the frequency selection, and the configuration of the motor is changed, under conditions of zero driving voltage, when a transition is made into, or out of, the rapid traverse mode. The amplitude of the driving voltage is calculated, by applying a predetermined relation of voltage and following error for the chosen frequency, such that the voltage produces the torque necessary to maintain the servo following error at a predetermined level.

In another embodiment of the present invention, the digital control signals are calculated such that the frequency of the driving voltage gives a constant slip, and such that the amplitude of the driving voltage gives the torque required to maintain the following error.

In a further embodiment of the present invention, the digital control signals are calculated such that the frequency of the driving voltage gives a slip proportional to the torque of the motor, and the amplitude of the driving voltage gives the torque required to maintain the following error.

In another embodiment of the present invention, a digital control signal is calculated to render predetermined combinations of the power transistors effective at any given time to connect each phase of a synchronous motor to one or the other of the terminals of the variable voltage d.c. source, such that the average position of stator flux during any period between calculations is in accordance with that calculated from motor speed and following error, and another digital control signal is calculated for controlling the amplitude of the driving voltage such that the driving voltage gives the torque to maintain the following error.

BRIEF DESCRIPTION OF THE DRAWINGS

Reference will now be made to the accompanying drawings in which:

FIG. 6 is a graph showing a group of waveforms generated during operation of the apparatus of FIGS. 5a and 5b;

FIG. 7 is another graph showing a group of waveforms generated during operation of the apparatus of FIGS. 5a and 5b;

FIG. 8 is a graph showing a group of waveforms generated during operation of the apparatus of FIG. 3;

FIGS. 14–25 are functional block diagrams of a series of computer programs by which a computer may execute the operations of the flow charts of FIGS. 10 and 12;

FIG. 14 is a functional block diagram of the INIT program, which initializes the computer operation;

FIG. 15 is a functional block diagram of the EXEC program, which illustrates the normal routine of the computer;

FIG. 16 is a functional block diagram of the X-SERVO program, by which an NC command is periodically read;

FIG. 17 is a functional block diagram of the SVIN program, by which the servo position is periodically read;

FIG. 18 is a functional block diagram of the first portion of the SERVOS program, in which the frequency of the driving voltage is calculated;

FIG. 19 is a functional block diagram of the second portion of the SERVOS program;

FIG. 20 is a functional block diagram of the CYC 30 and CYC 60 programs, in which the amplitude of the driving voltage is calculated for 30 Hz. and 60 Hz. operation;

FIG. 21 is a functional block diagram of the STORE program, in which a PS pole selection bit is calculated for 30 Hz. and 60 Hz. operation;

FIG. 22 is a functional block diagram of the SET program, in which the calculations of the computer are output to the apparatus of FIGS. 3 and 5a;

FIG. 23 is a functional block diagram of the first portion of the RT program, in which calculations are effected for the rapid traverse mode of operation;

FIG. 24 is a functional block diagram of a second portion of the RT program;

FIG. 25 is a functional block diagram of the STOR program, in which a PS pole selection bit is calculated for rapid traverse operation;

FIG. 26 is a flow chart illustrating the operation of an alternative servo system incorporating the invention and employing the apparatus of FIG. 1;

FIG. 27 is a functional block diagram of a modification to the flow chart of FIG. 26;

FIG. 28 is a graph of an induction motor sliptorque characteristic;

FIG. 29a and 29b are two graphs of a relationship between desired torque and driving voltage which may be employed in the flow chart illustrated in FIG. 26;

FIG. 30 is a flow chart of another servo system incorporating the invention and employing a portion of the apparatus of FIG. 1 in conjunction with an synchronous motor;

FIG. 31 is a diagrammatic illustration of a two pole 3-phase motor;

FIG. 32 is a graph of waveforms applied to the motor of FIG. 31;

FIG. 33 is a graph of a function related to commanded stator field position;

FIG. 34 is a list of output and intermediate words employed in the flow chart of FIG. 30; and FIGS. 35a and 35b are functional block diagrams of computer programs for executing the operations of the flow chart of FIG. 30.

DESCRIPTION OF THE INVENTION

Figure 1:
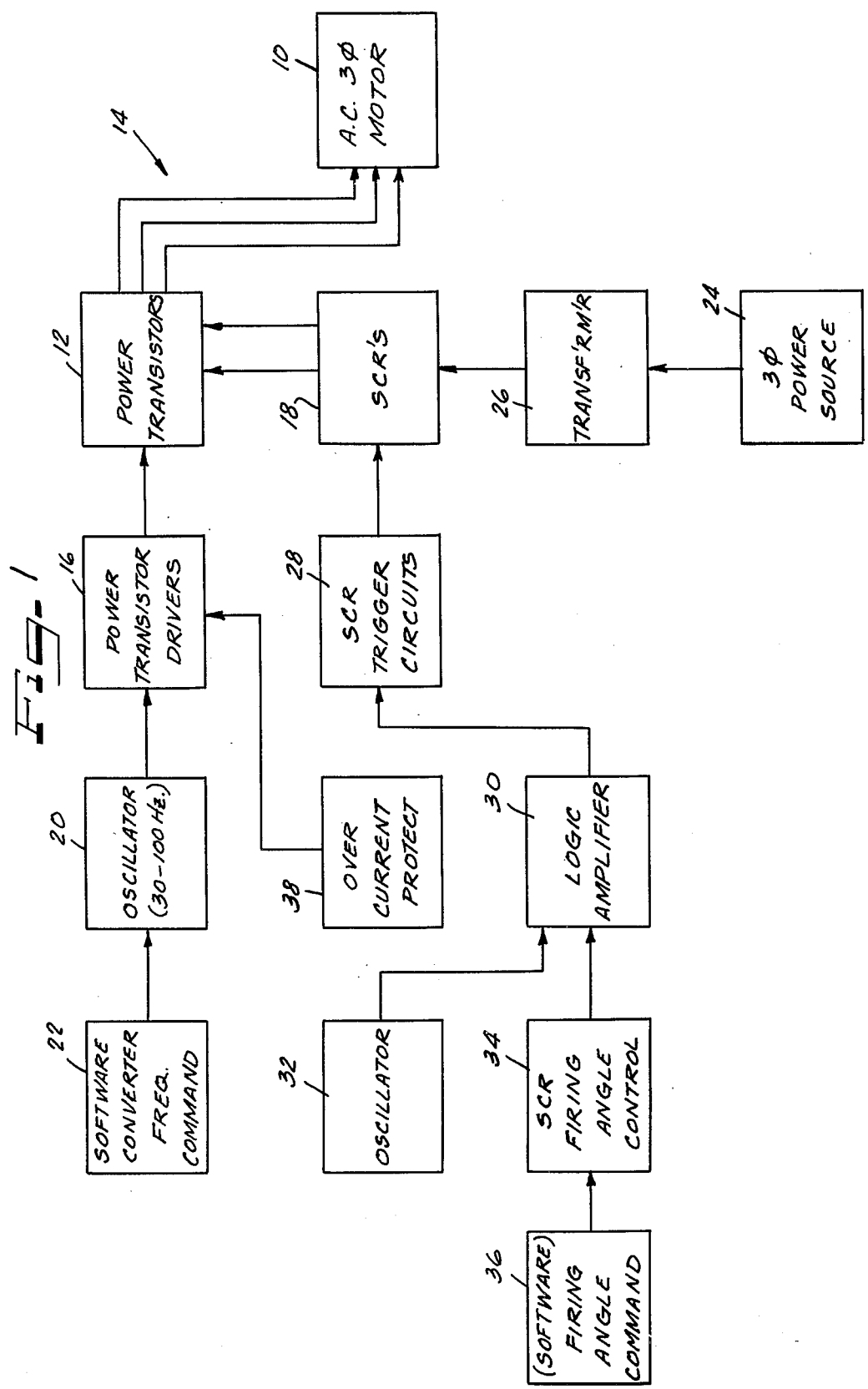
FIG. 1 is a functional block diagram of a system incorporating the present invention, showing it in association with a three phase induction motor.

Referring now to FIG. 1, a three phase induction motor 10 is shown diagrammatically and each of its three phases has a separate connection with a group of power transistors 12 (functioning as power switches) over one of the lines 14. The power transistors 12 comprise a plurality of transistor switches controlled by a signal derived from a group of power transistor drivers 16 to selectively connect a variable voltage exciting signal, derived from a group of SCR's 18, to the lines 14. The signal generated by the power transistor drivers 16 has an adjustable frequency which is controllable between 30 and 100 Hz. The frequency is determined by an oscillator 20 connected to the power transistor drivers 16. The frequency produced by the oscillator 20 is controlled by means of software apparatus 22, in accordance with conditions which are sensed by transducers associated with the motor 10. The software apparatus 22 is digital in nature, and cooperates with a numerical control device (not shown) which generates command signals for controlling the motor 10.

The power provided by the group of SCR's 18 is derived from a source of three phase power 24 which is connected to the group of SCR's 18 via a transformer 26. The SCR's 18 function as a three phase rectifier, and the firing angle of each of the SCR's within the group 18 is controlled by suitable signals derived from a group of SCR trigger circuits 28. The SCR trigger circuits 28 are responsive to the output of a logic amplifier 30. The amplifier 30 receives a signal generated by an oscillator 32 and a signal from firing angle control apparatus 34, to cause, via the trigger circuits 28, the group of SCR's 18 to provide a certain voltage level. The firing angle control apparatus 34 is controlled by software apparatus 36. The software apparatus 36 is digital in nature and cooperates with a numerical control device (not shown) which generates command signals for controlling the motor 10.

A motor over-current protection device 38 is connected to the power transistor drivers 16 to disable the power transistor drivers 16 if a sensing device senses that the motor current is excessive.

Figure 2:
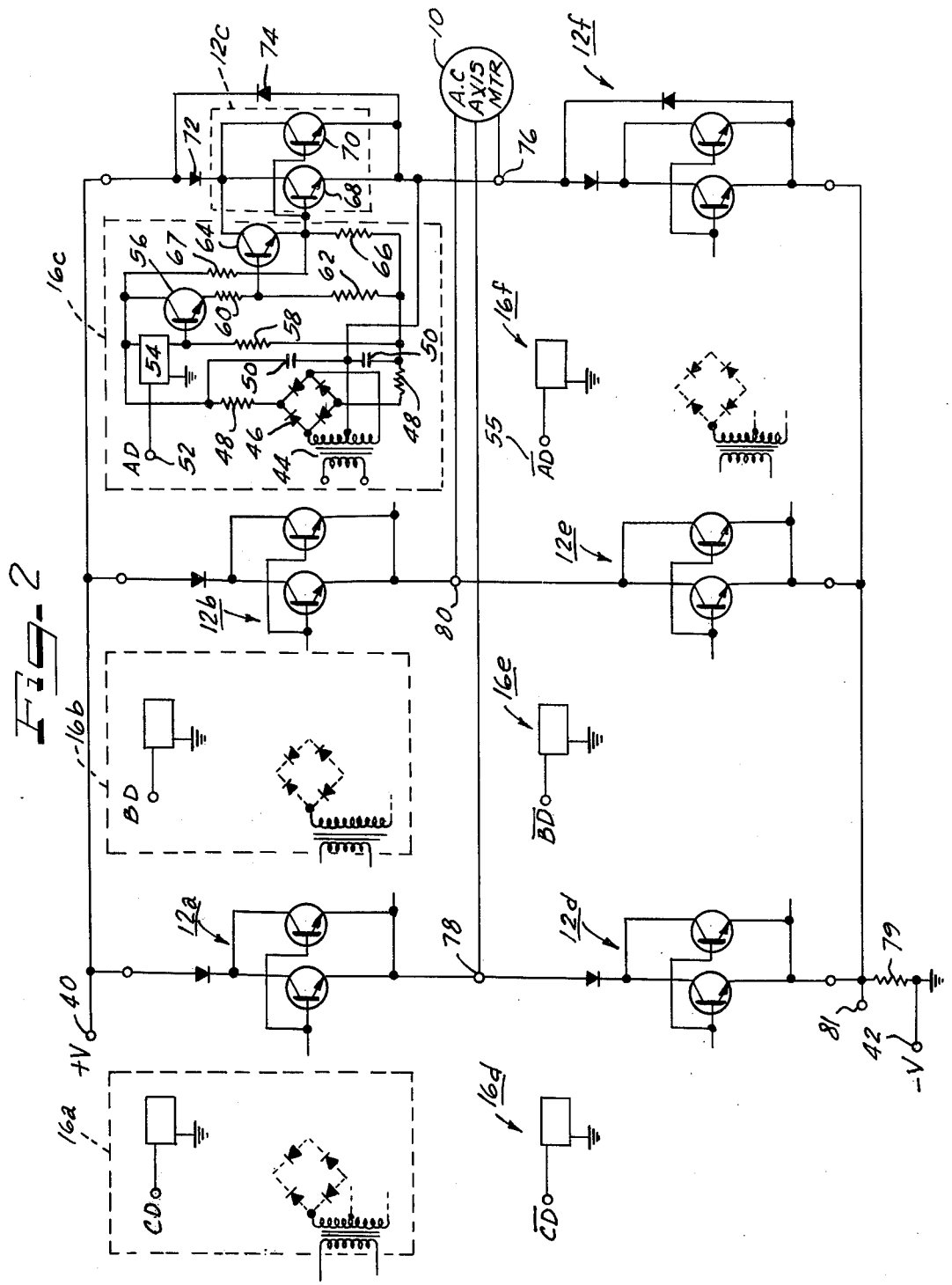
FIG. 2 is a schematic circuit diagram, partly in functional block diagram form, illustrating the power transistors and the drivers therefore, which are illustrated in functional block diagram form in FIG. 1.

Referring now to FIG. 2, the arrangement of the power transistors 12 and the power transistor driver 16 is illustrated. The two connections from the group of SCR's 18 are illustrated by terminals 40 and 42, to which are connected respectively the positive and negative voltage outputs from the SCR'SCB'18. Three of the power transistor driver circuits 16a, 16b and 16c are well connected to the terminal 40, and are connected respectively to the three separate terminals of the induction motor 10. Similarly, drivers 16d, 16e and 16f are all connected to the terminal 42, and are each individually connected to the three terminals of the motor 10, via the power transistors 12d, 12e and 12f. As all of the six power transistor driver circuits are identical, a description of one will suffice for all, and only the driver circuit 16c has been completely illustrated in FIG. 2. Similarly, all six of the power transistor circuits are identical. Accordingly, only the driver circuit 16c and the power transistor 12c will be described in detail.

A transformer 44 has its input connected to a source of line voltage and its output is connected to a full-wave bridge rectifier 46. A pair of currentlimiting resistors 48 are connected to the two outputs of the bridge and each of them is connected through a capacitor 50 to the center tap of the secondary of the transformer 44. Accordingly, equal and opposite polarity voltage levels appear across the two capacitors 50.

A control signal, from the oscillator 20, is provided to a terminal 52, which is connected through a photoisolator 54 to the base of a transistor 56. The photoisolator 54 is a conventional unit such as the TIL 112 marketed by Texas Instruments. Both the photoisolator 54 and the collector of the transistor 56 are connected to the positive capacitor 50. The photoisolator circuit 54 is also connected to ground directly and its output is connected to the negative capacitor 50 through a resistor 58. The emitter of the transistor 56 is connected to ground through a voltage divider including resistors 60 and 62 and the junction therebetween is connected to the base of a transistor 64, the emitter of which is connected to the negative capacitor 50 through a resistor 66, and to the positive capacitor 50 through a resistor 67. The emitter of the transistor 64 is also connected to the bases of power transistors 68 and 70, which have all three of their terminals connected in parallel, and which together form power transistor circuit 12c. The collectors of the transistors 68 and 70, as well as the collector of the transistor 64, are connected through a diode 72 to the terminal 40, and the emitters of the transistors 68 and 70 are connected directly to one of the terminals of the motor 10. A diode 74 is connected across the circuit including the power transistors 68 and 70 and the diode 72, in order to provide a path for current to flow around the transistors 68 and 70 in the reverse direction. The function of the diode 72 is to inhibit base current when the transistors are off.

In operation, a square wave is applied to the input terminal 52 and, after passing through the photoisolator 54, alternately cuts off and saturates the transistor 56. The transistor 56 is connected as an emitter-follower and its output signal is further amplified by a second emitter-follower incorporating the transistor 64, which drives the power transistors 68 and 70. The transistors 56 and 64 function as current amplifiers and permit the power transistors 68 and 70 to alternately cut off and saturate, in accordance with the signal applied to the terminal 52. Accordingly, the terminal 76, to which the emitters of the power transistors 68 and 70 are connected, is selectively connected and disconnected from the positive potential applied to the terminal 40.

In like manner, the power transistor circuits 12a and 12b are connected from the terminal 40 to terminals 78 and 80, respectively, of the motor 10. As described hereinafter, the signals applied to the photoisolator circuits of the driver circuits 16a and 16b are 120° out of phase with each other, and with the signal applied to the terminal 52, so that a three phase connection between the motor 10 and a positive terminal 40 is established. In like manner, the power transistor circuits 12d, 12e and 12f connect the three terminals of the motor 10 to the negative terminal 42 in three phase relation. The resistor 79, which is connected between the emitters of the transistor circuits 12d, 12e and 12f and the terminal 42, develops, at a terminal 81, a voltage proportional to the current flowing through the motor 10 and is employed in connection with the overcurrent protection circuit 38, as more fully described hereinafter.

Figure 3:
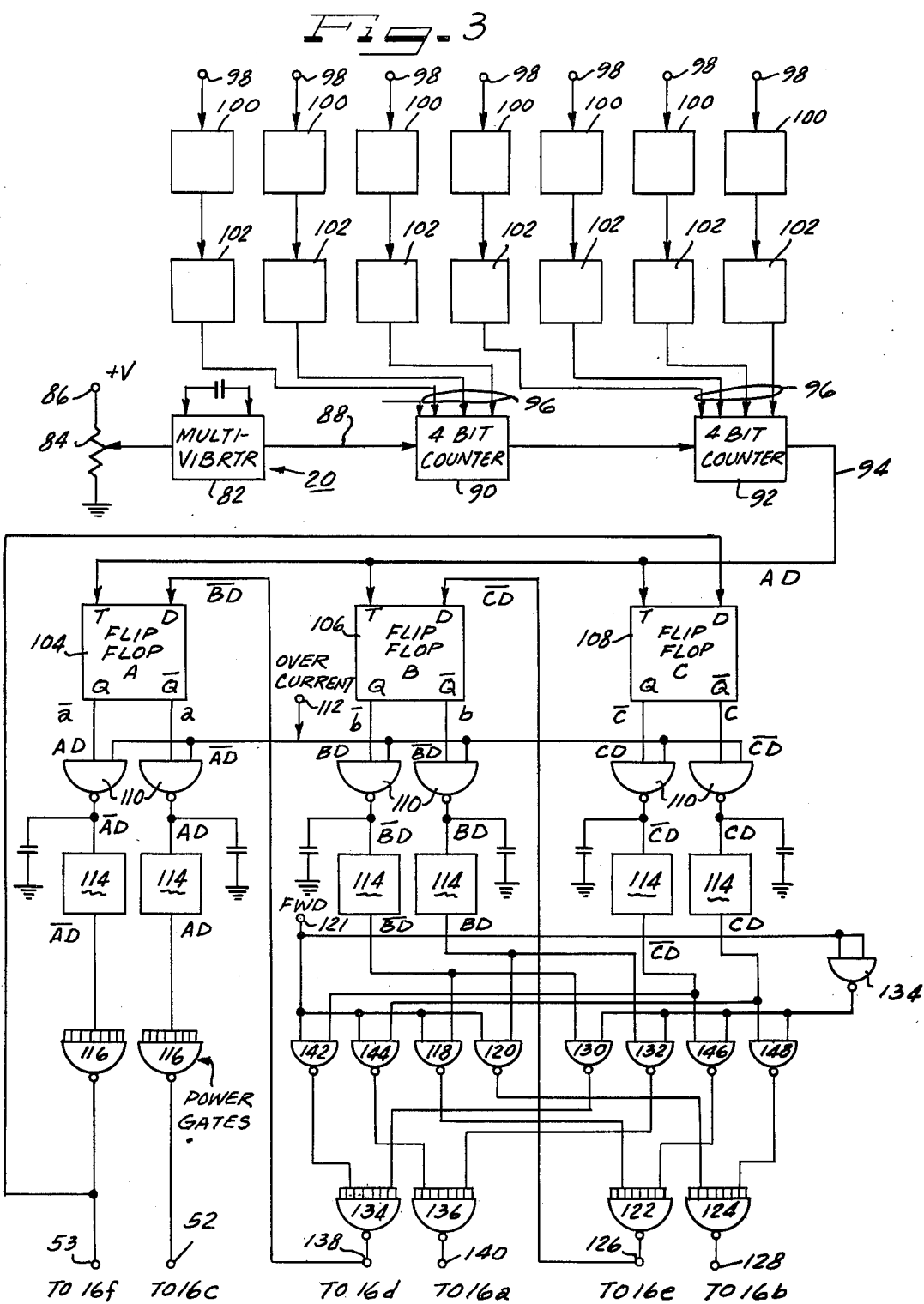
FIG. 3 is a functional block diagram, partly in schematic circuit diagram form, of the oscillator illustrated in FIG. 1.

The control signals applied to the terminal 52 are developed by circuitry illustrated in FIG. 3. FIG. 3 illustrates the details of the construction of the oscillator 20, and the manner in which the software unit 22 functions to produce the appropriate control signals for the driver circuits 16.

The oscillator 20 comprises a free-running multivibrator 82, the input of which is connected to the tap of a potentiometer 84. The terminals of the potentiometer 84 are connected between a terminal 86, to which a positive source of voltage is connected, and ground. The potentiometer 84 regulates the frequency of the multivibrator 82 and it is adjusted to give a frequency of approximately 29,000 Hz. at its output. A higher frequency may be used if desired. A line 88 is connected from the output of the multivibrator 82 to the input of a three-bit binary counter 90. The overflow terminal of the counter 90 is connected to the input of a four-bit binary counter 92. Together, the counter 90 and 92 comprise an eight-order binary counter, so that an output pulse is produced on the overflow terminal of the counter 92 for each 256 pulses applied to the input of the counter 90 via line 88. Accordingly, the frequency of pulses produced at the output of the counter 92 is approximately 113 Hz., providing that the counters 90 and 92 are allowed to function to divide the frequency of the pulses applied to its input by 256. Means are provided, however, for regulating the amount of division in order to produce a variable output frequency at the output of the counter 92, between 113 Hz. and 29,000 Hz.

Each of the counters 90 and 92 has a plurality of input lines 96, which are connected to the set inputs of each of the seven highest orders of the counters. Each of the input lines 96 is connected from an individual input terminal 98 through a power gate 100 and a photoisolator 102 to its respective counter, so that the state of the signal on each line 96 is dependent upon the state of the potential at the terminal 98 associated therewith. The terminals 98 are connected to the output of a storage register included within a numerical control device which stores a numerical quantity in binary form, representative of the desired pulse frequency. Accordingly, if the lowest frequency of 113 Hz. is desired, none of the terminals 98 is energized and the counters 90 and 92 function normally. If a frequency of about 600 Hz. is desired, however, signals representative of binary 208 are applied to the terminals 98 so that every 48th input pulse applied to the input line 88 produces an output pulse on the line 94, connected to the overflow terminal of the counter 92. If frequency intermediate these values is desired, a combination of the terminals 98 is representative in binary form, of a number between zero and 208 are energized in order to cause an overflow pulse on the line 94 after a selected number of pulses have been applied to the input line 88, thus controlling the pulse repetition rate. It should be noted that since the lines 96 are connected to the seven highest orders of the counters 90 and 92 the binary number set into the counter is twice the binary number represented on the input terminals 98. Thus, for example, when binary 24 is represented on the input terminals 98, the quantity 48 is set into the counters 90 and 92.

The line 94 is connnected to the T (or set) inputs of three flip-flops 104, 106 and 108. The D. (or reset) input of the flip-flop 104 is derived from one of the outputs of the flip-flop 106. Similarly, the D input of the flip-flop 106 is derived from one of the outputs of the flip-flop 108, and the D input of the flip-flop 108 is derived from one of the outputs of the flip-flop 104. As the inputs of the three flip-flops 104, 106 and 108 are cross-coupled with their outputs, only one of them is conditioned to change its state at any given time, depending upon the condition of the other two. As a result, the three flip-flops change their state in timed sequence and produce at their outputs a three phase square-wave signal having a frequency equal to 1/16 to the frequency of the pulses on the line 94, viz. from 30 to 100 Hz. The division of six results from the fact that six pulses on the line 94 are required to change the state of each of the three flip-flops 104, 106 and 108 twice to complete a cycle and resume the initial conditions of the three flip-flops.

The outputs of the flip-flops 104, 106 and 108 are connected to individual inverters 110. The inverters 110 each invert the output signals from the three flip-flops. The output of the inverters 110 are each connected to individual delay units 114. The outputs of the delay units 114 associated with the flip-flop 104 are connected through individual gates 115 to individual power gates 116, the outputs of which are connected to terminals 52 and 53. The output of the gate 114 which is associated with the reset (for $\overline{Q}$) output of the flip-flop 104 is also connected to the D input of the flip-flop 108. The gates 115 each have an input connected to a terminal 112, which provides a signal indicating that the current flowing through the motor 10 is not excessive. When this signal vanishes, the gates 115 are inhibited. The terminal 52 is connected to the photoisolator unit 54 of the driver circuit 16c illustrated in FIG. 2. The terminal 53, which carries the same signal as terminal 52, but in inverted form, is connected to the photoisolator circuit associated with the driver circuit 16f.

The delay units 114 associated with the flip-fops 106 and 108 are connected through network gates which accomplish the function of inverting the phase of the output signal, when desired. The two delay units 114 asssociated with the flip-flop 106 are connected to the one input each of the gates 118 and 120. The delay unit 114 which is associated with the set (or Q) output of the flip-flop 106 is also connected to the D input of the flip-flop 104. The other inputs of the gates 118 and 120 are connected to a terminal 121 which is energized when one phase sequence is desired, and which remain unenergized when the reverse sequence is desired. The gates 118 and 120 have their outputs connected through power gates 122 and 124 to terminals 126 and 128, respectively. The terminal 126 is connected to one input of the flip-flop 106 and to the photoisolator of the transistor driver circuit 16e, while the terminal 128 is connected to the input of the photoisolator 16d.

The output of the delay units 114 associated with the flip-flop 106 are also connected to one terminal each of gates 130 and 132. The delay unit 114 which is associated with the set (or Q) output of the flip-flop 108 is also connected to the D input of the flip-flop 106. The other input of the gates 130 and 132 are connected through an inverter 134 to the terminal 121. The gates 130 and 132 are connected to power gates 135 and 136, which in turn are connected to terminals 138 and 140. The terminal 138 is connected to the D input of flip-flop 104 and to the input of the photoisolator of the driver circuit 16d, while the terminal 140 is connected directly to the photoisolator of the driver circuit 16a. Accordingly, when the terminal 121 is not energized the gates 130 and 132 are effective to connect the signals (which otherwise would be connected to control the driver circuits 16b and 16e to instead control the circuits 16a and 16d.

Four additional gates are provided to connect the output of the flip-flop 108 to the remaining pair of driver circuits 16. Gates 142 and 144 each have one input connected to the output of the delay units associated with the flip-flop 108 and the other input connected to the terminal 121. Their outputs are connected respectively to power gates 135 and 136 to convey the output of the flip-flop 108 to the terminals 138 and 140 when the terminal 121 is energized. Gates 146 and 148 each have one input connected to the outputs of the delay units associated with the flip-flop 108 and another input connected to the inverter 135. Their outputs are connected to the power gates 122 and 124 to convey the signal produced by the flip-flop 108 to the terminals 126 and 128 when the terminal 121 is not energized. The terminal 112 is connected as a third input to all of the gates 18, 120, 130, 132, 142, 144, 146 and 148 to inhibit their operation when the motor current is indicated to be excessive by the lack of a signal at the terminal 112.

Referring to FIG. 8, the outputs of the three flip-flops 104, 106 and 108 are illustrated. As shown in the drawing, the output of the flip-flop 108 is the first to change state after an arbitrary point in time at the beginning of the graph. 60° later the flip-flop 106 changes its state and 60° after that the flip-flop 104 changes its state so that all three of the flip-flops 104, 106 and 108 are in the opposite state from the ones that were at the beginning of the graphs shown in FIG. 8. The flip-flops 108, 106 and 104 thereafter revert to their former states, as they switched 60° apart. The operation proceeds thereafter in the same way to generate a three phase square-wave signal, each of the three flip-flops producing inverted and noninverted output signals. It can thus be seen that a new three phase signal is instituted for each group of six pulses produced on the output line 94 of the counter 92, and a frequency which is dependent upon the software input to the terminals 98.

Figure 4:
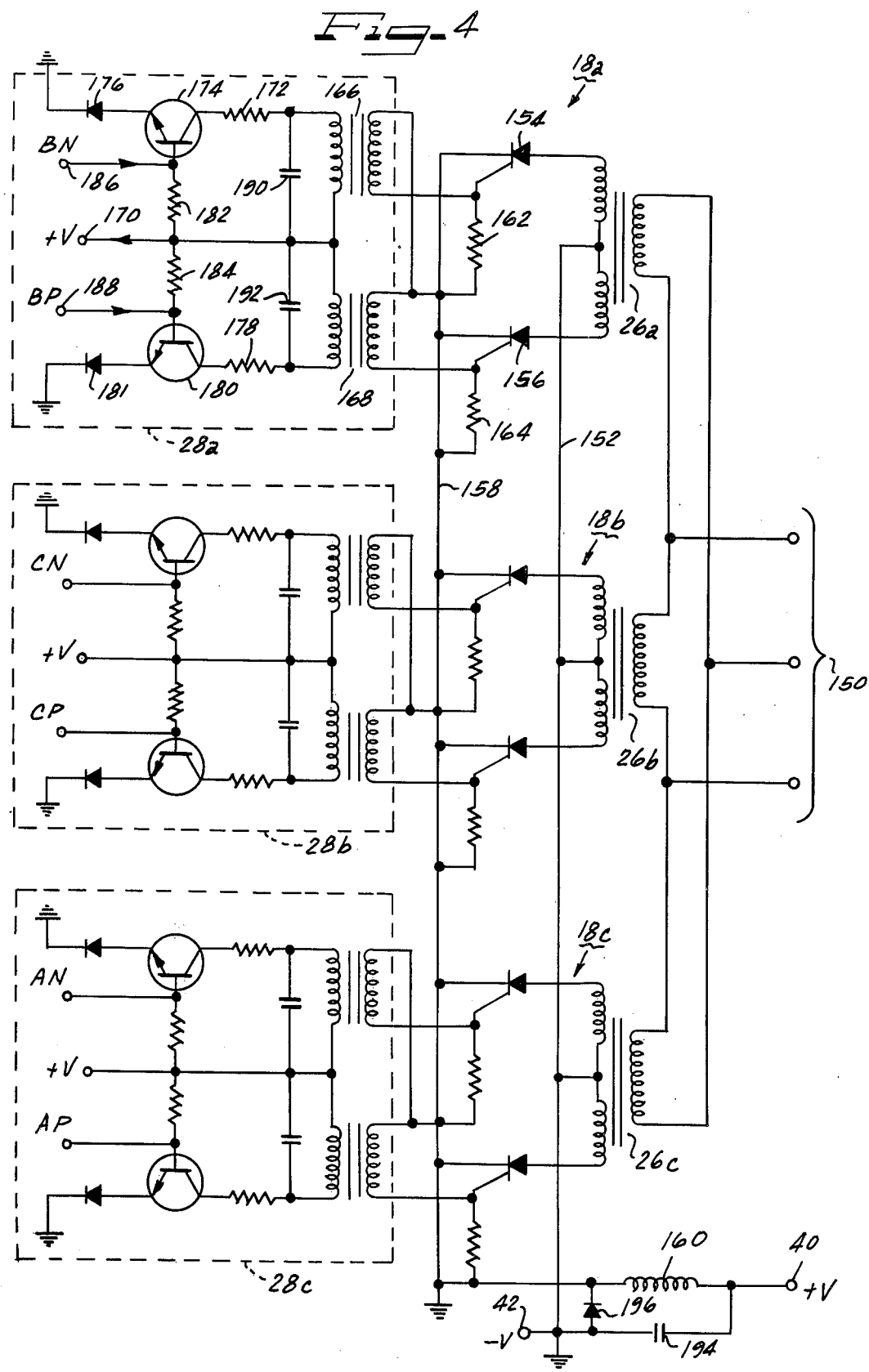
FIG. 4 is a schematic circuit diagram of the SCR trigger circuits illustrated in FIG. 1.

Referring now to FIG. 4, the SCR circuits 18a, 18b and 18c are illustrated, along with their respective transformers 26a, 26b and 26c, and their trigger circuits 28a, 28b and 28c.

The primaries of the transformers 26a, 26b and 26c are all connected to the three phase source 24, through terminals 150. As the cnstruction of the several SCR circuits and the transformers is identical in each case, only one phase will be described in detail.

The secondary of the transformer 26a is provided with a center tap which is connected to ground, and terminal 42, via a line 152. The end terminals of the secondary are connected respectively to the anodes of SCR's 154 and 156, the cathodes of which are both connected to a line 158, which leads through a choke 160 to the terminal 40, at which the d.c. voltage is presented to the power transistors 12, as described above. The gate of the SCR 154 is connected through a resistor 162 to the line 158 and the gate of the SCR 156 is connected to the line 158 by a resistor 164.

The resistor 162 is connected across the secondary of a transformer 166 and the resistor 164 is connected across the secondary of a transformer 168. The transformers 166 and 168 are both pulse transformers and form a part of the SCR trigger circuit 28a, by which the SCR's 154 and 156 are gated at the appropriate time. One terminal of the primary of the transformer 166 is connected between a terminal 170, which is connected to a positive source of voltage, and the opposite terminal of the primary of the transformer 166 is connected through a resistor 172, to the collector of transistor 174, the emitter of which is connected, through a diode 176, to ground. Similarly, one terminal of the primary of the transformer 168 is connected to the terminal 170 and the opposite terminal is connected through a resistor 178 to the collector of a transistor 180, the emitter of which is connected through a diode 181 to ground. The bases of the transistors 174 and 180 are connected to the terminal 170 through resistors 182 and 184, respectively. The positive voltage at the terminal 170 biases both of the transistors 174 and 180 normally conductive. The base of the transistor 174 is also connected directly to a terminal 186 so that a negative pulse, when presented at the terminal 186, cuts off the transistor 174. Similarly the base of the transistor 180 is connected directly to a terminal 188, so that a negative pulse at the terminal 188 cuts off the transistor 180. A pair of capacitors 190 and 192 are connected in parallel with the primary windings of the windings 166 and 168 in order to bypass current from the transformer windings when the transistors 174 and 180 are cut off.

In operation, pulses are applied alternately to the terminals 186 and 188 in predetermined phase relation to the signal presented at the terminals 150. The pulses cause the pulse transformers 166 and 168 to trigger their respective SCR's 154 and 156 on, after which the SCR's remain conductive for the remainder of the positive-going half cycle of its exciting voltage. The SCR's 154 and 156 are triggered on alternate half cycles so that they function as full-wave rectifier, furnishing to the line 158 a pulsating d.c. having an r.m.s. value dependent upon the times during each cycle at which the pulses are provided to the terminals 186 and 188. The choke 160 functions to smooth the voltage provided to the terminal 40, and a capacitor 194, connected between the terminal 40 and ground, also performs a smoothing function. A diode 196 is connected between the line 158 and in order to allow negative current to go to ground.

The two other trigger circuits 28b and 28c, associated with the transformers 26b and 26c, are triggered with signals which are 120° out of phase with each other, and also 120° out of phase with the pulses provided at the terminals 186 and 188. Accordingly, the two SCR's 154 and 156, and the other two pairs of SCR's which are similarly connected, together function as a three phase full-wave rectifier, and provide a relatively smooth d.c. potential at the terminal 40.

Figure 5A:
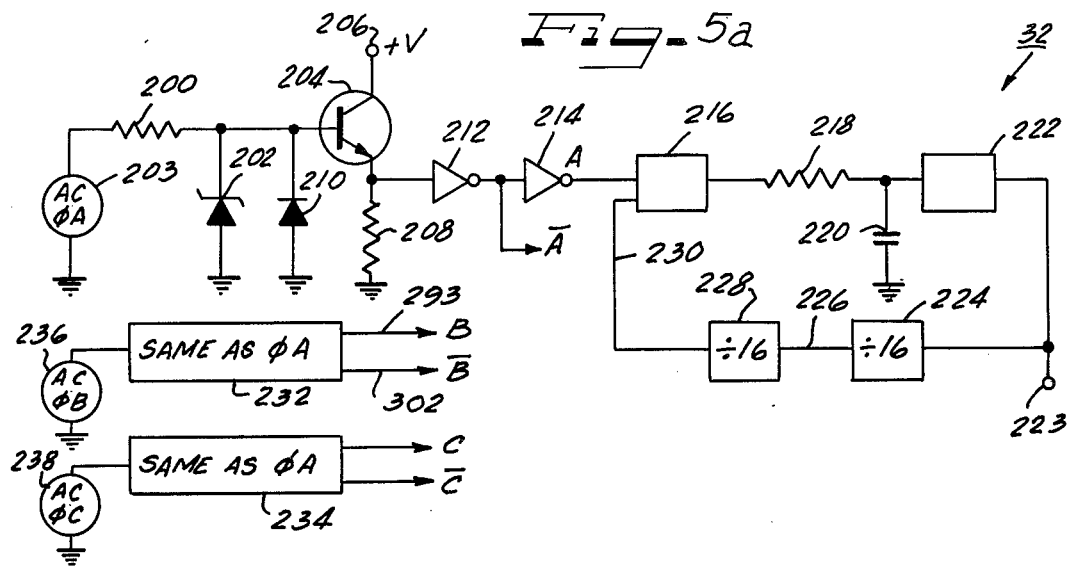
FIGS. 5a and 5b together form a schematic circuit diagram, partly in functional block diagram form, illustrating the oscillator, the firing angle control and the logic amplifier illustrated in FIG. 1.
Figure 5B:
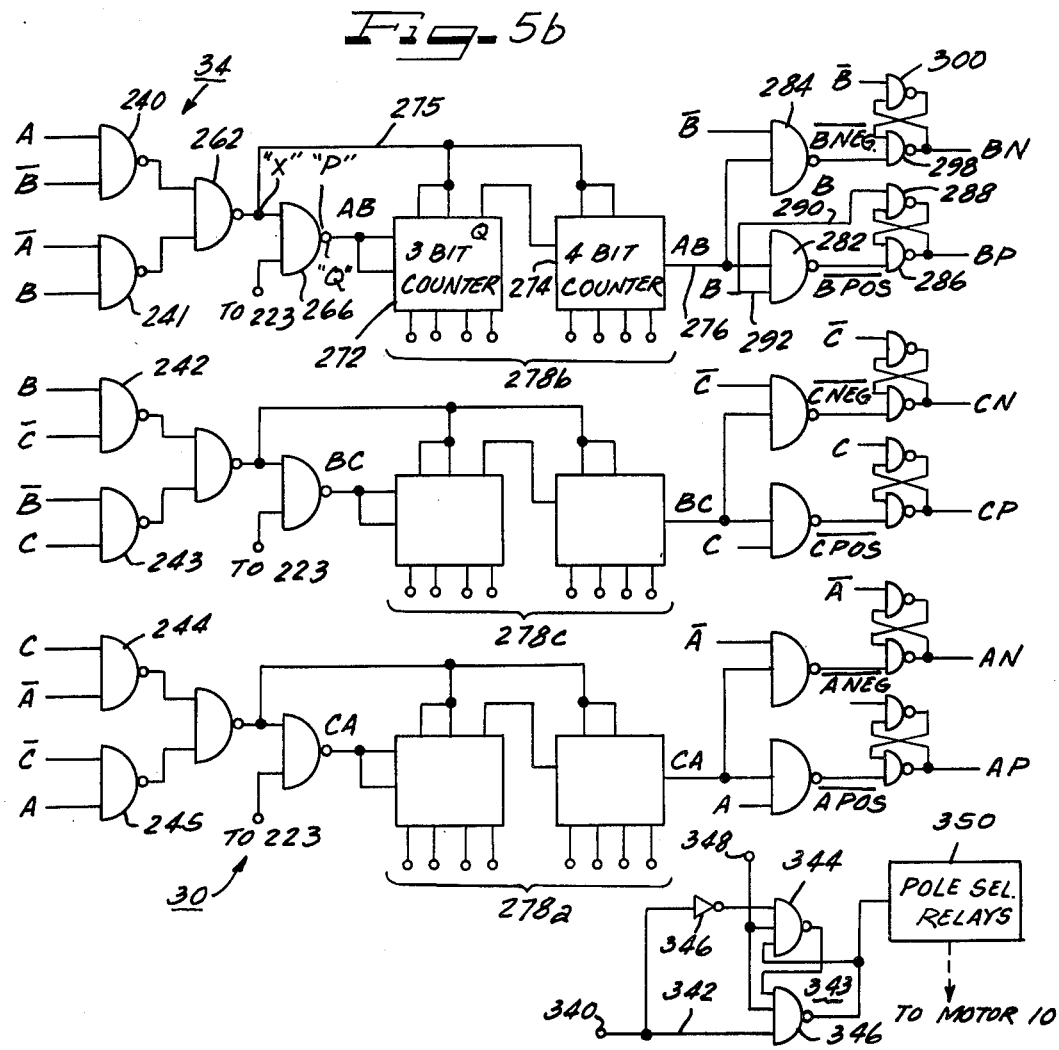

Referring now to FIGS. 5a and 5b, the oscillator 32 (FIG. 5a) and the logic amplifier 30 (FIG. 5b) are illustrated. These units function to generate the pulses which are provided to the terminals 186 and 188 of FIG. 4. The oscillator 32 is associated with a wave shaping circuit comprising a series connected resistor 200 and a zener diode 202, connected across a source 203 of a.c. line voltage at 60 Hz. The resistor 200 and the zener diode 202 drop the potential of the line voltage to the zener voltage and the waveform is squared. The output is then connected to the base of a transistor 204. The collector of the transistor 204 is connected to the positive terminal of a d.c. source, via a terminal 206, and its emitter is connected to ground via a resistor 208. The transistor 204 functions as a current amplifier, which is alternately cut off and saturated by the input to further square up the wave form. A diode 210 is connected between the base of the transistor and ground in order to clamp the negative-goint portion of the waveform at ground potential. The emitter of the transistor 204 is connected successivelly through a pair of inverting amplifiers 212 and 214. The output of the amplifier 214 constitutes a 60 Hz. square-wave, and the output from the amplifier 212 constitutes the identical signal, inverted in phase.

The output of the amplifier 214 is connected to one input of a phase detector 216, the output of which is passed through a low pass filter comprising a resistor 218 and capacitor 210, to the input of a voltage-controlled multivibrator 22, having an output terminal 223. The multivibrator 22 is designed to operate at a frequency of 15,360 Hz. and the voltage derived from the phase detector 216 permits the multivibrator 222 to operate at this frequency. A first counter unit 224 is connected to the output of the multivibrator 222, and functions to divide the pulse frequency by 16, producing an overflow pulse on the line 226 for every sixteen pulses produced by the multivibrator 222. A second counter unit 228 is connected to receive the pulses on the line 226 and divide their frequency by a further factor of 16, producing a pulse on an output line 230 for each 256 pulses of the multivibrator 222. The line 230 is connected as the second input to the detector 216. The output of the phase detector responds to the phase difference between its two inputs, and changes as necessary to stabilize the frequency and phase of the multivibrator 22 so that a constant phase difference is maintained between the two inputs of the phase detector 216. The output signal of the multivibrator 222 is, therefore, stabilized at 15,360 Hz. and locked in phase relative to the output of the amplifier 214. The phase detector 216 is preferably a unit such as MC 4044. The multivibrator 222 is preferably a unit such as MC 4024, and the counter units 224 and 228 are preferably units such as MC 4018, all of which are commercially available.

Two additional circuits 232 and 234 are provided, which circuits are identical to the circuit including the components 200–214 described above, but are instead connected to two phases 236 and 238 of 60 Hz. line voltage, respectively. The sources 236 and 238 are 120° out ocf phase with each other, and 120° out of phase with the signal produced by the source 204, so that circuits 232 and 234 form, with the outputs of amplifiers 212 and 214, a source of a three phase square-wave signal at a frequency of 60 Hz. The three phases are identified by the letters A, B and C. These outputs are connected in various combinations to a series of six gates 240–245 (FIG. 5b ), which form the SCR firing angle control 34. The logic amplifier 30, which is connected to the control 34, furnishes an output which is amplified to furnish the pulses to the terminals 186 and 188, as well as to corresponding terminals of the two other SCR trigger circuits 28 (FIG. 4). The operation of the logic amplifier 30 will be explained with reference to FIG. 6, which is a graph of various waveforms developed in order to produce the pulses for triggering the SCR's.

Referring to FIG. 6, waveform 246 is an illustration of the output of the amplifier 214 and waveform 248 illustrates the output of the amplifier 212. Waveforms 250 and 252 represent the inverted and noninverted outuputs from the circuit 232, and waveforms 254 and 256 represent the inverted and noninverted outputs from the circuit 234. These outputs form a three phase square-wave signal, each phase spaced the other two by 120°, as illustrated in FIG. 6. Waveform 258 illustrates the output of the gate 240 (FIG. 5b) and waveform 260 illustrates the output of the gate 241. Both of these outputs are connected as inputs to a gate 262, which produces at its output illustrated by waveform 264.

The output of the gate 262 is connected to one input of a gate 266, the other input of which is connected to the ouput of the multivibrator 222 via terminal 223. The waveform 268 illustrates the signal produced by the multivibrator 22. The output of the gate 266 is represented by the waveform illustrated at 270, comprising the positive-going portions of the waveform 264 modulated with the 15,360 Hz. signal. The waveform 270, present at the output of the gate 266, is applied to the input of a three bit binary counter 272, the function of whih is to divide the pulse frequency by 8. The output of the counter 272 is connected to a four bit binary counter 274, which divides by 16 the frequency of the pulses produced at the output of the counter 272.

The output of the gate 262 is connected by a line 275 to the reset inputs of the couners 272 and 274, so that both counters are reset to zero each time the output of the gate 262 assumes its lower value, which persists for the first 60° of each half cycle of the B phase. Accordingly, the counters 272 and 274 begin counting the pulses from the multivibrator 222 at 60° following the initiation of each half cycle of the B phase, and continue counting to the end of that half. cycle. When the counter 274 overflows, a single pulse is produced, corresponding to one pulse from the multivibrator 22, as shown in the waveform 280. The instant during each half cycle when the output pulse is produced, depends on the state to which the counter 272 and 274 are preset, via terminals 278b. The presetting occurs in each cycle during the 60° when no counting is performed. If the counters 272 and 274 are preset with the quantity binary 127, the first pulse from the gate 262 causes an overflow, and the output pulse is produced at the 60° point of each half cycle. If the counters 272 and 274 are preset with the quantity binary 45, eighty three pulses must be counted before the overflow pulses is produced during each half cycle, and so it comes near the end of each half cycle. Intermediate results are produced when intermediate quantities are preset into the counters 272 and 274, in the same manner as described in reference to the counters 90 and 92 (FIG. 3).

The waveform 280 (FIG. 6) illustrates the output from the counter 274, which is made available on the line 276. It comprises a series of positive-going pulses having a pulse repetition rate of 120 Hz., and the pulses are each equal in width to one pulse at the 15,360 Hz. frequency. The line 276 is connected to one input of each of the two gates 282 and 284, the other inputs of which are connected respectively to the inverted and non inverted B phase outputs of the circuit 232, which outputs are illustrated by the waveforms 252 and 250, respectively (FIG. 6). The output of the gate 282 is connected to one input of a gate 286, which is cross-coupled with another gate 288 so that the output of each of the gates 286 and 288 is connected to one input of the other gate. The other input of the gate 288 is connected via a line 290 to the line 292 leading to one output 293 of the circuit 232. Accordingly, the signal produced at the output of the gate 282 is a series of alternate pulses of the waveform 280, and is illustrated by waveform 294. The pulses which are deleted from the waveform 280 occur when the waveform 250 is relatively negative when the gate 282 is inhibited.

The circuit including the gates 286 and 288 functions as a flip-flop which is set by the pulses passed by the gate 282 and reset by the trailing edge of the waveform 250 via the line 290. The result is the waveform 296 illustrated in FIG. 6. This waveform is identified as the BP signal, and is so named because it triggers the positive half of the B phase. The leading edges of the pulses in the waveform 296 each coincide with pulses in the waveform 294, during the positive-going portion of the B phase, and their trailing edges coincide with the end of that half cycle, as illustrated in FIG. 7. Such is the signal applied to the terminal 188 of the circuit illustrated in FIG. 4.

The gate 284 is connected to one input of another flip-flop comprising gates 298 and 300, the other input of which is connected to the inverted B phase output line 302 of the circuit 232. The output of the gate 284 is like the waveform 294, having a pulse repetition rae of 60 Hz., except that the alternate pulses of the waveform 280 whih were deleted in deriving the waveform 294 are restored and the pulses present in the waveform 294 are deleted instead. By this mean the BN signal (meaning the control signal for the negative-going half cycle of the B phase) initiates 180° after the BP signal and continues to the end of its half cycle. This signal is applied to the terminal 186 of the circuit shown in FIG. 4. As a result, the SCR trigger ciruit is energized by the pulses applied to the terminals 186 and 188, such pulses being about 180° apart (relative to a 60 Hz. signal), and have their leading edges occurring at a time depending uppon the count preset into the counters 272 and 274.

The logic amplifier 30 comprises two additional circuits for the remaining two phases, which are identical to the circuit already described above incorporating the counters 272 and 274. Identical counters are provided for the other two phases and they are preset to the same states as the counters 272 and 274 during the initial 60° of each half cycle of their respective phases, via 278c and 278a. The signals which are produced at their outputs, and which are connected to the control terminals of tthe SCR trigger circuits 28b and 28c, are formed in identical manner, relative to their phases. Accordingly, the SCR's of the circuits 18 are all fired at about the same point relative to their respective phases, and each contribute approximately an identical amount to the voltage between terminals 40 and 42. The magnitude of that d.c. voltage varies in magnitude in accordanc with the count preset in the several counters.

One additional terminal 340 is shown in FIG. 5b, and the terminal 340 is connected, via a line 342, to one input of a flip-flop 343, formed by cross-coupled gates 344 and 346. The other input to the flip-flop 343 is connected from the terminal 340 thrugh an inverter 346. Each of the gates 344 and 346 have a third input connected in common to a terminal 348, which furnishes a clock pulse at the same time a signal is presented to the terminal 340. Therefore, the flip-flop 343 is set in one or the other of its states, dependent on whether the input to the terminal 340 is relatively high or low, and remains in that state until the next clock pulse. An output of the flip-flop 343 is connected to a set of pole selecting relays 350 associated with the motor. The pole selecting relays 350 have their contacts connected with the motor windings to normally connect the motor in eight pole-three phase configuration, but when the relays 350 are energized by the flip-flop 343, the motor is changed to a four pole-three phase configuration. The terminal 340 is energized in accordance with a pole selecting bit PS when rapid traverse operation is desired, as more fully described hereinafter.

Figure 9:
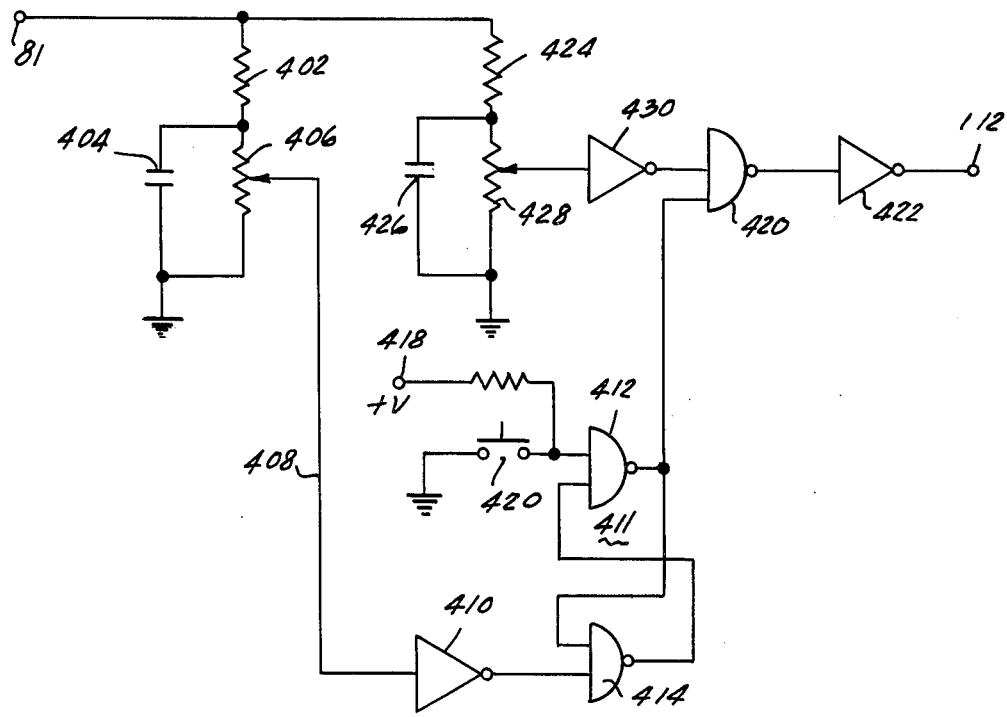
FIG. 9 is a functional block diagram, partly in schematic circuit diagram form, of apparatus for protecting against an over current condition.

Referring now to FIG. 9 there is illustrated a schematic diagram, partly in functional block diagram form, showing the overcurrent protection circuit 38, of FIG. 1. The terminal 81 (which is connected to the resistor 79, FIG. 2) is connected through a network including a resistor 402 and a capacitor 404 to ground. A potentiometer 406 is connected across the capacitor 404 and its tap is connected by a line 408 through an inverter 410 to one input of a flip-flop 411, formed by cross-coupled gates 412 and 414. The output of the inverter 410 is connected to the free input of the gate 414. The free input of gate 412 is connected via a resistor 416 to a source of positive voltage at a terminal 418. A normally open push button switch 420 is connected from the free input of the gate 412 to ground.

In operation, the flip-flop 411 is placed into the one of its stable states in which the output of the gate 412 is relatively high, by momentarily depressing the push button 420. Thereafter the flip-flop 411 will be maintained in that state until it is triggered by the occurrence of a voltage at the terminal 81 which is higher than the threshold value. The value is selected, by adjustment of the potentiometer 406, to correspond to the current through the motor which is considered excessive. When this current is exceeded a relatively high voltage is produced on the line 408 which, after being inverted by the inverter 410, triggers the flip-flop 411 causing the output of the gate 412 to switch to its relatively low condition.

The output of the gate 412 is connected to one input of a gate 420, the output of which is connected through an inverter 422 to the terminal 112 (also shown in FIG. 3). As long as the output of the gate 412 is high the voltage at the terminal 112 remains high. When the excessive current threshold is exceeded, however, the flip-flop 411 maintains the voltage level at the terminal 112 relatively low, thus inhibiting the operation of the transistor drivers 16 until the push-button switch 420 is reset.

The terminal 81 is connected through another network including a resistor 424 and a capacitor 426 to ground. A potentiometer 428 is connected in parallel with the capacitor 426, and its tap is connected through an inverter 340 to a second input of the gate 420. The circuit including the potentiometer 428 forms another threshold setting circuit for overcurrent protection. If the voltage level at the terminal 81 exceeds a threshold value set in accordance with the position of the tap of the potentiometer 428, the potential presented to the gate 420 by the inverter 430 falls, causing the output of the gate 420 to rise, to lower the potential at the terminal 112 and inhibit operation of the drivers 16.

Exceeding the level established by the potentiometer 428 does not result in triggering the flip-flop 411, so that the circuit including the potentiometer 428 functions to disable the power transistor drivers only during the occurrence of excessive motor current as indicated by the potential on terminal 81.

The time constant of the circuit including the potentiometer 428 is made relatively short. The circuit including the potentiometer 406 and capacitor 404 has a longer time constant so that this circuit is effective to trigger the flip-flop 411 only if the overcurrent condition persists for a minimum length of time. Accordingly, the circuit including the potentiometer 428 reacts to short term high current conditions whereas a long term high current condition, signifying a serious fault, trips the flip-flop 411 to shut down the system until it is reset by the push button 420. In this manner the system is protected from excessive current during short term transient conditions, and normal operation is restored after the transient current condition terminates.

Figure 10:
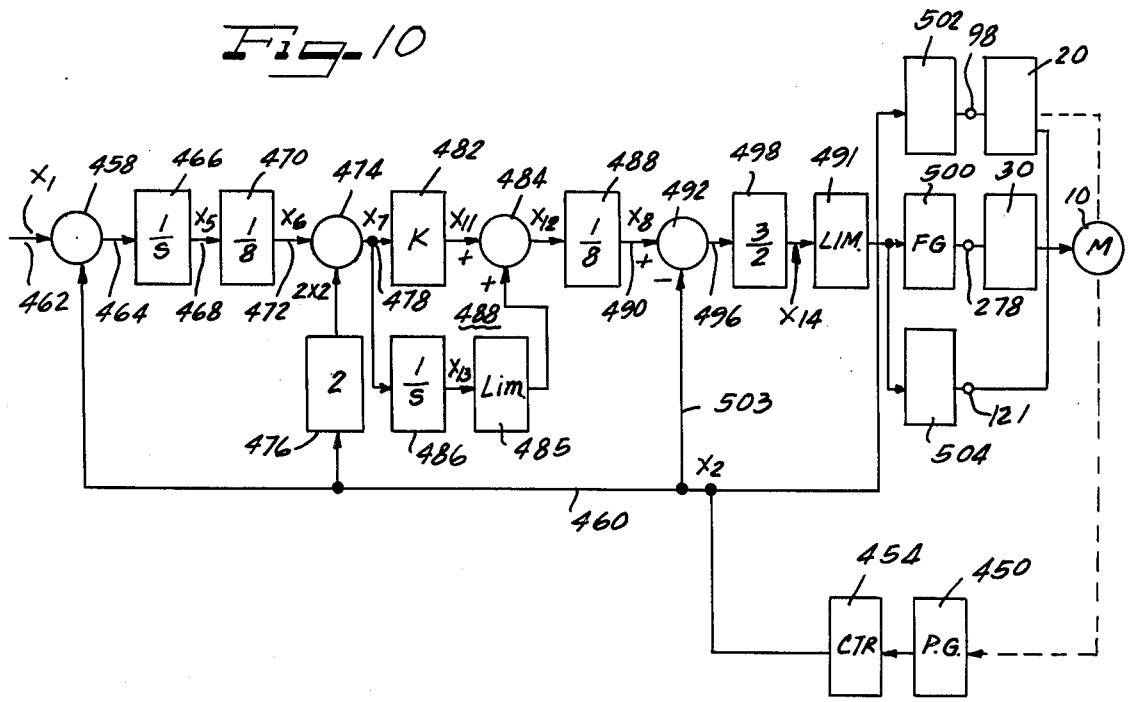
FIG. 10 is a flow chart illustrating the operation of a servo system incorporating the invention and employing the apparatus of FIG. 1.

Referring now to FIG. 10 there is shown a flow chart illustrating the operating processes of a servo system employed with the present invention. A pulse generator 450 is associated with the motor shaft to generate pulses on a line 452 in accordance with the motor speed. The pulses are applied to the input of a counter 454 which accumulates the pulses and maintains an indication of the current position of the drive associated with the motor shaft. The pulse generator 450 preferably produces a large number of pulses for each revolution of the motor shaft, by optical means, for example, in order to provide good resolution in determining the position of the motor shaft at any given time. 1600 Pulses for each shaft revolution has been found to operate successfully, but a larger number per revolution may be employed if greater resolution is desired. Alternatively, the pulse generator 450 may comprise a shaft-position encoder by which the shaft position is indicated directly by optical observation of marks on a number of concentric tracks of a disk coupled to the motor shaft, the marks being coded in accordance with the well known Gray code.

The contents of the counter 454 are periodically examined, and the difference between the contents of the counter on two successive interrogations viz., X2, is representative of the distance traversed by the slide or other mechanism driven by the motor shaft in the period between successive interrogations. The quantity X2 is passed to a summing register 458 over a line 460. The line 460, as well as the other lines of FIG. 10, are representative of communication flow paths, and do not necessarily correspond to a single line in the physical apparatus. The summing register 458 receives as a second input the numerical control command pulses (X1) via an input line 462. The sum of the command pulses on the input line 462 depends on the type of NC unit being used, but in any case prescribes the movement of the motor shaft during the next time period, that is, during one period between successive interrogations of the counter 454. Preferably, such interrogations are made at the rate of about 120 per second, or every 8.3 milliseconds, with a series of command pulses being furnished on the line 462 also every 8.3 milliseconds.

The output of the summing register 458 is made available on an output line 464 which is connected to the input of an integrator 466. The summing register 458 calculates the difference between its two inputs and adds the difference to the sum previously stored in the integrator 466. As a result, the content of the integrator 466 corresponds to the following error, i.e., the difference between the position called for by the NC program at any given time, and the actual position of the motor shaft, as revealed by the signals on the line 460. In another sense the contents of the integrator 466 may be called the accumulated position error, as it is the sum of the incremental position errors calculated during each 8.3 millisecond period.

The output of (X5) the integrator 466 is connected via a line 468 to a scaler 470, the output (X6) of which is supplied to a line 472. The scaler 470 functions to produce a signal representative of the following error multiplied by an appropriate factor, so that the signal on the line 472 is representative of the desired velocity or commanded velocity of the motor. In the example illustrated in FIG. 10, the following error is divided by 8 to derive the velocity command. This figure is selected in accordance with the desired performance characteristics of the system.

The velocity signal on the line 472 is connected to one input of a summing register 474, and another input to the summing register 474 is connected from the line 460 through a scaler 476. The scaler 476 serves to multiply the quantity represented X2 by a factor of 2. The factor for the scaler 476 is selected in accordance with the desired performance characteristics of the system. The summing register 474 calculates the difference between the velocity command signal X6 and the output KX2 of the scaler 476, so that the output (X7) of the summing register 474, made available on the line 478, represents the incremental velocity error of the system.

The output X7 of summing register 474 is connected by the line 478 to the input of a lead-lag network 480. The function of the lead-lag network 480 is to produce a variable amplification of the signal derived by the summing register 474. A scaler 482 is connected from the line 478 to one input of a summing register 484 and an integrator 486 is connected from the line 478 to a second input of the summing register 484 through a limiter 485. The summing register 484 adds the signals on its two inputs to derive a composite signal at its output. The unit 486 functions in the nature of a low pass filter to increase the gain of a system when the signal on the line 478 represents a slowly changing value, but the limiter 485 applies a maximum value to the gain. In this way, the system response is made greatest at low frequencies, i.e., when the rate of change of the velocity error signal is low.

The output of the summing register 484 is passed through a scaler 488, which divides the quantity represented by the signal produced by the summing register 484 by a factor of 8. The line 490 is connected to one input of a summing register 492, and the other input of the summing register 492 is connected from the line 460 by line 503. The signal on the line 503 represents the actual velocity of the motor and the difference, which is made available on the line 496, is representative of the desired change in motor torque. The line 496 is connected through a scaler 498 and then through a limiter 491 to a function generator 500 which generates the signal which is applied to the terminals 278 of the logic amplifier 30 in order to control the amplitude of the voltage applied to the motor 10.

This is accomplished by way of calculation of an output quantity according to some mathematical relation. Alternatively, a table-look-up operation may be employed.

Figure 11:
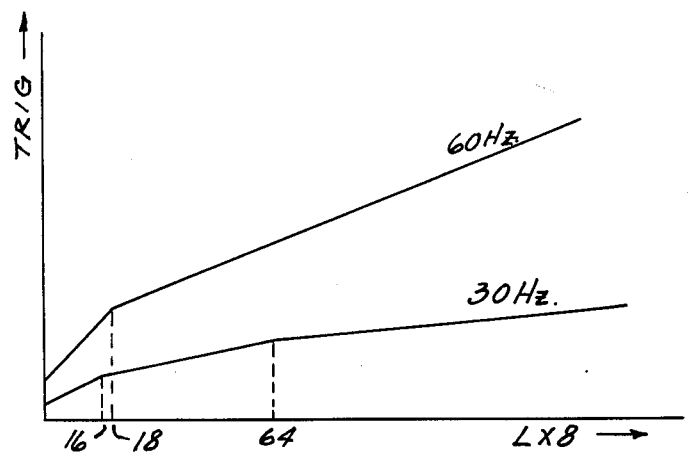
FIG. 11 is a graph of an empirical relationship employed in the apparatus of FIG. 10.

FIG. 11 represents a graph of the relation between the signals applied to the terminals 278 during each cycle, as a function of the output of the scaler 498. Two curves are shown: one for 30 Hz. operation and the other for 60 Hz. operation. In this manner, the amplitude of the driving voltage applied to the motor 10 is regulated in accordance with the output of the summing register 492 in accordance with the relation (FIG. 11) established by the function generator 500.

The frequency of the a.c. power is controlled by a unit 502, which sets the counters 90 and 92 (FIG. 3) during each cycle to the appropriate value. The frequency is chosen on the basis of the value X2, conveyed to the unit 502 from line 460 over the line 503. When the value of X2 indicates that the motor 10 is turning at a slow speed, 30 Hz. is selected, and 60 Hz is selected when the angular velocity of the motor 10 is large.

A unit 504 examines the sign of the quantity produced at the output of the scaler 498, and produces a signal on the terminal 121 (FIG. 3) in accordance with this information, so that the motor 10 is energized in the proper direction.

The relation, illustrated in FIG. 11, for varying the voltage established by the SCR's 18 is established empirically to achieve the best operation of the motor 10 in terms of characteristics of response, maximum efficiency and minimum heating. The precise values and shape of the curves for each frequency depends upon the individual characteristics of the motor 10, but the shapes of the curves of FIG. 11 are considered to be nearly optimum. As shown by the curves, for low values of the signal presented to the function generator 500 by the scaler 498, the slope of all of the curves is great, with a lesser, positive slope for higher input values.

Figure 12:
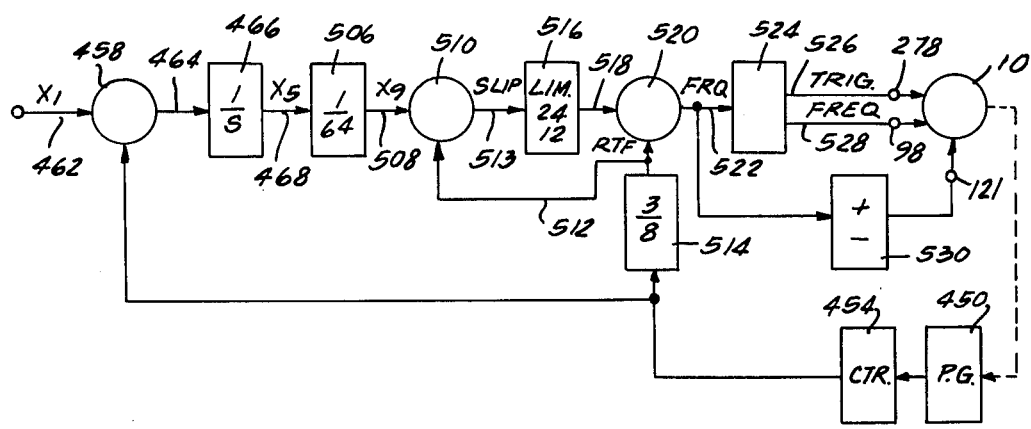
FIG. 12 is a flow chart illustrating the operation of a servo system incorporating the apparatus of FIG. 1 used in the rapid traverse mode.

Referring now to FIG. 12, there is illustrated a flow chart describing how the operation of the flow chart of FIG. 10 is modified when a rapid traverse mode of operation is selected. The pulse generator 450 and its associated counter 54 and scaler 456 are identical to that shown in FIG. 10, as is the summing register 458 and the integrator 466 connected to the output thereof. After the integrator 466 however, a different scaler 506 has its input connected to the line 468 leading from the output of the integrator 466. The scaler 506 divides the quantity X5 represented on the line 468 by a factor of 64 and passes its output (X9) to a line 508. The value of X9 on the line 508 represents the desired stator frequency of the motor 10.

The line 508 is connected to one input of a summing register 510, the other input of which is connected by a line 512 from the line 460 through a scaler 514. The scaler 514 modifies the quantity represented on the line 460 by a factor such that the signal RTF on the line 512 represents rotor frequency. The summing register 510 calculates the difference between the values represented by signals on the lines 508 and 512 and its output is connected to a line 513. Accordingly, the significance of the signal on the line 513 corresponds to the desired or commanded slip of the motor.

The line 513 is connected to the input of the limiter 516 which functions to limit the amount of commanded slip represented by the signal present on the line 512 and supplies the limited signal to the output line 518. The line 518 is connected to one input of a summing register 520 which has another input connected to the line 512 which carries the output of the scaler 514. As the signal RTF on the line 512 corresponds to the rotor frequency, the signal FRQ on the output line 522 corresponds to the commanded stator frequency, with the slip limited as a result of operation of the limiter 516, in order to limit the slip to approximately the value which gives maximum torque and also to limit motor heating.

The line 522 is connected to the input of a function generator unit 524 which determines the signals to be applied to the voltage and frequency controlling counters of the apparatus of FIG. 1, so as to control the motor 10 with the proper combination of frequency and voltage. This relationship is illustrated diagramatically in FIG. 12 by means of a line 526 connected between the unit 524 and the motor 10, signifying control of the voltage applied to the motor 10, and the line 528 extending from the unit 524 to the motor 10, signifying control of the frequency of the driving voltage applied to the motor 10. A unit 530 calculated the sign of the direction of rotation from the signal present on the line 522 and applied it via the line 532 to the motor 10 (via the terminal 121 of FIG. 3). In the apparatus of FIG. 12 the frequency is permitted to rise to 90 Hz. when the rapid traverse mode is selected.

Figure 13:
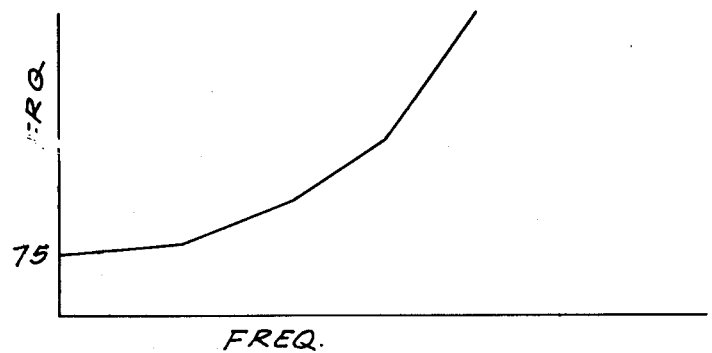
FIG. 13 is a graph of an empirical relationship employed in the apparatus of FIG. 12.

The frequency of the driving voltage selected by the unit 524 is determined by the relationship illustrated in FIG. 13. FIG. 13 shows a graph of the quantity furnished to the terminals 98 (FIG. 3) in relation to the FRQ signal on the line 522. The particular form of the graph is adapted to cause the circuit of FIG. 3 to select a frequency for the power applied to the motor 10 which is proportional to the FRQ signal. Of course, if a different relationship is desired between the FRQ signal and the frequency applied to the stator, the function generator unit 524 may be modified accordingly.

Referring now to FIGS. 14 to 25, the programs which are carried out by a computer to perform the operations illustrated in the flow charts of FIGS. 10 and 12 are illustrated. The first program which is executed is the INIT program, by which the computer is initialized in order to perform the calculations necessary to the proper operation of the servo system.

In the first program step 509, the quantity X5 (meaning output of the integrator 466) is set to 0. In like manner, X13 (meaning the output of the integrator 486) is also set to 0. In addition, counter No. 1 and counter No. 2, which are transition counters which will be described hereinafter, are set to 0, and the quantity HYST is also set to 0. The use of the contents of the counters No. 1 and No. 2 and the use of the quantity HYST will be described more fully hereinafter.

In the second program step 511, control passes to the subroutine SVIN. In the SVIN routine (FIG. 17), the content of the counter 454 is read for the first time in step 513, and stored in the accumulator in step 515. As understood by those skilled in the art, the accumulator is the portion of the computer where arithmetic functions are performed. Parameters are added by entering them successively into the accumulator, which then represents the sum of the parameters so entered.

Control is then returned, by step 517, to the INIT program at the point where it was left, and in the succeeding step 519, the reading of the counter 454 is negated, by which the complement of the quantity read from the counter 454 is derived, so that a subtraction can be performed by adding the complement to another number. In the next step 521, the content of the accumulator (namely the complement of the number read from the counter 454) is stored in a memory location designated XOLD, from which it can be made available later. In the next step 523 the clock generator of the system is enabled so that a pulse is produced each 8.3 milliseconds (or 120 times per second, corresponding to each half cycle of a 60 Hz. frequency). In the next step 525 an interrupt flag is turned on, to signify the INIT program has been completed, and control is delivered to the executive program illustrated in FIG. 15. The function of the interrupt flat is to recognize a clock pulse signifying the beginning of a new period, and to thereupon interrupt the computer to cause it to perform additional program steps at that time.

Referring to FIG. 15, the executive program consists of program steps 527, 529 and 531, which are executed repeatedly, with control passing from program step 531 to the program step 527 so that the program steps can be executed on a cyclical basis. The steps of the executive program cause the computer to perform other computations and other programs not involving the present invention. The executive program is not limited to three steps, as any number may be performed in the course of other programs. The present invention calls upon the computer to execute its programs when a clock pulse is recognized, in which case the normal sequence of events of the executive program is interrupted to permit the calculation of the various parameters which are required in the operation of the present invention. The occurrence of a clock pulse (at 8.3 millisecond intervals) interrupts the executive routine and passes control to the X-SERVO program (illustrated in FIG. 16).

The first step 532 of the X-SERVO program causes the X1 parameter to be read in from the NC unit, signifying how far the motor 10 is to be advanced forward (or backward) in the next 8.3 millisecond period. When backward movement is represented by X1, it arrives from the NC unit in complemental form, so that its addition to another quantity effects its algebraic subtraction, The content of the accumulator, namely, the X1 quantity, is stored in memory by the step 536 and control passes to the SVIN routine in step 538. The SVIN routine (FIG. 17) is performed in the same manner which has already been described, to read in a new reading from the counter 454, and control then returns to the X-SERVO program at step 540, in which the content of the accumulator (viz., the new reading from the counter 454) is stored in memory at location XNEW; control then passes to the SERVOS program (FIG. 18).

In FIG. 18 the first step 542 of the SERVOS program brings the XNEW quantity from storage into the accumulator. This is the quantity which was stored in memory by means of step 540. In step 544 the quantity is negated, and then it is returned to memory at a different location by step 546. In step 548 the difference between XNEW and XOLD is computed and control passes to step 550. By means of the step 550 the contents of the storage location specified in step 546 and the accumulator are swapped so that the negated version of XNEW is placed in the accumulator and the difference which is calculated in step 548 is returned to the storage in the location as specified in the step 546. Control passes to the next step 552 by which the negated XNEW quantity is placed in memory at the location XOLD, to form an updated quantity for XOLD, which is called out of storage for use in a subsequent computation. The difference which is calculated in the step 548 is transferred by the step 554 to memory location X2, and control passes to step 556. In 556 two times X2 is calculated and stored in memory, and control passes to step 562 where the quantity X5 is calculated, which is equal to X1 minus X2 plus the contents of memory location X5. By this means the quantity X5 is the accumulation of incremental position errors. Control then passes to step 564 where the content of the accumulator is stored in memory location X5. In the next step 566 quantity X13 is calculated to be equal to ⅛ of X5 minus two times X2 plus the content of memory location X13. In the next step 568, the contents of the accumulator (viz. X13) is limited to plus or minus 2047 to keep the quantity X13 within the eleven binary bit capacity of this portion of the computer. In the step 570 the content of the accumulator (the limited value of X13) is placed into memory at storage location X13.

In the next step 571 the quantity X7 is calculated to be equl to ⅛ of X5 minus 2 times X2. Control then passes to step 572 in which X11 is calculated as equal to X7 multiplied by a constant K. Control then passes to step 573, in which X8 is calculated as being the sum of ⅛ of X11 plus ⅛ of X13, after which control passes to step 575. In step 575, the quantity X14 is calculated to be equal to 3/2 (X8 − X2) and then the value of X14 is limited in step 574 to plus or minus 64. Then control passes to step 576, in which LX14, the limited value of X14 as determined by the step 574, is stored in memory. In the next step 578, the LX14 value is inspected as to sign. If the sign is negative, the quantity is negated in step 580 (to give a quantity equal to the absolute value of LX14) and control passes to step 582. If the quantity LX14 is positive, control passes directly to step 582, in which the content of the accumulator, viz., the absolute value of X14, is stored in memory.

In the next step 584 the absolute value of X2 is added to the quantity HYST, which as described above is initially 0, and the sum is compared to the quantity 65. If the sum is equal to 65, control passes to the CYC 30 program over the branch 586. If the quantity is equal to, or greater than 65, control passes over branch 588 to the step 590 in which the sum is compared with the quantity 160. If the sum is less than 160, control passes to the CYC 60 program over branch 592, whereas if the sum is equal to or greater than the quantity 160 control passes over the branch 594 to the RT (rapid traverse) program.

Figure 20:
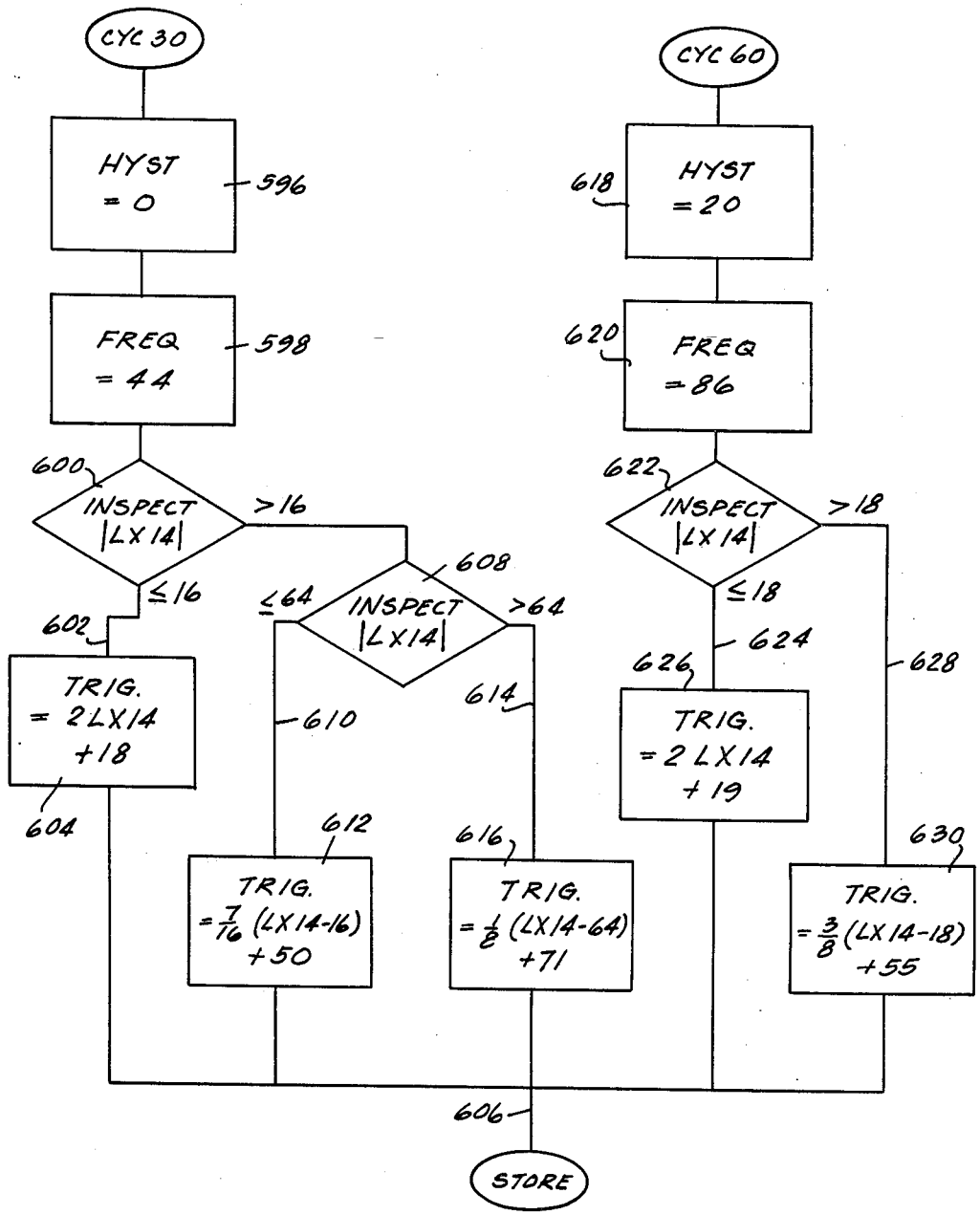

Assuming that the sum calculated in step 584 is less than 65, control passes to the CYC 30 program illustrated in FIG. 20. In the first step 596 the HYSt quantity is set to 0 and control passes to step 598, where the quantity FREQ is set to 44, after which control passes to step 600.

In step 600 the limited quantity LX14 (absolute value) stored in step 582 is withdrawn from memory and compared with the quantity 16. If the value of LX14 is less than, or equal to 16, branch 602 is selected and step 604 is performed, by which a value is calculated for TRIG to be equal to two times LX14 plus 18. Thereupon, control passes to the STORE program via branch 606. If the quantity compared in step 600 is greater than 16, control passes to step 608 which makes a further comparison is LX14 with the quantity 64. If the sum is less than, or equal to 64, branch 610 is selected and step 612 performed to determine a different value for the quantity TRIG, viz., 7/16 (LX14 − 16) + 50. If the sum is greater than 64, branch 614 is selected and step 616 is performed calculating a value for TRIG by a third formula, viz., 1/8 (LX14 − 64) + 71. The three values for TRIG, calculated as a function of LX14 value, perform a calculation of the ordinate of the curve illustrated in FIG. 11 (for the 30 Hz. curve), as a function of the abscissa LX14. The program of FIG. 20 in effect breaks the curve into three segments of constant slope.

If, as a result of steps 584 and 590, the branch 592 is selected, control passes to the CYC 60 program and step 618 is performed next after step 590. In step 618, the quantity HYST is set to equal 20 and the quantity FREQ is set to equal 86, in the following step 620. The quantity FREQ is the number set in the counters 90 and 92 (FIG. 3) which determine the frequency of the power applied to the motor. The step 598 of the CYC 30 program sets these counters to binary 44, which gives 30 Hz. operation. The step 620 sets them to 86, which gives 60 Hz. operation.

Following step 620, step 622 examines whether the quantity LX14 is greater or less than the quantity 18. If it is less than, or equal to, 18 the branch 624 is selected and step 626 is performed to calculate a value for TRIG equal to two times LX14 plus 19. Otherwise, the branch 628 is selected and step 630 is performed to calculate a different value for TRIG, viz., ⅝ (LX−− 18) + 55. The steps 626 and 630, in which the value of TRIG is calculated, perform a computation of the equation illustration in FIG. 11 for the 60 Hz. frequency. The calculation breaks the curve into two segments of constant slope.

If, as a result of step 590, the branch 594 is selected, the rapid traverse RT program is entered, which will be described in more detail hereinafter.

Following the calculation of TRIG by one of the steps 604, 612, 616, 626 and 630, the STORE program (FIG. 21) is entered. In the first step 632, the quantity X14 is examined and, if it is negative, step 634 is performed to select a binary 1, signifying that the direction of rotation of the motor 10 is to be reverse, and control passes to step 636. If X14 is positive, control passes immediately to step 636, inherently selecting a binary zero for the direction bit. The step 636 stores the direction bit in memory, and passes control to step 638.

In step 638, the counter No. 2 is set to equal minus 5, and the sign of the counter No. 1 is examined in step 640. If the quantity in counter No. 1 is positive, branch 642 is selected, by which control passes directly to the SET program. Otherwise, branch 644 is selected in which other operations are performed before the SET program is entered.

Figure 22:
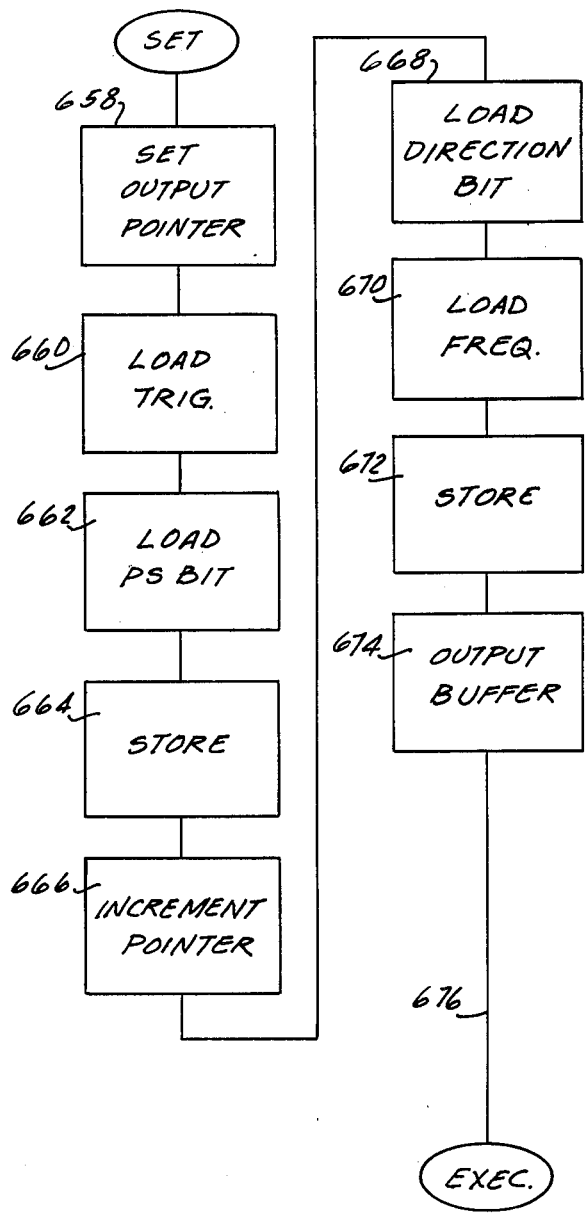

When the branch 644 is selected, the next step 646 causes the content of the counter No. 1 to be incremented by 1. In the next step 648 the sum of the content of counter No. 1 plus 2 is examined as to sign. If it is positive, branch 650 is selected and step 652 is performed which sets the PS bit equal to 0. Otherwise, the branch 654 is selected and step 656 is performed which sets the PS bit equal to 1. The PS bit determines the configuration of the motor 10. Eight pole operation is signified by a PS bit of 0, and four pole operation is indicated by a PS bit of 1. Four pole operation is employed in the rapid traverse mode. When the branch 642 is selected, the PS bit remains at zero without having to be set. After the step 652 or 656, control passes to the SET program (FIG. 22).

The first step 658 of the SET program sets an output pointer, which identifies a storage address in the buffer storage location of the main memory. The next step 660 loads the quantity TRIG into the accumulator, and in the next step 662, the pole selecting bit, PS, calculated in step 652 or 656, is also loaded into the accumulator at a location not occupied by the TRIG value. In the next step 664, the content of the accumulator, which now contains the TRIG quantity and the pole selecting bit PS, is transferred to the buffer store at the address identified in the step 658. In the next step 666 the output pointer is incremented, in order to access the location of the buffer storage next following the location addressed in step 658. In step 668 the direction bit calculated in step 636 is loaded into the accumulator and in the following step 670 the quantity FREQ, calculated in step 598 or 620, is also loaded into the accumulator. The direction bit and FREQ value are loaded into different portions of the accumulator so that they do not conflict with each other. In one embodiment, the direction bit occupies bit position 3 of the accumulator, and the FREQ value occupies position 4 − 11. In the following step 672, the accumulator content, which now includes the FREQ quantity and the direction bit, is loaded into the buffer memory in the location identified in step 666. The following step 674 causes the two words placed in buffer storage by steps 664 and 672 to be output to terminals 98, 278, 221 and 340, which have already been described. Control is then returned via branch 676 to the executive program (FIG. 15) at the place where it was interrupted in order to perform the X-SERVO program.

Figure 23:
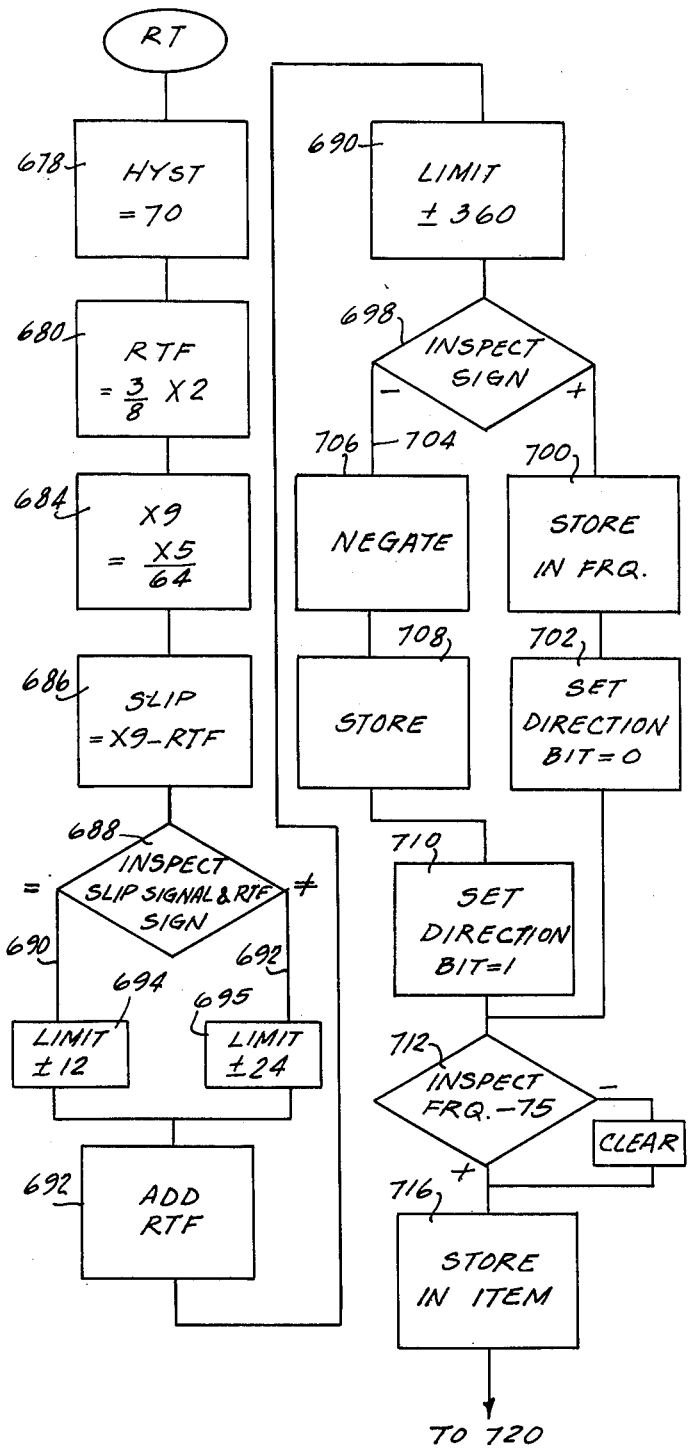
Figure 24:
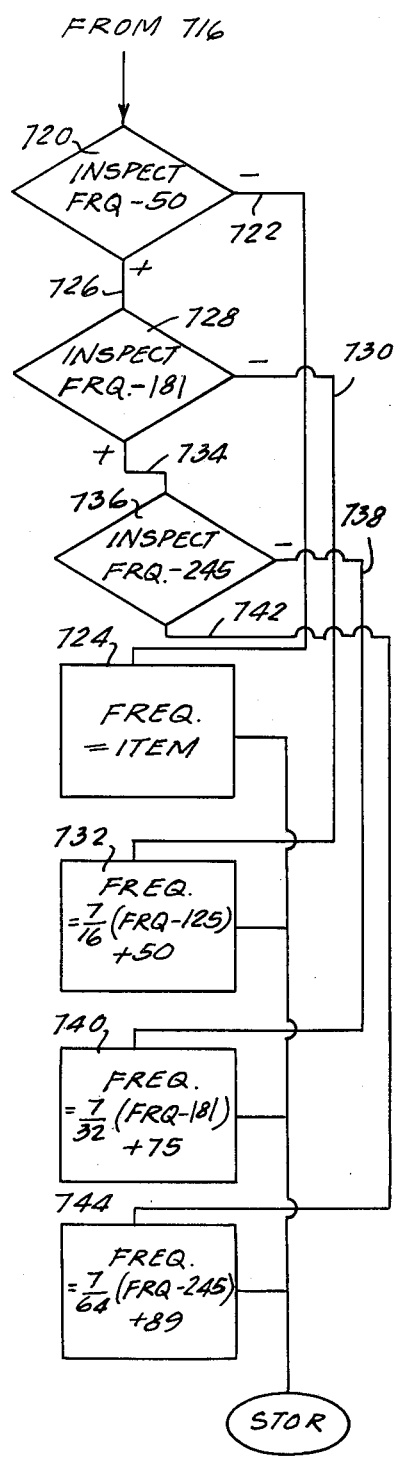

Referring again to FIG. 19, if the branch 594 is selected as a result of step 590 the rapid traverse RT program is entered (FIG. 23). The first step 678 of the RT program causes the quantity HYST to be set to 70, after which control passes to step 680 in which the quantity RTF is calculated as being equal to ⅝ of the quantity X2. In the next step 684, the quantity X9 is calculated from X5, equal to 1/64 of the quantity X5. In the next step 686 the quantity SLIP, corresponding to the desired slip (line 513 of FIG. 12) is calculated as being equal to X9 (the commanded stator frequency) minus the rotor frequency RTF, and then control passes to step 688. In the step 688 the sign of the quantity SLIP is compared with the sign of the quantity RTF. If both are of the same sign, a condition of acceleration is identified for the motor 10 and the branch 690 is selected, otherwise, the branch 692 is selected, in recognition of a decelerating condition for the motor 10. Under an accelerating condition, the step 694 limits the quantity SLIP to plus or minus 24 and passes control to step 692. Under decelerating conditions the quantity SLIP is limited to plus or minus 12 in step 695 and control is passed to step 692. The reason for the different limits on acceleration and deceleration is to permit the motor to perform in approximately the same way under both conditions. If the limits were set to be equal under these two conditions the motor would decelerate more rapidly than it could be accelerated, owing to the bi-directional asymmetry of the circuits employing the power transistors 12.

In step 692 the quantity RTF is added to the accumulator contents, (the limited slip calculated in step 694 or 695) to calculate the commanded stator frequency, and control passes to step 696 in which the content of the accumulator (the commanded stator frequency) is limited to plus or minus 360. This has the effect of limiting the upper frequency employed during this mode of operation to 90 Hz., as the quantity stored in the accumulator at this time is equal to four times the commanded stator frequency. The content of the accumulator is then examined in step 698 to determine its sign. If the sign is positive, indicating that rapid traverse in a forward direction is commanded, step 700 is performed to transfer the content of the accumulator to memory, and then step 702 is performed to set the direction bit equal to 0, indicative of forward direction. If the quantity in the accumulator is negative, branch 704 is selected and step 706 is performed to negate the quantity (to calculate the absolute value of the limited stator frequency), after which the negated quantity is transferred to memory location by step 708 and the direction bit set equal to 1 in step 710. After either step 702 or 710 control passes to step 712 of FIG. 24. In this step the quantity FRQ stored in memory location FRQ in step 700, is diminished by 75 and the sign of the resultant is inspected. If it is positive, branch 714 is selected and control passes directly to step 716. Otherwise the accumulator is cleared in step 718 before control passes to step 716. In step 716, the accumulator content is transferred to memory location ITEM, and in the following step 720, the quantity stored at ITEM is diminished by 50 and inspected as to sign. If the sign is negative (signifying that the quantity stored at location ITEM is less than 50) branch 722 is selected and step 724 is performed, in which the quantity FREQ is set to the same quantity as that stored in memory location ITEM. Otherwise, the branch 726 is selected and control is passed to step 728 where the quantity FRQ is compared with the quantity 181. If FRQ is less than 181 then branch 730 is selected and step 732 is performed which sets the quantity FREQ to a value equal to 7/16 (FRQ−125)+50. If FRQ is greater that 181, branch 734 is selected and control passes to step 736 in which the quantity FRQ is compared with the quantity 245. If FRQ is less than 245 the branch 738 is selected and step 740 is performed, otherwise the branch 742 is selected and step 744 is performed. Step 740 calculates value for the quantity FREQ equal to 7/32 (FRQ−181)+75, while step 744 calculates FREQ equal to 7/64 (FRQ−245)+89. The steps 724, 732, 740 and 744 comprise a calculation of the curve illustrated in FIG. 13, whereby the value of the FREQ quantity is calculated in accordance with the value of FRQ. The calculation in effect breaks the curve into four portions of constant slope. Control then passes to the STOR program illustrated in FIG. 25. In the first step 746 counter No. 1 is set to minus 5. Control passes to step 748 in which the sign of the quantity stored in the counter No. 2 is inspected.

Figure 21:
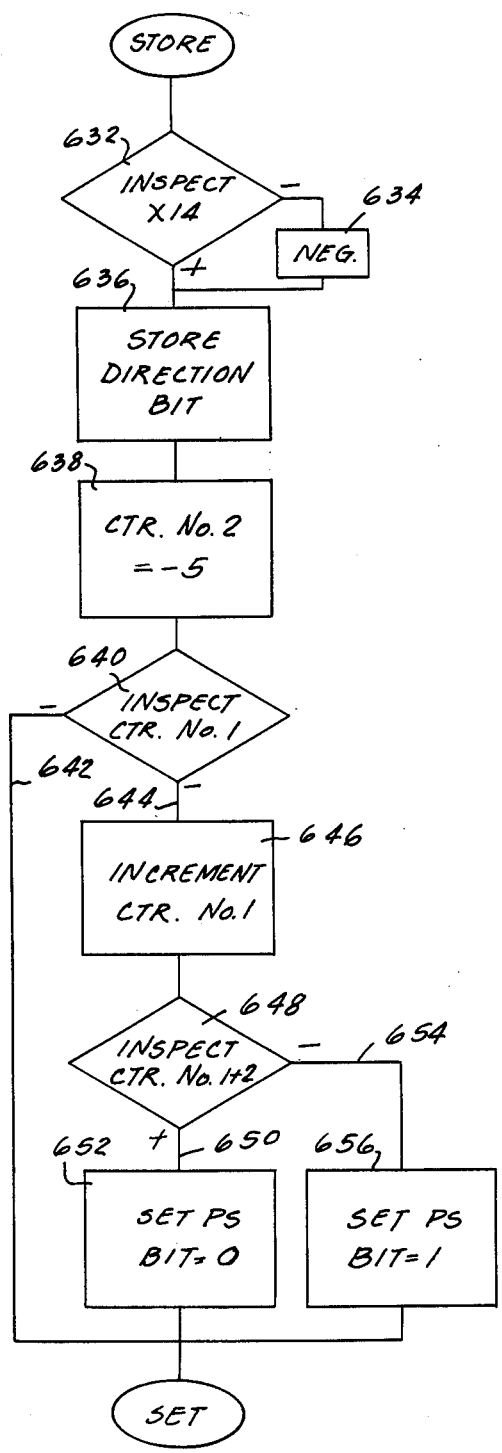

As described above, the counter 2 was set to minus 5 during the program illustrated in FIG. 21, so that the counter No. 2 may be found to be set to minus 5 during the step 748. In that event the branch 750 is selected and step 752 is performed, in which the quantity stored in the counter No. 2 is increased by 1. Otherwise, the branch 754 is selected, which passes control to step 756.

When the branch 750 is selected, the counter is increased by 1 in step 752 and control passes to step 758 which inspects the sign of quantity stored in the counter No. 2, increased by 2. If this quantity is negative the branch 780 is selected which passes control to step 782. In step 782 the accumulator is set to 0 and control passes to step 784 which sets the quantity TRIG equal to the accumulator content (which has just been set to 0). Control then passes to the SET program (FIG. 22) which has already been described. If the result of step 778 is positive, branch 786 is selected, the accumulator set to 0 by step 788 and control is passed to step 790. Step 790 limits the value of the accumulator contents to plus or minus 122, and passes control to step 792, which sets the PS bit equal to 1, indicative of four pole operation. After step 792, control is passed to step 784 which sets the quantity TRIG equal to the content of the accumulator (which has just been set to zero).

If as a result of step 748 the branch 754 is selected, step 756 calculates a quantity equal to ⅛ FRQ + 20, and enters it into the accumulator. After step 756 control passes to step 790 which limits the maximum value in the accumulator, and then to step 792 which sets the PS bit in the manner which has already been described.

The purpose of counter No. 2 in the program illustrated in FIG. 25 is to insure that no power is applied to the motor 10 during changing of the configuration of the motor from eight pole to four pole arrangement. This is accomplished in the following manner.

Initially, counter No. 2 is either set to minus 5 or 0, depending on whether or not there has been a previous execution of the CYC 30 or the CYC 60 programs. Normally there will have been an execution of such a program so that counter No. 2 will be found in its minus 5 state the first time the STOR program is entered. Accordingly, the execution of the step 748 selects branch 750, and, when step 752 increases the counter by 1, the operation effected in step 778 causes the branch 780 to be selected. As a result, the value of TRIG is set to 0, inhibiting the application of power to the motor via the power transistors 12. At the next clock pulse, which occurs approximately 8.3 milliseconds later, the program of FIG. 25 will again be entered. This time the content of counter No. 2 is minus 4, however. The step 752 increases it by 1 to minus 3 and step 778 still causes selection of branch 780, with the result that the voltage is held to 0 for a second 8.3 millisecond period. On the third running of the STOR program, the content of the counter No. 2 is minus 3, but step 752 increases it by 1 to minus 2 whereupon step 778 selects branch 786. The accumulator (and therefore the value of TRIG) remains set to 0 but step 792 changes the pole selecting bit PS to command four pole operation of the motor. Since this occurs on the third cycle, and the voltage level has been held to 0 for the two preceding cycles, the motor configuration can safely be changed without creating large transient currents. However, sufficient time must be provided to enable the contactors to complete their switching, before power is reapplied to the motor. Therefore, the TRIG value remains at 0 after this period and for the two following periods.

On the fourth period the content of counter No. 2 is minus 2, so that branch 750 is again selected by step 748, and branch 786 is selected by step 778. On the fifth cycle the content of the counter No. 2 is minus 1 so that branches 750 and 786 are again selected, the TRIG value remaining 0 all this time. On the sixth period, however, the content of the counter No. 2 is zero, so that the branch 754 is selected, whereby the TRIG value is set in accordance with the calculation effected in step 756. The branch 754 is selected for all subsequent periods as long as the RT program is selected in step 590 (FIG. 19).

In like manner the transition counters No. 1 and No. 2 function to diable the power transistors during transition from the rapid traverse mode back to the normal drive mode, which employs either CYC 30 or the CYC 60 program. Both of these programs include the STORE program illustrated in FIG. 21. When the rapid traverse program RT has been entered prior to entering the STORE program, counter No. 1 is set to minus 5, as a result of step 746 (FIG. 25).

Referring now to FIG. 21, in which the STORE program is illustrated, the transition counters are manipulated by this program during the period of transition from a rapid traverse mode to the normal mode using either the CYC 30 or the CYC 60 program. In step 638, counter No. 2 is set to minus 5 and in step 640, the content of counter No. 1 is examined. If it is negative, as it is following a rapid traverse program, branch 644 is selected and the counter is incremented by 1 in step 646, after which that quantity plus 2 is inspected as to sign. On the first entry of the STORE program, the counter is incremented to minus 4 and step 648 selects the negative branch 654, so that the PS bit is set to 1 and the value of the TRIG quantity itself is set to 0. Accordingly, the motor 10 remains in four pole configuration, but the voltage drops to 0.

On the second entry to the program counter No. 1 is again incremented by 1 to minus 3, and branch 654 is again selected with the same result. On the third running of the program the content of counter No. 1 is now minus 2 so that branch 650 is selected by step 648 with the result that the motor configuration switches to eight pole, while maintaining the voltage at 0. The branch 650 is again selected for the fourth and fifth periods, during which the counter No. 1 content is incremented twice to 0. On subsequent periods branch 642 is selected by step 640 so that the value previously calculated for TRIG in the programs illustrated in FIG. 20 is employed, with the pole selecting bit PS remaining at 0 for eight pole operation.

It will be recalled that the quantity HYST was set at an arbitrary value by steps 596 and 618 of FIG. 20 and by step 678 of FIG. 23. The purpose of the HYST value is to insert a hysteresis into the servo response characteristic, so that the value of X2 which causes a switch from the CYC 60 program is substantially different from the value of X2 which effects return to the CYC 30 program. Similarly, the HYST value requires a substantially different value of X2 to be present to switch from the CYC 60 program into the RT program as compared with the X2 value which brings about a reversal of its transition.

This feature prevents the system from swtiching quickly back and forth between 30 and 60 cycle operation, for example, when X2 has the value approximately equal to the division between CYC 30 operation and CYC 60 operation. Accordingly, if the value of X2 increases to the point where a 60 cycle frequency is applied to the motor, the transition to 60 Hz. will be made and the return to the CYC 30 operation, in which 30 Hz. power is applied to the motor 10, is not made until X2 reaches a lower value. The difference between the two values of X2 which cause the two transitions is referred to as the hysteresis, and it is the function of the HYST quantity to establish a hysteresis of this kind.

As shown in FIG. 20, the HYST value is 20 units higher for the CYC 60 program than for the CYC 30 program, and the HYST value for the RT program (FIG. 23) is 50 units higher than for the CYC 60 program. The hysteresis between the RT program and the normal programs is made high in order to minimize the number of transitions between the RT program and the normal operating programs, since five periods of program operation are required to make each such transition.

From the foregoing it will be appreciated that the programs of FIGS. 14–25 enable a general purpose digital computer to perform the operations indicated in the flow charts of FIGS. 10 and 12. The described program sequence is performed every 8.3 milliseconds, to update the data output at the rate of 120 times per second.

Referring now to FIG. 26 there is illustrated a flow chart of an alternative series of programs which may be substituted for the programs which have been described in connection with the flow charts of FIGS. 10 and 12, and the programs of FIGS. 14 to 25. In the operation described in the flow chart of FIG. 26, the slip of the induction motor 10 is controlled so that a constant value of slip is maintained. This causes the heating in the motor to be directly proportional to the torque developed by the motor, and as a result, establishes a maximum torque for the motor and an upper limit for heat dissipation in the motor.

The summing register 800 is the same as the register 458 illustrated in FIG. 10, and the input of line 462 has the same significance as described above in reference to FIG. 10. The quantity X2, indicative of the rotor frequency, is applied to the summing register 800 over the line 802 and the difference, which corresponds to the incremental position error, is made available on the output line 804. An integrator 806 is connected to the line 804 and furnishes on its output line 808 the accumulated position error, or the following error, of the system. The line 808 is connected to a scaler 810 which produces at its output line 812 a signal corresponding to the velocity command, or the velocity commanded by the system in order to cause the following error to be maintained. The line 812 is connected to one input of a summing register 814 which has another input connected to the line 802. The difference between the two inputs, representative of the velocity error, is produced on the output line 816. This is manipulated by a compensating network 818 identical to the lead-lag network 480 illustrated in FIG. 10, and the output of that network is modified by another scaler 820, to produce on an output line 822 a signal representative of the torque required by the machine in order to tend to maintain the following error. The commanded torque quantity produced by the scaler 820 is derived as a function of the velocity error signal present on the line 816. In this manner, any increase in the magnitude of the velocity error signal on the line 816 produces an increase in the quantity represented by the signal on the line 822, the significance of which is the torque commanded by the machine. The line 822 is connected to the input of a function generator 824 by which the value of the TRIG quantity is calculated, the latter being applied to the terminals 278 (FIG. 5b) of the motor 10 via line 826.

The line 822 is also connected to a unit 828 which examines the sign of the torque commanded on line 822 and produces one of two discrete signals on its output line 830, in accordance with the sign of the signal on the line 822. The significance of the signal produced by the unit 828 is a quantity proportional to the desired slip of the motor 10. The slip is either positive or negative, in accordance with the sign of the commanded torque indicated by the signal on the line 822. The magnitude of the signal on the line 830 is constant and corresponds to the constant slip which is desired for the motor 10. The line 830 is connected to a summing amplifier 832 which has a second input connected from a line 834. The line 834 is connected from the line 802 (which carries the X2 signal, indicative of rotor frequency) via line 836 through a scaler 838. The scaler 838 changes the scale of X2 to the scale of the quantity represented by the signal present on the line 830. The sum produced by the summing register 832, which is presented to the output line 840, is indicative of the commanded stator frequency. This is presented to the motor 10 via terminals 98 (FIG. 3) in the form of the FREQ quantity, in the manner which has been described above.

The TRIG quantity applied over the line 826 is determined by the function generator device 824, as a function of the commanded torque. A second input to the function generator device 824 is furnished by a line 842 which carries a signal representative of the rotor frequency. Accordingly, the output on the line 826 is dependent both on the commanded torque, and on the observed rotor frequency of the motor 10.

The computation effected by the function generator device 824 is illustrated in FIGS. 29a and 29b, which are respectively two graphs of output as a function of input to the unit 824, for two different rotor frequencies. The relation depicted in the graph 29a is employed when the rotor frequency is low, and the relation of the graph 29b is employed when the rotor frequency is high. In each case, the quantity of torque commanded, indicated by the signal on the line 822, is multiplied by a factor corresponding to the slope of the appropriate graph, and the product thus produced is the TRIG value, representative of the voltage to be applied to the motor 10. The slopes of the graphs of FIGS. 29a and 29b are different, and are a function of the instantaneous value of the rotor frequency, represented by the signal on line 842. The multiplying factor used for the computation of the TRIG value is calculated from the value of X2 present on the line 842.

The similarities between the flow chart illustrated in FIG. 26 and that illustrated in FIG. 12 are apparent, and the operations prescribed by the flow chart of FIG. 26 can readily be performed by programming a general purpose digital computer in the manner which has been described (with reference to FIGS. 14 to 25) for the flow charts of FIGS. 10 and 12. With the reference to the detailed description of the programs of FIGS. 14 to 25 which has been presented hereinabove, one of ordinary skill in the art can readily program a computer to perform the appropriate steps required in calculating the quantities for voltage and frequency in accordance with the flow chart of FIG. 26.

In another embodiment of the present invention, the unit 844 (FIG. 27) may be substituted for the unit 828 in the flow chart illustrated in FIG. 26. The function of the unit 844 is similar to that of the unit 828, in that a quantity is calculated for the commanded slip of the motor, based on the commanded torque parameter.

However, the unit 844 calculates the slip to be proportional to the commanded torque, at low values of commanded torque, with a maximum slip established for higher values of commanded torque. The maximum plus and minus values established for slip by the limits correspond to the dashed lines 846 and 848 in FIG. 28, which shows a typical induction motor characteristic curve. The abscissa of the graph of FIG. 28 is in units of slip, expressed in terms of r.p.m. (i.e. the difference between stator and rotor r.p.m.), and the ordinates represent torque developed by the induction motor in response to the slip. It can be seen from FIG. 28 that within a limited range of slips the torque developed by the motor is generally proportional to the slip. The limits shown by the dashed lines 846 and 848 are established at the ends of the range where an approximately linear relationship applies.

The signal which is derived for the purposes of controlling the voltage applied to the motor is calculated from the torque commanded, for any particular rotor frequency, just as has been described for FIG. 26. Inasmuch as a different slip is employed for low values of commanded torque, however, the voltage applied to the motor 10 is not the same when the unit 844 is used as it is when the unit 828 is employed. The value of voltage, calculated as a function of commanded torque is derived by using an empirically derived relationship, as has been described in connection with the flow charts of FIGS. 10 and 12. In each case the empirical relationship may be found for any particular motor 10 by applying a constant frequency source of power to the stator of the motor and determining the relationship between torque and voltage for the motor, at that frequency. It is this relationship which forms a basis for the operation of the function generator unit 824 so that the torque of the motor developed in response to the applied voltage is the same as the commanded torque, represented by the signal on the line 822. If it is determined that the voltage-torque characteristic is not the same for all frequencies of the motor, a number of relationships are determined, each for a limited range of frequencies, and a value is calculated for the voltage to be applied to the motor by application of the appropriate voltage-torque relationship. This technique is illustrated in FIG. 20 which has separate voltage characteristics calculated for the 30 Hz. and 60 Hz. operating motor. The apparatus of FIG. 26, with the substitution of the unit 844 for the unit 828, may properly be referred to as a proportional slip arrangement, since the commanded slip, for low values of commanded torque, is proportional to the amount of torque commanded. FIG. 29a illustrates a graph of the relationship relied on by the unit 824 to derive the voltage-controlling information to be applied to the motor via the terminals 278 (FIG. 5b). FIG. 29b illustrates a different relationship which is used when it is desired to prevent the applied voltage from vanishing when the torque commanded is zero.

From the above description, it can be seen that the flow charts of FIGS. 26 and 27 may be substituted for the flow charts of FIGS. 10 and 12 if constant slip or proportional slip operation is desired.

All of the systems which have thus far been described control the voltage and frequency of the driving voltage which is supplied to the motor by means of the apparatus illustrated in FIGS. 2-5. It is, however, possible to directly control the drivers 16 (FIG. 1) of the power transistors 12 directly by a signal developed as a result of processing information within a digital computer. In this case, the oscillator 20 is not required, nor are the SCR trigger circuits 28 and their associated apparatus required either. The SCR's 18 can be controlled directly from computer-derived information. One system for accomplishing the result of directly controlling the devices 16 and the SCR's 18 will now be described.

Referring now to FIG. 30, there is shown a flow chart illustrative of a program by which signals for controlling the drivers 16 and the SCR's 18 are derived directly as a result of information representative of the commanded torque, which, as described above, is available on the output 822 of the unit 820 (FIG. 26). The line 822 is connected (FIG. 30) to a unit 850 which produces on an output line 852 a signal representative of the absolute value of the commanded torque, and ignores the sign (direction) of the commanded torque. The line 852 is connected to one input of a summing register 854.

One other input to the flow chart of FIG. 30 is the quantity X2, proportional to motor speed, and which is made available on the line 802, derived as an output of the unit 838. The line 802 is connected to an integrator 856 by which the X2 signal, proportional to motor speed, is integrated to derive a value representing the position of the rotor, RTP. The output of the integrator 856 is connected to one input of a summing register 858. The other input of the summing register 858 is connected from the line 822 via a scaler 860. The two inputs to the summing register 858 are added and produce on an output line 861 a signal corresponding to the rotor position, increased by a factor proportional to the amount of commanded torque, depending on the multiplying factor applied by the scaler 860. The line 861 is connected to one input of a summing register 862, the other input of which is connected from the line 802 through a scaler 864. The sum of the two inputs to the summing register 862 is provided on an output line 866 and is representative of the desired stator field position. The desired stator field position is equal to the position represented by the signal on the line 861, plus a quantity proportional to the rotor speed determined by the multiplier of the scaler 864. Accordingly, the stator field position is advanced beyond the instantaneous position of the rotor by an amount which is the sum of a factor proportional to the commanded torque and a factor proportional to the rotor speed. Therefore, the greater the rotor speed, the more advanced will be the stator field position for any given commanded torque. Also, the greater the commanded torque, the more advanced will be the stator field position for any given rotor speed. The line 866 is connected to the input of a function generator 868 which develops signals on a line 870 for controlling the application of power to the various phases of the stator windings of the motor 10.

The summing register 854 has a second input connected from the line 802 through a scaler 853, and a device 855, which derives the absolute value of the rotor speed as modified by the scaler 853, irrespective of its sign. This quantity is added, in the summing register 854, to the absolute value of the commanded torque to produce a signal on a line 857. The signal on the line 857 represents the commanded torque increased by an amount proportional to the rotor speed. It is connected to the input of a unit 859 which includes the SCR's 18.

The signal on the line 866 is updated at frequent regular intervals, so that the commanded stator field position signal on the line changes when necessary to cause the motor to operate in the programmed manner. In one embodiment, the signal on the line 866 is updated each 8.3 milliseconds, or 120 times per second.

There is shown in FIG. 31 a schematic diagram of a two pole three-phase motor having three sets of pole pairs A—A, B—B and C—C, equally disposed around the periphery of the rotor R. FIG. 32 is an illustration of a three-phase squarewave, which may be applied to the three pole pairs of the motor illustrated in FIG. 31. The squarewaves of FIG. 32 are such as to present one of two values at any given time, depending on which way the respective pole pair is to be energized. That is, one pole of each pair forms either a North magnetic pole and the opposite pole a South magnetic pole, or vice versa. As seen in FIG. 32, starting at an arbitrary time $t_o$ the A—A pole pair is energized in one direction and the other pole pairs are energized in the opposite direction. This is illustrated in FIG. 31 by arrows showing the direction of the magnetic flux at this time. It can be seen from FIG. 31 that the resultant flux direction is aligned with the A—A pole pair. 1/6 of a cycle later at $t_1$, the B—B pole pair has reversed its magnetic field direction, and inspection of FIG. 31 reveals that the resultant magnetic field is then aligned with the C—C pole pair. An additional 1/6 of the cycle later at $t_2$, the C—C pole pair has changed its field direction, with the result that the resultant flux is in the direction of the B—B pole pair.

In the first third of a revolution since $t_0$, therefore, the magnetic flux direction has rotated from A—A to C—C to B—B, or ⅓ of the way around the rotor. This operation continues in the same manner, with the magnetic field direction shifting by 60° each time there is a state change in one of the waveforms illustrated in FIG. 32. Thus, the magnetic field of the stator rotates around the rotor position, in a series of steps and the resultant magnetic field at any instant assumes one of only six positions.

When the commanded stator position, represented by the signal on the line 866, corresponds to one of the six possible positions which may be occupied by the resultant stator flux, the pole pairs of the motor are energized in the proper way to create the resultant magnetic flux in the correct direction. It frequently occurs, however, that the stator flux position indicated by the signal on the line 866 does not correspond to one of the six directions which the stator flux may take when energized by the waveforms illustrated in FIG. 32. It is, therefore, desirable to cause the several pole pairs of the motor to be energized in such a way and at such times as to produce an average flux direction, during an 8.3 millisecond period, equal to the commanded stator position for that period. This is accomplished by the operation of the programs of FIGS. 35a and 35b, which control the modification of the waveforms illustrated in FIG. 32 selectively during each 8.3 millisecond period so as to produce an average stator flux direction corresponding to the desired value.

The instantaneous values of commanded stator field position are calculated by the program illustrated in FIG. 35a from the value represented by the signal on the line 866, which represents the value of the quantity STP, or commanded stator field position. The first step which is performed after entry into the program of FIG. 35a is the step 872.

In step 872, the commanded stator field position STP is inspected to determine whether it is less than 0. If the quantity STP is less than or equal to zero, branch 874 is selected and the sum of 1250 is added to the STP quantity in the step 876. The quantity STP may be less than 0 if the motor has been moving in a rearward direction, so that the desired stator field position is less advanced during each successive updating of the desired stator field position. If, since during the previous 8.3 milliseconds, the quantity STP passed through 0, it is restored to a range between 0 and 1250 by the step 876. The quantity which is chosen for addition to the STP position in step 876 corresponds to the number of pulses produced for each revolution of the motor shaft; when 1250 pulses are produced during each revolution, as in the described embodiment, addition of the quantity 1250 in the step 876 maintains correct position of the stator field.

If the quantity STP is greater than zero, the branch 878 is selected and step 888 tests whether the quantity STP is greater than the sum 1250. If it is (indicating that the motor shaft is turned forwardly past its index position), the branch 882 is selected and the step 884 decreases the quantity STP by 1250. If the step 880 finds the STP quantity to be less than 1250, the branch 886 is selected and the step 884 is by-passed.

Step 888 is entered from steps 884 or 876 or from the branch 886. It inspects the updated value of STP to determine whether it is less than the quantity 209. If it is, a branch 890 is selected and step 982 stores the STP quantity in the storage location STPTM. The succeeding step 894 inserts the address location START into memory location PHASE, and passes control to step 896.

The branch 890 is selected when the commanded stator field position is within the first 60° sector past the index position of the rotor, in which case the pulse generator has issued less than 209 pulses, since the index position was passed. If the STP quantity is greater than 209, however, the branch 897 is selected indicating that the commanded stator position is beyond the first 60° past the index point, and the succeeding step 898 tests whether the STP quantity is less than 418. If it is, branch 900 is selected, the storage location STPTM is loaded with the quantity STP-209 in step 902, and in step 904 the PHASE memory location is loaded with the address START + 1, after which control passes to step 896.

If the quantity STP is found to be greater than 418, the branch 906 is selected and a further test is made in step 908. Successive steps 910 and 912 are performed to determine whether the STP quantity is such that the commanded stator position is within the third, fourth, fifth or the sixth 60° sector, relative to the index position. The six sectors correspond to the possible field orientations of the two pole, three-phase motor. Whatever may be the value of STP, a quantity is stored in the STPTM location corresponding to the extent of penetration which the commanded stator field position is advanced into its respective sector, and an appropriate address is located into the memory location, PHASE. An output word which describes the condition of the six power transistors 12 is located at the memory location; the address of which is stored in PHASE, which output word is referred to to control the various power transistors 12 in the manner hereinafter described.

In the step 896, the quantity 13/32 times the quantity STPTM (i.e., the quantity stored in the STPTM storage location in steps 892, 902, etc.) is calculated and loaded into the memory location TIME. The location TIME then stores the number of 0.1 millisecond periods by which the commanded stator field position has penetrated into its respective sector. This quantity will be used to cause switching between successive states of the three-phase signal applied to the various windings of the motor, as described hereinafter.

Following step 896, the step 914 is performed in which a number of different quantities are loaded into various memory locations. The address stored in memory location PHASE is transferred and stored in memory location ORIG. Also, the memory location stored in PHASE is incremented by 8 and stored in memory location PHAS 1. The address stored in PHASE is then incremented by 1 and stored in PHASE. In addition, memory location PER 1 is set to minus one and memory location FLAGA is also set to minus one.

In the succeeding step 916, the quantity TCTOT (from line 857, FIG. 30) is added to the quantity −68 to calculate a firing point for the SCR's 18, and control is passed to step 917, where the quantity 28 is added once or twice, as necessary, to produce a result between 0 and −28, which is then stored in memory location TEMP in step 919. This memory location is referred to subsequently to control the firing points of the SCR's 18. After the step 919, control is returned to the executive routine via branch 918.

The executive routine is interrupted at intervals of 0.1 milliseconds by a timer (not shown), and control is then passed to steps 920 and 922 (FIG. 35b), which control the firing of the SCR's 18 in accordance with the quantity stored in the TEMP location by step 919, in a manner more fully described hereinafter. Control is then passed to step 942.

In step 942, the content of memory location PER is incremented by 1, and in the following step 944 its content is compared with 0. If it is found to equal 0, the branch 946 is selected and step 948 sets the content of the memory location PHASE into the memory location PHAS 2, which is the output location. The succeeding step 949 outputs the control word the address of which is stored in PHAS 2, and then step 950 increments the content of memory location FLAGA by 1, after which FLAGA is compared with 0 in step 952. If FLAGA does not equal 0, branch 953 is selected and control is returned to the executive routine until the next 0.1 millisecond interrupt via branch 954. If FLAGA is found equal to zero by the step 952, the branch 956 is selected and the step 958 sets the quantity TIME, in negative form, into the storage location PER 1 and the content of the ORIG storage location is entered into location PHASE, after which control is returned to the executive routine, via branch 954.

If the step 944 finds the quantity in storage location PER to be other than 0, branch 960 is selected, the quantity stored in PER 1 is incremented in step 961, and then the quantity stored in PER 1 is inspected in step 962. If the quantity stored in PER 1 is 0, branch 964 is selected and the content of location PHASE 1 is set into location PHAS 2 in step 966. In the following step 968, the control word identified by the address stored in PHAS 2 is output directly to the drivers 16 via an output register (not shown), which continues to manifest the output word until a new output word is selected. The quantity PER is set to −1 in step 970, after which control is returned to the executive routine via branch 954.

On the first entry into the program shown in FIG. 35b, following a 0.1 millisecond interrupt, an output word is output to the drivers 16 which sets them to an intermediate condition in which one phase is controlled so that both of the power transistors associated with that phase are cut off. 0.1 Milliseconds later, on the next interrupt, the advanced phase word is output to the control terminals of the power transistors, and a quantity corresponding to the length of time this phase is to persist is entered, in negative form, into a counter which is subsequently incremented by 1 during each 0.1 millisecond interrupt until 0 has been reached. At this time, the intermediate word is again output to control the power transistors, and 0.1 millisecond later, the output word corresponding to the next previous phase condition is output to control the power transistors. This condition persists until the next 8.3 millisecond interrupt in which the program of FIG. 35a is again entered.

As an example of the operation of the programs of FIGS. 35a and 35b, let it be assumed that the commanded stator field position, calculated as a result of an 8.3 millisecond interrupt, is 40° past (in a counter-clockwise direction relative to FIG. 31) the A phase of the stator field. In that event, the stator field should be aligned with the B phase (20° in advance of the commanded stator field position), for two-thirds of the following period and aligned with the A phase (40° behind the commanded stator field position), for one-third of the following period, to give an average stator field position aligned with the commanded position. Thus, if the stator field position is aligned with the A phase at the start of the period, the B phase is reversed in direction for 5.5 milliseconds and then restored for the following 2.8 milliseconds of the 8.3 millisecond period. Accordingly, the average position of the stator field is precisely at the position corresponding to the commanded stator field position, and the response to the rotor is the same as if the stator field had been constrained to have a resultant flux direction aligned with the commanded stator field position during the entire interval.

The quantity stored in the STPTM location by steps 892, 902, etc. is equal to the extent of penetration of the commanded stator field position into one of the six equally spaced sectors. The quantity stored at TIME, calculated in step 896, is the ordinate of the graph of FIG. 33, in which the abscissa is commanded stator position. The location PHASE stores one of six successive addresses in storage, at which are located the six output words corresponding to the six different combinations of stator pole energization.

The program of FIG. 35a is entered once each 8.3 milliseconds, and the program of FIG. 35b is entered each 0.1 milliseconds, as described above. In the first entry to the program of FIG. 35b after the program of FIG. 35a is completed, branches 960 and 964 are selected by steps 944 and 962, respectively. Steps 966 and 968 then cause to be output to the terminals 52 of the drivers 16, via an output register, the output word stored in a location having an address eight units higher than that stored in the PHASE location. FIG. 34 illustrates a group of 12 output words, six of them having addresses from START to START + 5, and the remaining six each having an address eight units greater than the first six words. The first six words are the output words which control the drivers 16, the second six words are intermediate words, used during transitions between output words.

FIG. 34 illustrates that two bits of each output word are employed for each phase of the motor 10. The first two bits control the drivers for phase A, for example. When the first two bits are 10, the phase A poles are energized in a first direction, and when the first two bits are 01, the phase A poles are energized in the reverse direction. The other two phases are similarly controlled by the other two pairs of bits in each word. It will be seen that in the output words, each phase is energized in one direction or the other, while in the intermediate words, one phase remains unenergized. The intermediate words function to cut off both of the driver transistors for a given phase momentarily before changing the direction of flux generated by that phase, in order to avoid any chance of short circuiting the power supply by having both power transistors for a given phase simultaneously conduct.

The intermediate word stored in an address eight units greater than the address of any output word is the appropriate intermediate word to use between that output word and the next more advanced output word located at the next higher address. Thus, if the output word located at START is the word stored at ORIG in step 914, signifying that the commanded stator field position is in the first sector, the intermediate word located at START + 8, which de-energizes the B phase, is the proper intermediate word to use before switching the poles of the motor to the next sector, via the output word located at START + 1, in which the B phase is reversed in polarity.

This is precisely what happens when the commanded stator position is 40° past the A phase point, in the example mentioned above. Thus, when the branch 964 is selected in step 962, the intermediate word located at START + 8 is output via the step 968. Then the step 970 sets PER to −1, so that the second time through the program of FIG. 35b, 0.1 milliseconds later, the branch 946 is selected by the step 944, and the steps 948 and 949 result in outputing the word whose address is stored in PHASE, thereby outputting the next advanced output word, namely, the word stored at START + 1. This output woud then continues to be manifested for a length of time determined by the value of the quantity stored in TIME, calculated in step 896. In the example in which the commanded stator field position is 40° in advance of the A phase position, or two-thirds into the first sector, the value for TIME is 55 (the number of 0.1 millisecond periods needed to equal two-thirds of the 8.3 millisecond interval). Step 958, which is performed immediately after the steps 948 and 950 are performed, negates the quantity stored in TIME and enters it (viz., −55) into the PER 1 location, and changes the addres stored in PHASE to that of the output word (viz., START) corresponding to the stator field position at the beginning of the sector containing the commanded stator field position.

Subsequent entries into the program of FIG. 35b, at 0.1 millisecond intervals, select branches 960 and 954 and return control directly to the executive routine, but each entry increments the quantity stored in PER1. After 55 entries, the quantity in PER 1 is increased to zero, so that branch 964 is again selected to again cause the intermediate word to be output, and sets PER equal to −1 in step 970, causing branch 946 to be selected on the subsequent entry into the program. Then the steps 948 and 949 cause the original output word (START) to be output. The step 950 increments the quantity stored in FLAGA so that it is no longer zero, and the step 958 is by-passed. Subsequent entries into the program of FIG. 35b accordingly select branches 960 and 954 for the remainder of the 8.3 millisecond interval, until a subsequent entry into the program of FIG. 35a.

From the foregoing, it is clear that the programs of FIGS. 35a and 35b function to control the motor in the required manner. As the commanded stator field position advances, a greater and greater proportion of each 8.3 millisecond interval is devoted to the advanced output word, until, when the commanded stator position is aligned with the field produced by the C pole, the "advanced" output word is energized for the entire 8.3 millisecond period. Further advancement of the commanded stator field position causes selection of the next output word as the advanced output word.

An appropriate instruction is placed in storage at location START+6, immediately after the last output word, to allow proper operation when the commanded stator field position is in the last sector, in which case the first output word is selected as the advanced word. Such an instruction causes an automatic jump from the START+6 location, as well understood by those skilled in the art.

It will be appreciated that no modification need be made for reverse operation of the motor. When the commanded stator field position is found to be decreasing, less and less time is devoted to the advanced output word, until the commanded stator position passes into the previous section, when a new output word becomes the advanced output word.

Returning now to FIG. 35b, the control of the firing points of the SCR's 18 will be described. In step 920, the TEMP storage location is incremented each time the program of FIG. 35b is entered. During the step 919 (FIG. 35a), a quantity had been entered into the TEMP location equal to −68, increased by the TCTOT quantity calculated in line 857 (FIG. 30), representative of the total commanded torque. Successive entries into the program of FIG. 35b increment this quantity until it is increased to zero, in which case branch 923 is selected and step 925 causes the firing of one of the SCR's 18. Following that, the step 927 resets the TEMP quantity to −28, and passes control to the step 942. Twenty-eight 0.1 millisecond periods later, the branch 923 is again selected, and again one of the SCR's 18 is fired by the step 925, after which the step 927 resets TEMP to −28. Accordingly, the SCR's are fired at 2.8 millisecond intervals, corresponding to 60° of phase of a 60HZ frequency. The sequence of firing the SCR's 18 is always the same, so that there is never ambiguity as to which SCR is to be fired next. And, since the six SCR's are each fired 60° apart, each one contributes equally to the output voltage which applied to the motor 10 via the transistors 16.

The negative quantity stored in the TEMP location in step 919 is increased in step 917 by a multiple of 28 until it reaches a value between 0 and −28, so as to cause the firing of the first SCR within 2.8 milliseconds after the execution of the FIG. 35a program. This is accomplished by successively adding 28 to the TEMP quantity and inspecting the sign of the result; when a positive sign is indicated, the quantity 28 is subtracted to give a value between 0 and −28 for the initial SCR firing.

The SCR's are fired in the proper succession by successively selecting output words for controlling them, in the same manner as has been described above in connection with the program of FIG. 35b. Alternatively, successive SCR's may be energized by hard wired apparatus including three flip flops, such as that illustrated in FIG. 3.

It is apparent from the foregoing that the embodiment of FIGS. 30 and 35 is operative to control the position of the stator field directly, by establishing average positions for the stator field at frequent intervals, instead of by controlling the frequency applied to the motor. A much finer degree of control is possible using this embodiment, but a relatively greater amount of computer capacity is required than with the other embodiments described herein, because the program of FIG. 35b must be run much more frequently than the other programs.

The embodiments described herein are applicable to a variety of a.c. motors, including the types commonly referred to as squirrel cage, wound rotor, synchronous, reluctance, and hysteresis, as well as other well-known types.

In the following program listing, designed for use with a PDP8 data processor marketed by Digital Equipment Corp., the program of FIGS. 14-25 are carried out. The program listing is written in machine language.

```
                                @37
    00001                       *1
    00001  005402               JMP I 2
    00002  005037               XSERV
                          /
                          /     BASE PAGE TEMPORARY STORAGE AREA
                          /
    00020                       *20
    00020  005712       LIMITX, LIMIT
    00021  005734       ARSX,   ARS
    00022  000000       FREQ,   0
    00023  000000       TRIG,   0
    00024  000000       DIREK,  0
    00025  000000       CTR1,   0
    00026  000000       CTR2,   0
    00027  000000       HYST,   0
    00030  007773       #7773,  7773
    00031  000000       SSABS,  0
    00032  000000       X2,     0
    00033  000000       FRQAB,  0
```

```
00034 005414   STOREX,         STORE
00035 000000   SSPDC,          0
00036 000000   XNEW,           0
00037 006000   B6000,          6000
               /
               /   BASE PAGE CONSTANTS
               /
00040                          *40
00040 004000                   4000
00041 002000                   2000
00044                          *44
00044 000200                   200
00052                          *52
00052 000002                   2
00057                          *57
00057 007700                   7700
00074                          *74
00074 007756                   7756
00075 007760                   7760
00154                          *154   /// TEMP ///
00154 000022   #22,            22            /18
00155 007720   #7720,          7720          /-48
00156 000062   #62,            62            /50
00157 000107   #107,           107           /71
               /
               /   TEMPORARY INITIALIZATION PROGRAM
               /
05000                          *5000
05000 007200                   CLA
05001 003653                   DCA I X5X    /CLEAR X5.
05002 003654                   DCA I X13X   /CLEAR X13.
05003 003025                   DCA CTR1     /CLEAR CTR1.
05004 003026                   DCA CTR2     /CLEAR CTR2.
05005 003027                   DCA HYST     /CLEAR HYST
05006 007000                   NOP
05007 007000                   NOP
05010 004223                   JMS SVIN     /GET THE 1ST FEEDBACK COUNTER READING
05011 007041                   CIA          /NEGATE.
05012 003261                   DCA XOLD     /STORE AS INITIAL XOLD.
05013 007000                   NOP
05014 006531                   6531         /ENABLE EXTERNAL INTERRUPT
05015 006001                   ION          /TURN ON INTERRUPT.
05016 005217                   JMP EXEC     /JUMP AND STAY IN EXEC LOOP.
               /
               /
               /
05017 007000   EXEC,           NOP          /THE COMPUTER WILL BE LOOPING HERE
05020 007000                   NOP          /WAITING FOR THE NEXT INTERRUPT TO
05021 007000                   NOP          /OCCUR.
05022 005217                   JMP EXEC
               /
               /
               /   TEMPORARY IOBB INPUT PROGRAM
05023 007000   SVIN,           NOP          /ENTRY POINT.
05024 006514                   6514
05025 003164                   DCA  ITEMP0
05026 006514                   6514
05027 007041                   CIA
05030 001164                   TAD ITEMP0
05031 007440                   SZA
05032 005224                   JMP SVIN+1
05033 001164                   TAD ITEMP0
05034 000256                   AND #3777    /AND WITH 3777.
05035 007000                   NOP
05036 005623                   JMP I SVIN   /RETURN.
               /
               /
05037 007000   XSERV,          NOP          /ENTER HERE WHEN INTR. OCCURRED.
05040 007604                   LAS          /INPUT FROM SWITCH REGISTER.
05041 007500                   SMA          /BIT 0 A 1?
05042 005245                   JMP .+3      /NO, X1 IS POSITIVE.
05043 007041                   CIA          /YES, NEGATE.
05044 001040                   TAD BIT0     /ADD 4000 TO FORM NEGATIVE X1.
```

```
05045 003655                DCA I X1X    /STORE AS X1.
05046 007000                NOP
05047 004223                JMS SVIN     /INPUT F.B. COUNTER.
05050 003036                DCA XNEW     /STORE AS XNEW.
05051 007000                NOP
05052 005360                JMP SERVOS   /JMP TO SERVOS.
           /
           /
           /
05053 005320    X5X,        X5
05054 005322    X13X,       X13
05055 005317    X1X,        X1
05056 003777    #3777,      3777
05057 001651    #1651,      1651
05060 001722    #1722,      1722
05061 000000    XOLD,       0
           /
           /
           /
05160                       *5160
05160 007000    SERVOS,     NOP
           / GET X2 FROM COUNTER.
05161 007200                CLA
05162 001036                TAD XNEW     /GET XNEW.
05163 007041                CIA          /NEGATE.
05164 007421                MQL          /SAVE IN MQ.
05165 001261                TAD XOLD     /GET XOLD.
05166 001036                TAD XNEW     /DIFF=XNEW+XOLD.
05167 001037                TAD B6000    /DIFF-2000
05170 007500                SMA          /(DIFF-2000)>0?
05171 001040                TAD BIT0     /YES, ADD 4000.
05172 001041                TAD BIT1     /DIFF-2000+2000=DIFF.
05173 007521                SWP          /SAVE DIFF IN MQ, GET -XNEW FROM MQ.
05174 003261                DCA XOLD     /UPDATE XOLD WITH -XNEW.
05175 007701                ACL          /GET DIFF.
05176 003032                DCA X2       /STORE AS X2.
           / CALCULATE POSITION, VELOCITY AND VOLTS FEEDBACK.
05177 007701                ACL          /GET X2.
05200 007104                CLL RAL      /MPY BY 2.
05201 007000                NOP
05202 007000                NOP
05203 003167                DCA ITEMP3   /KX2=2*X2.
05204 007701                ACL          /GET X2.
05205 007000                NOP
05206 003166                DCA ITEMP2   /X2P=X2.
           / CALCULATE POSITION ERROR.
05207 007701                ACL          /XPOS=X2.
05210 001317                TAD X1       /ADD TO X1.
05211 001320                TAD X5       /ACCUMULATED POS ERR X5=X5+X1+X2.
05212 004420                JMS I LIMITX /THE INSTR. WILL BE REMOVED.
05213 003777                3777
05214 003320                DCA X5
05215 001320                TAD X5
05216 004421                JMS I ARSX   /X6=1/8*X5.
05217 007777                -1
05220 007775                -3
05221 007000                NOP
05222 007000                NOP
           /CALCULATE VELOCITY ERROR --- LAG NETWORK.
05223 001167                TAD ITEMP3   /X7P=KX2.
05224 003323                DCA X7P
05225 001323                TAD X7P
05226 001322                TAD X13      /ACCU. VEL. ERR X13=X13+X6+KX2.
05227 004420                JMS I LIMITX /LIMIT X13 TO +-3777.
05230 003777                3777
05231 003322                DCA X13
05232 001323                TAD X7P      /GET X7P
05233 007104                CLL RAL      /MPY BY 2.
05234 001322                TAD X13      /ADD X13.
05235 004421                JMS I ARSX
05236 007777                -1
05237 007775                -3
05240 007000                NOP
```

```
05241 007000                    NOP
05242 003321                    DCA X8      /X8=1/8*(2*X7P+X13).
                / CALCULATE VOLTAGE LOOP.
05243 001321                    TAD X8
05244 001166                    TAD ITEMP2
05245 004421                    JMS I ARSX  /SSPDC=(X8+X2P)*3.
05246 007775                    -3
05247 007777                    -1
05250 007000                    NOP
05251 007000                    NOP
05252 004420                    JMS I LIMITX/LIMIT SSPDC TO +-100.
05253 000100                    100
05254 003035                    DCA SSPDC
05255 001035                    TAD SSPDC   /GET SSPDC.
05256 007510                    SPA         /SSPDC POSITIVE?
05257 007041                    CIA         /NO, NEGATE.
05260 003031                    DCA SSABS   /STORE ABS SSPDC AS SSABS.
                / TEST FOR 30 HZ, 60 HZ OR R.T.
05261 001032                    TAD X2      /GET X2.
05262 007510                    SPA         /X2 POSITIVE?
05263 007041                    CIA         /NO, NEGATE TO MAKE IT POSITIVE.
05264 001027                    TAD HYST    /X2TST=ABS X2+HYST.
05265 001327                    TAD #7677
05266 007510                    SPA
05267 005333                    JMP CYC30   /X2TST<65
05270 001324                    TAD #7641   /X2TST>65
05271 007700                    SMA CLA
05272 005716                    JMP I RAPIDX/X2TST>160
05273 007000                    NOP         /S2TST<160
                /
05274 001325   CYC60,           TAD #24     /20
05275 003027                    DCA HYST    /HYST=20.
05276 001326                    TAD #126    /DCE 86
05277 003022                    DCA FREQ    /FREQ=86.
05300 001031                    TAD SSABS
05301 001074                    TAD #7756   /-18
05302 007500                    SMA
05303 005311                    JMP HIGH    /SSABS>18
05304 007200                    CLA
05305 001031                    TAD SSABS   /SSABS<18
05306 007104                    CLL RAL
05307 001330                    TAD #23     /2*SSABS+19
05310 005434                    JMP I STOREX
05311 004421   HIGH,             JMS I ARSX
05312 007775                    -3
05313 007775                    -3
05314 001331                    TAD #101    /3/8*(SSABS-18)+65
05315 005434                    JMP I STOREX
                /
05316 005440   RAPIDX,           RAPID
05317 000000   X1,               0
05320 000000   X5,               0
05321 000000   X8,               0
05322 000000   X13,              0
05323 000000   X7P,              0
05324 007641   #7641,            7641        /-95
05325 000024   #24,              24          /20
05326 000126   #126,             126         /86
05327 007677   #7677,            7677        /-65
05330 000023   #23,              23          /19
05331 000101   #101,             101         /65
05332 000054   #54,              54          /44
                /
05333 007200   CYC30,           CLA
05334 003027                    DCA HYST    /HYST=0.
05335 001332                    TAD #54     /DCE 44
05336 003022                    DCA FREQ    /FREQ=44.
05337 001031                    TAD SSABS
05340 001075                    TAD #7760   /-16
05341 003164                    DCA ITEMP0  /SAVE TEMPORARILY.
05342 001164                    TAD ITEMP0
05343 007500                    SMA
```

```
05344 005354              JMP INTER   /SSABS>16
05345 007200              CLA         /SSABS<16.
05346 001031              TAD SSABS
05347 007104              CLL RAL     /2*SSABS.
05350 007000              NOP
05351 007000              NOP
05352 001154              TAD #22     /2*SSABS+18
05353 005434              JMP I STOREX/JMP TO STORE.
05354 001155    INTER,    TAD #7720/-48
05355 007500              SMA
05356 005366              JMP HI      /SSABS>64
05357 007200              CLA         /SSABS<64.
05360 001164              TAD ITEMP0
05361 004421              JMS I ARSX
05362 007771              -7
05363 007774              -4
05364 001156              TAD #62     /7/16*(SSABS-16)+50
05365 005434              JMP I STOREX/JMP TO STORE.
05366 004421    HI,       JMS I ARSX
05367 007777              -1
05370 007775              -3
05371 001157              TAD #107    /1/8*(SSABS-64)+71
05372 005434              JMP I STOREX/JMP TO STORE.
                      /
                      /
05400                     *5400
05400 005632    SETX,     SETT
05401 000106    #106,     106
05402 000000    RTF,      0
05403 000000    NRTF,     0
05404 005321    X8X,      X8
05405 000000    SLIP,     0
05406 000014    #14,      14
05407 007665    #7665,    7665    /-75
05410 007704    #7704,    7704    /-50
05411 007710    #7710,    7710    /-56
05412 000113    #113,     113     /75
05413 000131    #131,     131     /89
                      /
                      /
05414 007000    STORE,    NOP
05415 007000              NOP
05416 003023              DCA TRIG    /DEPOSIT IN TRIG.
05417 001035              TAD SSPDC   /GET SSPDC.
05420 007700              SMA CLA     /NEGATIVE SSPDC?
05421 001044              TAD BIT4    /YES, SET BIT4 TO 1.
05422 003024              DCA DIREK   /STORE AS DIRECTION BIT.
                /TEST FOR TRANSITION FROM RT
05423 001030              TAD #7773   /-5.
05424 003026              DCA CTR2    /CTR2=-5.
05425 001025              TAD CTR1    /GET CTR1.
05426 007500              SMA         /NEGATIVE CTR1?
05427 005600              JMP I SE/POSITIVE.
05430 007001              IAC         /YES, INC. CTR1.
05431 003025              DCA CTR1
05432 001025              TAD CTR1    /GET CTR1.
05433 001052              TAD BIT10   /ADD 2 TO IT.
05434 007240              CMA CLA     /NEGATIVE?
05435 001044              TAD BIT4    /NO, SWITCH TO 8-POLE.
05436 003023              DCA TRIG    /TRIG=0.
05437 005600              JMP I SETX  /JMP TO SET.
                      /
05440 007000    RAPID,    NOP
05441 001201              TAD #106    /70
05442 003027              DCA HYST    /HYST=70.
                    / CALCULATE RTF
05443 001032              TAD X2      /GET X2.
05444 007041              CIA         /NEGATE.
05445 007000              NOP
05446 004421              JMS I ARSX
05447 007775              -3
05450 007775              -3
```

```
05451 003202              DCA RTF      /RTF=3/8*X2
05452 001202              TAD RTF      /GET RTF.
05453 007041              CIA          /NEGATE.
05454 003203              DCA NRTF     /NRTF=-RTF.
            / CALCULATE SLIP & FRQCM
05455 001203              TAD NRTF
05456 001604              TAD I X8X
05457 003205              DCA SLIP     /SLIP=NRTF+X8.
05460 001203              TAD NRTF
05461 000040              AND BIT0
05462 001205              TAD SLIP
05463 007421              MQL
05464 007701              ACL
05465 007104              CLL RAL
05466 007430              SZL
05467 001206              TAD #14      /SIGNS DIFF -- ACCEL
05470 001206              TAD #14      /SIGNS SAME -- DECEL
05471 003274              DCA .+3
05472 007701              ACL
05473 004420              JMS I LIMITX
05474 000000              0
05475 001202              TAD RTF
05476 004420              JMS I LIMITX
05477 000500              500          /320
05500 007500              SMA          /FRQCM
05501 005305              JMP .+4
05502 007041              CIA          /FRQCM<0
05503 003033              DCA FRQAB
05504 005307              JMP .+3      /DIRECTION BIT=0.
05505 003033              DCA FRQAB    /FRQCM>0
05506 001044              TAD BIT4     /DIRECTION BIT=1.
05507 003024              DCA DIREK
            / CALCULATE FREQ
05510 001033              TAD FRQAB
05511 001207              TAD #7665    /-75
05512 007510              SPA
05513 007200              CLA          /FRQAB<75
05514 003164              DCA ITEMPO   /FRQAB>75
05515 001164              TAD ITEMPO
05516 001210              TAD #7704    /FRQAB-125    /-50
05517 007500              SMA
05520 005325              JMP SECND    /FRQAB>125
05521 007200              CLA
05522 001164              TAD ITEMPO   /FRQAB<125
05523 007000              NOP          /(FRQAB-75)
05524 005360              JMP STOR
05525 003164  SECND,      DCA ITEMPO   /FRQAB-125
05526 001164              TAD ITEMPO
05527 001211              TAD #7710    /FRQAB-181
05530 007500              SMA
05531 005341              JMP THIRD    /FRQAB>181
05532 007200              CLA
05533 001164              TAD ITEMPO   /FRQAB<181
05534 004421              JMS I ARSX
05535 007771              -7
05536 007774              -4
05537 001156              TAD #62      /7/16*(FRQAB-125)+50
05540 005360              JMP STOR
05541 003164  THIRD,      DCA ITEMPO   /FRQAB-181
05542 001057              TAD #7700    /FRQAB-245
05543 007500              SMA
05544 005354              JMP FORTH    /FRQAB>245
05545 007200              CLA
05546 001164              TAD ITEMPO   /FRQAB<245
05547 004421              JMS I ARSX
05550 007771              -7
05551 007773              -5
05552 001212              TAD #113     /7/32*(FRQAB-181)+75
05553 005360              JMP STOR     /JMP TO STOR.
05554 004421  FORTH,      JMS I ARSX
05555 007771              -7
05556 007772              -6
05557 001213              TAD #131     /7/64*(FRQAB-245)+89
```

```
05560  003022   STOR,     DCA FREQ         /DEPOSIT IN FREQ.
05561  007000             NOP
05562  007000             NOP
        /
        /
        /
05600                     *5600
        /       CALCULATE TRIG
05600  001030             TAD #7773
05601  003025             DCA CTR1         /CTR1=-5.
05602  001026             TAD CTR2         /GET CTR2.
05603  007500             SMA              /IS CTR2 NEGATIVE?
05604  005214             JMP NORM         /NO.
05605  007001             IAC              /YES, INC CTR2.
05606  003026             DCA CTR2
05607  001026             TAD CTR2         /GET CTR2.
05610  001052             TAD BIT10        /ADD 2.
05611  007500             SMA              /(CTR2+2) NEGATIVE?
05612  005222             JMP STOR1        /NO, WSITCH TO 4-POLE.
05613  005227             JMP STOR1+5
        /
05614  007200   NORM,     CLA
05615  001033             TAD FRQAB
05616  004421             JMS I ARSX
05617  007775             -3
05620  007775             -3
05621  001271             TAD #260         /3/8*(FRQAB)+176
05622  007000   STOR1,    NOP
05623  001272             TAD #7600        /4-POLE CONNECTION
05624  004420             JMS I LIMITX     /LIMIT TO +-122.
05625  000172             172
05626  007000             NOP
05627  007104             CLL RAL
05630  007104             CLL RAL
05631  003023             DCA TRIG
        /OUTPUT FREQ, TRIG, DIREK
05632  007000   SETT,     NOP
05633  007200             CLA
05634  001023             TAD TRIG         /GET TRIG.
05635  001042             TAD BIT2         /8-POLE CONNECTION
05636  007000             NOP
05637  004276             JMS SVOUT1
05640  007200             CLA
05641  007000             NOP
05642  001024             TAD DIREK        /GET DIRECTION BIT.
05643  007421             MQL
05644  001022             TAD FREQ         /OR INTO FREQ. WORD.
05645  007501             MQA
05646  007000             NOP
05647  004304             JMS SVOUT
05650  007000             NOP
        /
        /       OUTPUT TO DAC
        /
05651  007200             CLA
05652  001032             TAD X2           /GET X2.
05653  007106             CLL RTL
05654  007106             CLL RTL          /X2*16.
05655  007000             NOP
05656  006551             6551             /OUTPUT TO DAC.
05657  007200             CLA
05660  001035             TAD SSPDC        /GET SSPDC.
05661  007106             CLL RTL          /SSPDC*16.
05662  007106             CLL RTL
05663  007000             NOP
05664  006552             6552             /OUTPUT TO DAC.
        /
        /
05665  006511             6511             /ENABLE INTERRUPT
05666  007000             NOP
05667  006001             ION              /TURN ON INTERRUPT.
05670  005675             JMP I EXECX
        /
        /
```

```
05671  000260  #260,      260              /176
05672  007600  #7600,     7600             /-128
05673  001600  #1600,     1600
05674  001700  #1700,     1700
05675  005017  EXECX,     EXEC
               /
               /          TEMPORARY IOBB OUTPUT PROGRAM
05676  007000  SVOUT1,    NOP
05677  006515             6515
05700  007040             CMA
05701  006516             6516
05702  007000             NOP
05703  005676             JMP I SVOUT1
05704  007000  SVOUT,     NOP
05705  006535             6535             /CLEAR OUTPUT REGISTER
05706  007040             CMA
05707  006536             6536             /OUTPUT DATS
05710  007000             NOP
05711  005704             JMP I SVOUT
               /
               /
               / LIMIT ROUTINE: THIS ROUTINE LIMITS A SIGNED NUMBER
               /   WITHIN THE LIMIT OF +-PARAMETER VALUE.
               /
               / CALLING SEQUENCES:
               /
               /       TAD A NUMBER        /FOR EXAMPLE, OCT 1001
               /       JMS LIMIT    (JMS I LIMITX)
               /       1000                /PARAMETER
               /    RETURN WITH 1000 IN AC.
               /
05712  007000  LIMIT,     NOP              /ENTRY POINT.
05713  007421             MQL              /SAVE THE NUMBER IN MQ.
05714  007701             ACL              /LOAD THE NUMBER BACK TO AC.
05715  007104             CLL RAL          /PUT THE SIGN BIT INTO L BIT.
05716  007701             ACL              /LOAD THE NUMBER INTO AC.
05717  007500             SMA              /THE NUMBER NEGATIVE?
05720  007041             CIA              /NO, NEGATE.
05721  001712             TAD I LIMIT      /ADD TO PARAMETER.
05722  007700             SMA CLA          /THE NUMBER < PARAMETER?
05723  005330             JMP .+5          /YES.
05724  001712             TAD I LIMIT      /NO, GET PARAMETER.
05725  007430             SZL              /WAS THE NUMBER NEGATIVE?
05726  007041             CIA              /YES, NEGATE.
05727  007410             SKP
05730  007701             ACL              /LOAD THE ORIGINAL NO. FROM MQ INTO AC
05731  002312             ISZ LIMIT        /INC. LIMIT.
05732  007000             NOP
05733  005712             JMP I LIMIT      /RETURN.
               /
               / ARS ROUTINE DOES THE FOLLOWING CALCULATION:
               / AC=AC*(+PARAMETER NO. 1)/2**(+PARAMETER NO. 2)
               /
               / CALLING SEQUENCES:
               /
               /       TAD OCT 30  FOR EXAMPLE
               /       JMS ARS     (JMS I ARSX)
               /       -3                  /PARAMETER NO. 1
               /       -3                  /PARAMETER NO. 2
               /    RETURN WITH OCT 11 IN AC  (30*3/8=11).
               /
05734  007000  ARS,       NOP              /ENTRY POINT.
05735  003165             DCA ITEMP1       /SAVE THE ARG. TEMPORARILY.
05736  001734             TAD I ARS        /GET 1ST PARAMETER.
05737  003164             DCA ITEMP0       /SAVE AS A CNTR.
05740  001165             TAD ITEMP1       /GET THE ARG.
05741  002164             ISZ ITEMP0       /INC CNTR. LAST?
05742  005340             JMP .-2          /NO, ADD ARG. TO AC.
05743  002334             ISZ ARS          /YES.
```

```
05744  007421        MQL                /SAVE AC IN MQ.
05745  001734        TAD I ARS          /GET 2ND PARAMETER.
05746  003164        DCA ITEMPO         /SAVE AS A CNTR.
05747  007701        ACL                /LOAD AC FROM MQ.
05750  007100        CLL                /SET LINK BIT TO BE THE SAME AS
05751  007510        SPA                / SIGN BIT.
05752  007120        STL
05753  007010        RAR                /DIVIDE BY 2.
05754  002164        ISZ ITEMPO         /INC CNTR, LAST?
05755  005350        JMP .-5            /NO, LOOP BACK AND DIVIDE BY 2 AGAIN.
05756  002334        ISZ ARS            /YES.
05757  007000        NOP
05760  005734        JMP I ARS          /RETURN.
       /
       /
       $
```

The following program listing is designed for use with a Hewlett Packard model No. 2114A data processor, and carries out the programs of FIGS. 35a and 35b. The program listing is written in machine language.

```
                       ASMB,A,B,L,T,X
00010                  ORG 10B
00010  114020          JSB 20B,I TBG
00011  000000          NOP
00012  000000          NOP
00013  000000          NOP
00014  114024          JSB 24B,I
00015  000000          NOP
00016  000000          NOP
00017  000000          NOP
00020  000071          DEF TIMER
00021  000000          NOP
00022  000000          NOP
00023  000000          NOP
00024  000431          DEF TIME2
00040                  ORG 40B
00040  102100     INIT STF 0
00041  002400          CLA
00042  070722          STA X13
00043  070712          STA X5
00044  070703          STA X2
00045  070672          STA SSPDC
00046  070750          STA RTP
00047  070702          STA X1
00050  102610          OTA TBG
00051  103710          STC TBG,C
00052  103712          STC IO1,C
00053  103714          STC IO2,C
00054  102514     PEN  LIA IO2
00055  010717          AND MASK1
00056  070714          STA XOLD
00057  102514          LIA IO2
00060  010717          AND MASK1
00061  050714          CPA XOLD
00062  024064          JMP *+2
00063  024054          JMP PEN
00064  060635          LDA N80
00065  070553          STA PER
00066  060561          LDA START
00067  070555          STA PHASE
00070  024120          JMP EXEC 00071  000000     TIMER NOP              50 USEC + SUBROUTINES
00072  103100          CLF 0             FIRE = 56 USEC
00073  070537          STA J             FIRE2 = 50 USEC
00074  034733          ISZ FIRCT         RESET = 10 USEC
00075  024077          JMP SON
00076  024453          JMP FIRE
00077  034732     SON  ISZ FIRC2
00100  024102          JMP MA
00101  024465          JMP FIRE2
00102  034736     MA   ISZ HCCTR
00103  024106          JMP MIKE
```

```
00104 003400          CCA
00105 070731          STA XFLAG
00106 034553     MIKE ISZ PER
00107 024111          JMP DON
00110 014475          JSB FROCY
00111 034554     DON  ISZ PER1
00112 024114          JMP JACK
00113 014514          JSB FREQ1
00114 060537     JACK LDA J
00115 103110          CLF TBG
00116 102100          STF 0
00117 124071          JMP TIMER,I 00120 060731     EXEC LDA XFLAG
00121 002020          SSA
00122 024126          JMP XSERV+1
00123 000000          NOP
00124 024120          JMP EXEC 00125 000000     XSERV NOP
00126 002400          CLA
00127 070731          STA XFLAG
            GET X1 FROM SWR
00011             ADC EQU 11B
00130 103111          CLF ADC
00131 102311          SFS ADC
00132 024131          JMP *-1
00133 102511          LIA ADC
00134 102501          LIA SWR
00135 000000          NOP
00136 070702          STA X1
            GET X2 FROM COUNTER
00137 102514     JOE  LIA IO2
00140 010717          AND MASK1        READINGS OF COUNTER
00141 070713          STA XNEW         MICRO SECS APART EQUAL?
00142 102514          LIA IO2
00143 010717          AND MASK1
00144 050713          CPA XNEW
00145 024147          JMP *+2          YES.  XNEW IS ALSO IN A
00146 024137          JMP JOE          NO.   REPEAT
00147 064714          LDB XOLD         RETRIEVE XOLD
00150 007004          CMB,INB          NEGATE XOLD
00151 070714          STA XOLD         UPDATE XOLD
00152 040001          ADA 1            XNEW - XOLD = X2.
00153 040666          ADA P2047
00154 002020          SSA              GREATER THAN 0?
00155 040716          ADA POS          NO.   ADD 256
00156 040667          ADA N4094
00157 002021          SSA,RSS          GREATER THAN 0?
00160 040715          ADA NEG          YES.  DEDUCT 256
00161 040666          ADA P2047
00162 070703          STA X2           SAVE X2
00163 070701          STA RTF
00164 003004          CMA,INA
            CALCULATE POSITION,VELOCITY AND VOLTS FEEDBACK
00165 000000          NOP
00166 000000          NOP
00167 070621          STA XPOS
00170 000000          NOP              KVOLT
00171 000000          NOP
00172 070620          STA X2P
00173 000000          NOP
00174 000000          NOP
00175 070617          STA KX2
            CALCULATE POSITION ERROR
00176 060702          LDA X1
00177 040621          ADA XPOS
00200 040712          ADA X5
00201 064662          LDB P8000
00202 014413          JSB LIMIT
00203 070712          STA X5
00204 001121          ARS,ARS
00205 001100          ARS
```

```
00206 000000            NOP
00207 070624            STA X6
         CALCULATE VELOCITY ERROR---LAG-LEAD NETWORK
00210 040617            ADA KX2
00211 070616            STA X7P
00212 000000            NOP
00213 001000            ALS
00214 070721            STA X11
00215 060616            LDA X7P
00216 040722            ADA X13
00217 064633            LDB P16TH
00220 014413            JSB LIMIT
00221 070722            STA X13
00222 040721            ADA X11
00223 001121            ARS,ARS
00224 001121            ARS,ARS
00225 001100            ARS               (KV)
00226 000000            NOP
00227 070704            STA X8
         CALCULATE VOLTAGE LOOP AND FIRING ANGLE
00230 040620            ADA X2P
00231 000000            NOP
00232 000000            NOP
00233 001121            ARS,ARS
00234 001121            ARS,ARS
00235 064614            LDB P28
00236 014413            JSB LIMIT
00237 070747            STA TORCM
00240 002020            SSA
00241 003004            CMA,INA
00242 070754            STA TCABS
00243 060703            LDA X2
00244 064000            LDB 0
00245 001020            ALS,ALS
00246 070753            STA BETA
00247 040001            ADA 01
00250 001121            ARS,ARS
00251 001121            ARS,ARS
00252 002020            SSA
00253 003004            CMA,INA
00254 040754            ADA TCABS
00255 070755            STA TCTOT
00256 064000            LDB 0          COMPUTE FIRING TIME
00257 044603            ADB N2
00260 006021            SSB,RSS
00261 024265            JMP *+4
00262 001000            ALS
00263 040632            ADA N70
00264 024266            JMP OUT
00265 040631            ADA N68
00266 070726        OUT STA TEMP1

00267 060750            LDA RTP
00270 040703            ADA X2
00271 070750            STA RTP
00272 060747            LDA TORCM
00273 001020            ALS,ALS
00274 001020            ALS,ALS
00275 001020            ALS,ALS
00276 001020            ALS,ALS
00277 064650            LDB P156
00300 014413            JSB LIMIT
00301 040750            ADA RTP
00302 040753            ADA BETA
00303 070743            STA STP
00304 002021            SSA,RSS
00305 024313            JMP HIGH
00306 040657            ADA P1250
00307 064750            LDB RTP
00310 044657            ADB P1250
00311 074750            STB RTP
00312 024323            JMP STORE
00313 040660       HIGH ADA N1250
```

```
00314 002021        SSA,RSS
00315 024320        JMP *+3
00316 060743        LDA STP -
00317 024323        JMP STORE
00320 064750        LDB RTP
00321 044660        ADB N1250
00322 074750        STB RTP
00323 070743   STORE STA STP 00324 070751        STA STPTM
00325 040641        ADA N209
00326 064561        LDB START
00327 002020   TEST SSA
00330 024335        JMP STOR -
00331 070751        STA STPTM
00332 040641        ADA N209
00333 006004        INB
00334 024327        JMP TEST
00335 074555   STOR STB PHASE 00336 060751        LDA STPTM
00337 064000        LDB 0
00340 001020        ALS,ALS
00341 044000        ADB 0
00342 001000        ALS
00343 044000        ADB 0
00344 005121        BRS,BRS
00345 005121        BRS,BRS
00346 005100        BRS
00347 006003        SZB,RSS
00350 006004        INB
00351 074744        STB TIME 00352 103100        CLF 0
00353 060555        LDA PHASE
00354 070745        STA ORIG
00355 040607        ADA P8
00356 070556        STA PHAS1
00357 060555        LDA PHASE
00360 002004        INA
00361 050570        CPA LAST
00362 060561        LDA START
00363 070555        STA PHASE
00364 003400        CCA
00365 070554        STA PER1
00366 070727        STA FLAGA
            UPDATE FIRCT & FIRC2
00367 060734        LDA FIRTM
00370 003004        CMA,INA
00371 040726        ADA TEMP1
00372 064733        LDB FIRCT
00373 006021        SSB,RSS
00374 024402        JMP JEFF
00375 044000        ADB 0
00376 006020        SSB
00377 024401        JMP *+2
00400 007400        CCB
00401 074733        STB FIRCT
00402 040732   JEFF ADA FIRC2
00403 002020        SSA
00404 024406        JMP *+2
00405 003400        CCA
00406 070732        STA FIRC2
00407 060726        LDA TEMP1
00410 070734        STA FIRTM 00411 102100        STF 0
00412 024123        JMP EXEC+3

00413 000000   LIMIT NOP
00414 070711        STA GEO
00415 002020        SSA            IN "E" AND PUT
```

```
00416 003004          CMA,INA
00417 007004          CMB,INB        "A" = ↑A↑-B = OVFLO
00420 040001          ADA 1
00421 002021          SSA,RSS
00422 002400          CLA
00423 007004          CMB,INB
00424 040001          ADA 1          "A" = ↑RESULT↑
00425 064711          LDB GEO
00426 006020          SSB
00427 003004          CMA,INA
00430 124413          JMP LIMIT, I   RETURN 00431 000000          TIME2 NOP
00432 103100          CLF 0
00433 070540          STA J1
00434 060736          LDA HCCTR
00435 040632          ADA N70
00436 002020          SSA
00437 024447          JMP DICK
00440 060636          LDA N83
00441 070736          STA HCCTR
00442 060734          LDA FIRTM
00443 040614          ADA P28
00444 070733          STA FIRCT
00445 003400          CCA
00446 070731          STA XFLAG
00447 060540          DICK LDA J1
00450 103114          CLF IO2
00451 102100          STF 0
00452 124431          JMP TIME2,I 00453 060541          FIRE LDA BEG1
00454 002004          INA
00455 070542          STA BEGIN
00456 160000          LDA 0,I
00457 070730          STA TRIG
00460 030557          IOR PHAS2
00461 102614          OTA IO2
00462 060613          LDA N28
00463 070732          STA FIRC2
00464 024077          JMP SON 00465 034542          FIRE2 ISZ BEGIN
00466 160542          LDA BEGIN,I
00467 070730          STA TRIG
00470 030557          IOR PHAS2
00471 102614          OTA IO2
00472 060613          LDA N28
00473 070732          STA FIRC2
00474 024102          JMP MA 00475 000000          FRQCY NOP
00476 070536          STA H
00477 160555          LDA PHASE,I
00500 070557          STA PHAS2
00501 030730          IOR TRIG
00502 102614          OTA IO2
00503 034727          ISZ FLAGA
00504 024512          JMP *+6
00505 060744          LDA TIME
00506 003004          CMA,INA
00507 070554          STA PER1
00510 060745          LDA ORIG
00511 070555          STA PHASE
00512 060536          LDA H
00513 124475          JMP FRQCY,I 00514 000000          FREQ1 NOP
00515 070535          STA G
```

```
00516 160556        LDA PHAS1,I
00517 070557        STA PHAS2
00520 030730        IOR TRIG
00521 102614        OTA IO2
00522 003400        CCA
00523 070553        STA PER
00524 060535        LDA G
00525 124514        JMP FREQ1,I 00526 001111        OCT1         OCT 1111
00527 000000        A NOP
00530 000000        B NOP
00531 000000        C NOP
00532 000000        D NOP
00533 000000        E NOP
00534 000000        F NOP
00535 000000        G NOP
00536 000000        H NOP
00537 000000        J NOP
00540 000000        J1 NOP
00541 000542        BEG1 DEF BEGIN
00542 000543        BEGIN DEF *+1
00543 035400        OCT 35400
00544 037000        OCT 37000
00545 027400        OCT 27400
00546 033400        OCT 33400
00547 036400        OCT 36400
00550 017400        OCT 17400
00551 037400        OCT 37400
00552 037400        OCT 37400
00553 000000        PER NOP
00554 000000        PER1 NOP
00555 000000        PHASE NOP
00556 000000        PHAS1 NOP
00557 000000        PHAS2 NOP
00560 000561        STAR1 DEF START
00561 000562        START DEF *+1
00562 000142             OCT 142
00563 000242             OCT 242
00564 000222             OCT 222
00565 000230             OCT 230
00566 000130             OCT 130
00567 000150             OCT 150
00570 000570        LAST DEF *
00571 000567        LAST1 DEF *-2
00572 000342             OCT 342
00573 000262             OCT 262
00574 000232             OCT 232
00575 000330             OCT 330
00576 000170             OCT 170
00577 000152             OCT 152
00010                TBG EQU 10B
00013                DAC EQU 13B
00012                IO1 EQU 12B
00014                IO2 EQU 14B
00001                SWR EQU 1B
00600 177777        N1 DEC -1
00601 000001        P1 DEC 1
00602 000002        P2 DEC 2
00603 177776        N2 DEC -2
00604 000003        P3 DEC 3
00605 000005        P5 DEC 5
00606 177773        N5 DEC -5
00607 000010        P8 DEC 8
00610 000012        P10 DEC 10
00611 177770        N8 DEC -8
00612 000017        P15 DEC 15
00613 177744        N28 DEC -28
00614 000034        P28 DEC 28
00615 000000        CTR NOP
00616 000000        X7P NOP
00617 000000        KX2 NOP
```

```
00620 000000        X2P NOP
00621 000000        XPOS NOP
00622 000000        NX2P NOP
00623 000031        P25 DEC 25
00624 000036        P30 DEC 30
00625 000050        P40 DEC 40
00626 177704        N60 DEC -60
00627 177703        N61 DEC -61
00630 177700        N64 DEC -64
00631 177674        N68 DEC -68
00632 177672        N70 DEC -70
00633 000120        P80 DEC 80
00634 000123        P83 DEC 83
00635 177660        N80 DEC -80
00636 177655        N83 DEC -83
00637 000400        B400 OCT 400
00640 177400        N400 OCT -400
00641 177457        N209 DEC -209
00642 000000        X6 NOP
00643 001400        P1400 OCT 1400
00644 000144        P100 DEC 100
00645 177634        N100 DEC -100
00646 000177        P127 DEC 127
00647 177601        N127 DEC -127
00650 000234        P156 DEC 156
00651 177402        N254 DEC -254
00652 000353        P235 DEC 235
00653 000377        P255 DEC 255
00654 000310        P200 DEC 200
00655 177470        N200 DEC -200
00656 003720        P2000 DEC 2000
00657 002342        P1250 DEC 1250
00660 175436        N1250 DEC -1250
00661 007640        P4000 DEC 4000
00662 017500        P8000 DEC 8000
00663 037200        P16TH DEC 16000
00664 001000        B1000 OCT 1000
00665 000620        P400 DEC 400
00666 003777        P2047 DEC 2047
00667 170002        N4094 DEC -4094
00670 100000        MASK6 OCT 100000
00671 000000        SSOLD NOP
00672 000000        SSPDC NOP
00673 000000        SSABS NOP
00674 000000        VLTCM NOP
00675 000000        VLTFB NOP
00676 000000        VLTER NOP
00677 000000        DELFT NOP
00700 000000        CHG NOP
00701 000000        RTF NOP
00702 000000        X1 NOP
00703 000000        X2 NOP
00704 000000        X8 NOP
00705 000000        X9 NOP
00706 000000        X10 NOP
00707 004000        VOLT OCT 4000
00710 002000        FREQ OCT 2000
00711 000000        GEO NOP
00712 000000        X5 NOP
00713 000000        XNEW NOP
00714 000000        XOLD NOP
00715 170000        NEG DEC -4096
00716 010000        POS DEC 4096
00717 007777        MASK1 OCT 7777
00720 000200        MASK2 OCT 200
00721 000000        X11 NOP
00722 000000        X13 NOP
00723 000000        SST NOP
00724 000000        PER1T NOP
00725 000000        DCERR NOP
00726 000000        TEMP1 NOP
00727 000000        FLAGA NOP
00730 000000        TRIG NOP
```

```
00731 000000          XFLAG NOP
00732 000000          FIRC2 NOP
00733 000000          FIRCT NOP
00734 000000          FIRTM NOP
00735 000000          OLDFT NOP
00736 000000          HCCTR NOP
00737 000000          DYCTR NOP
00740 000000          STF NOP
00741 000000          STFAB NOP
00742 000000          SSCHG NOP
00743 000000          STP NOP
00744 000000          TIME NOP
00745 000000          ORIG NOP
00746 000000          DIR NOP
00747 000000          TORCM NOP
00750 000000          RTP NOP
00751 000000          STPTM NOP
00752 000000          STP NOP
00753 000000          BETA NOP
00754 000000          TCABS NOP
00755 000000          TCTOT NOP
                      END
```

The principles of this invention having now been fully explained in the foregoing specification, we hereby claim as our invention:

1. A method of controlling the application of power to an a.c. motor in a servo system, said motor having a plurality of stator field windings, comprising the step of electronically calculating, from a first parameter representative of motor speed and a second parameter representative of the programmed position of said motor, a quantity for the torque required of said motor and the required position of the stator field of said motor during a succeeding period to perform in accordance with said second parameter, for each calculation of said torque quantity, producing a signal at a time representative of said torque quality, using said signal to actuate at controlled rectifier to produce, from an a.c. voltage, a d.c. voltage having an amplitude representative of said torque quantity, and producing, for each calculation of said stator field position quantity, a signal for controlling application of a source of electrical power to the stator field windings of said motor to cause said stator field to assume a position adjacent to the position represented by said stator field position quantity.

2. The method of claim 1, including the steps of producing, for each calculation of said stator field position quantity, another signal for controlling application of a source of electrical power to said stator field windings to subsequently cause said stator field to assume a second position on the other side of the stator field position represented by said stator field position quantity from said adjacent position, said adjacent position and said second position each being maintained by said stator field for an individual interval such that the average position of said stator field is the same as the position represented by said stator field quantity.

* * * * *

UNITED STATES PATENT OFFICE
CERTIFICATE OF CORRECTION

PATENT NO. : 4,028,599

DATED : June 7, 1977

INVENTOR(S) : Frank Zankl; Edward E. Kirkham; Richard E. Stobbe; and John J. Schachte It is certified that error appears in the above-identified patent and that said Letters Patent are hereby corrected as shown below:

Claim 1, line 3, change "step" to read --- steps ---.

line 12, change "quality" to read --- quantity ---.

line 13, change "at" to read --- a ---.

Signed and Sealed this

Sixth Day of September 1977

[SEAL]

Attest:

RUTH C. MASON
Attesting Officer

LUTRELLE F. PARKER
Acting Commissioner of Patents and Trademarks